(12) United States Patent
Goldman et al.

(10) Patent No.: US 6,314,427 B1
(45) Date of Patent: *Nov. 6, 2001

(54) METHOD AND APPARATUS FOR USING AN INFORMATION MODEL TO ORGANIZE AN INFORMATION REPOSITORY INTO AN EXTENSIBLE HIERARCHY OF ORGANIZATIONAL INFORMATION

(75) Inventors: Jason D. Goldman; David J. Lachelt, both of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/258,984

(22) Filed: Feb. 26, 1999

(51) Int. Cl.[7] ........................................ G06F 17/30
(52) U.S. Cl. ........................ 707/100; 707/102; 707/103
(58) Field of Search .................... 707/100, 103, 707/10, 203, 104, 102

(56) References Cited

U.S. PATENT DOCUMENTS 5,815,703 * 9/1998 Copeland et al. .............. 707/102
5,870,751 * 2/1999 Trotter ........................... 707/102
6,023,703 * 2/2000 Hill ............................... 707/100
6,098,072 * 8/2000 Sluiman et al. ................ 707/103

* cited by examiner

Primary Examiner—Jean R. Homere
Assistant Examiner—Greta Robinson

(57) ABSTRACT

An apparatus and method for accessing an information repository, including computer readable program code stored on computer readable media, where the computer readable program code includes code for organizing information stored in the information repository into a hierarchy of organizational information, and the code creates a hierarchy of a number of derived containers that have contents and are generated in conformance with an information model which has a hierarchy of type-defined container definition nodes, where some of the derived containers correspond to type-defined container definition nodes that are organization-based container definition nodes that represent a category of information in the information repository.

21 Claims, 37 Drawing Sheets

FIG. 7

| field: JobNo | field: Job | field: Skills | field: Grade | field: Tech/Prof | field: IsAvailable |
|---|---|---|---|---|---|
| 700 | REPAIRER | COMP | --- | TRUE | TRUE |
| 701 | SECRETARY | OFFICE | --- | FALSE | TRUE |
| 702 | SECRETARY | OFFICE | --- | FALSE | FALSE |
| 703 | PLUMBER | TRADE | --- | FALSE | TRUE |
| 704 | PROGRAMMER | COMP | --- | TRUE | FALSE |
| 705 | PROGRAMMER | COMP | --- | TRUE | FALSE |
| 706 | PROGRAMMER | COMP | --- | TRUE | TRUE |
| 707 | ELECTRICIAN | TRADE | --- | FALSE | TRUE |
| 708 | SECRETARY | OFFICE | --- | FALSE | FALSE |
| 709 | SECRETARY | OFFICE | --- | FALSE | TRUE |
| 710 | PLUMBER | TRADE | 2 | FALSE | TRUE |
| 711 | REPAIRER | ELEC | --- | TRUE | TRUE |
| 712 | PLUMBER | TRADE | 1 | FALSE | TRUE |

```
AVAILABLE      802
    TECH/PROF       804
        COMPUTERS       806
            REPAIRER        808
            PROGRAMMER      810
        ELECTRONICS     812
    OFFICE          814
        SECRETARY       816
    TRADE           818
        PLUMBER         820
            GRADE I         822
            GRADE II        824
```
⎫
⎬ 800
⎭

*FIG. 8A*

```
TECH/PROF       828
    COMPUTERS       830
        REPAIRER        832
        PROGRAMMER      834
    ELECTRONICS     836
```
⎫
⎬ 826
⎭

*FIG. 8B*

```
OFFICE
    SECRETARY
```

*FIG. 8C*

```
TRADE
    PLUMBER
        GRADE I
        GRADE II
```

*FIG. 8D*

| field:AssetNo. | field: Asset | field: assetType | field: Dept. | field: Location | field: IsAvailable |
|---|---|---|---|---|---|
| 2200 | CHAIR | OFFICE | DEV | BLDG1 | TRUE |
| 2201 | STICKER | PARTS | MKTG | BLDG2 | TRUE |
| 2202 | SCANNER | PROD | SHP/REC | BLDG3 | TRUE |
| 2203 | DESKTOP | PROD | ADMIN | ONSITE | FALSE |
| 2204 | TYPEWRITER | OFFICE | ADMIN | BLDG1 | TRUE |
| 2205 | PIN | PARTS | MKTG | BLDG2 | TRUE |
| 2206 | SHIP LABELS | PARTS | SHP/REC | BLDG3 | TRUE |
| 2207 | LAPTOP | OFFICE | DEV | ONSITE | FALSE |
| 2208 | PRINTER | PROD | DEV | ONSITE | TRUE |
| 2209 | SHIRT | PROD | MKTG | BLDG3 | TRUE |
| 2210 | DICTAPHONE | OFFICE | ADMIN | BLDG2 | TRUE |
| 2211 | PRINTER CABLE | PARTS | ADMIN | BLDG1 | TRUE |
| 2212 | SCALE | PROD | SHP/REC | BLDG1 | TRUE |

FIG. 22

ORGANIZATION OBJECTS DATABASE

| RecNo | Org_Name | Org_Type |
|---|---|---|
| A1 | UUNET | PROVIDER |
| A2 | QUEST | PROVIDER |
| A3 | FRII | PEER |
| A4 | FYZZX INC. | CUSTOMER |
| A5 | EXXEDE CO. | CUSTOMER |
| A6 | PNTS & CO. | CUSTOMER |

RESOURCES DATABASE

| RecNo | Device | IsRouter | IsInterface | IsServer | IsCPE | IsConnector | Assoc_Org |
|---|---|---|---|---|---|---|---|
| B1 | Router1 | TRUE | FALSE | FALSE | FALSE | FALSE | FYZZX INC.; EXXEDECO; PNTS&CO. |
| B2 | Router1/lan0 | FALSE | TRUE | FALSE | FALSE | FALSE | FYZZX INC. |
| B3 | Router1/lan1 | FALSE | TRUE | FALSE | FALSE | FALSE | FYZZX INC. |
| B4 | Router1/lan2 | FALSE | TRUE | FALSE | FALSE | FALSE | EXXEDECO |
| B5 | Router1/lan3 | FALSE | TRUE | FALSE | FALSE | FALSE | PNTS&CO. |
| B6 | Router1/lan4 | FALSE | TRUE | FALSE | FALSE | FALSE | PNTS&CO. |
| B7 | Router2 | TRUE | FALSE | FALSE | FALSE | FALSE | |
| B8 | Router2/lan0 | FALSE | TRUE | FALSE | FALSE | FALSE | UUNET |
| B9 | Router2/lan1 | FALSE | TRUE | FALSE | FALSE | FALSE | QUEST |
| B10 | Router2/lan2 | FALSE | TRUE | FALSE | FALSE | FALSE | FRII |
| B11 | Server1 | FALSE | FALSE | TRUE | FALSE | FALSE | FYZZX INC.; EXXEDECO |
| B12 | Server2 | FALSE | FALSE | TRUE | FALSE | FALSE | PNTS&CO. |
| B13 | Server3 | FALSE | FALSE | TRUE | FALSE | FALSE | |
| B14 | Switch_a | FALSE | FALSE | FALSE | FALSE | TRUE | |
| B15 | LinkPt1 | FALSE | FALSE | FALSE | TRUE | FALSE | FYZZX INC. |
| B16 | LinkPt2 | FALSE | FALSE | FALSE | TRUE | FALSE | PNTS & CO. |

*FIG. 28*

METHOD AND APPARATUS FOR USING AN INFORMATION MODEL TO ORGANIZE AN INFORMATION REPOSITORY INTO AN EXTENSIBLE HIERARCHY OF ORGANIZATIONAL INFORMATION

This application is related to the copending U.S. Application of Jason Goldman and Brian O'Keefe entitled "METHOD AND APPARATUS FOR USING AN INFORMATION MODEL TO ORGANIZE AN INFORMATION REPOSITORY INTO A HIERARCHY OF INFORMATION" (application Ser. No 09/258,576 filed Feb. 26, 1999), the copending U.S. application Ser. No. 09/258,575 of Jason Goldman and Brian O'Keefe entitled "METHOD AND APPARATUS FOR USING AN INFORMATION MODEL TO ORGANIZE AN INFORMATION REPOSITORY INTO AN EXTENSIBLE HIERARCHY OF INFORMATION" (filed Feb. 26, 1999); and the copending U.S. application Ser. No. 09/258,567 of Jason Goldman entitled "METHOD AND APPARATUS FOR USING AN INFORMATION MODEL TO CREATE A LOCATION TREE IN A HIERARCHY OF INFORMATION" (filed Feb. 26, 1999), and incorporates by reference all that is disclosed therein.

FIELD OF THE INVENTION

This invention pertains to the field of computer implemented organizational systems, and more particularly to a method and apparatus for using an information model to organize an information repository into an extensible hierarchy of organizational information.

BACKGROUND OF THE INVENTION

Generally, information repositories hold a wealth and variety of information that can be accessed. Examples of information repositories include program files comprising a list of subroutines and/or variables used in the program, and databases comprising records. Information repositories can also be in non-automated form, such as library index cards comprising information like call numbers, publishers, and authors. In a small information repository, information can be relatively easy to decipher and organize. As is often the case, however, any useful information repository will contain and accumulate an infinite amount of information so that organizing the information in any useful manner becomes a difficult task. This problem can be demonstrated in an information repository such as a database.

Databases are a large and powerful resource of information in a society automated by computers and computer processes. A database is a repository of files containing records, where each record contains fields that are attributes of the record, and every record in the same file comprises the same fields. For example, records in a job database can comprise fields such as Position, Level, Company, Salary, Years of Experience, and Skills, each of which is an attribute of a job in the job database. In a more general sense, a database is also a collection of files containing records that are subject to the same set of operations for searching, sorting, recombining, and other functions.

Information in a database can be accessed by a custom program written for a particular application. For example, a program in a job placement application might display a list of all available jobs from a job database. This method of access to database information is limited, however, because it requires that such a program be customized for a particular use, language, and/or database, amongst other factors, which can involve a great deal of expertise, time, and expense.

While this is oftentimes necessary, particularly where a database is highly integrated into an application and a user needs sophisticated functionality such as the ability to add, change, and delete database records, it can be overkill for a user who needs minimal access, such as when the user only needs to view database records.

For minimal use, a database can also be accessed by "querying" the database, which at the very least does not require the expertise, time, and expense of a custom program. A query is a specific set of instructions for the purpose of extracting data from a database based on one or more selection criterion. For example, if a user wants to see all jobs in a job database that pay more than $20,000, a query might read "(Salary>=$20,000)". The query, which is written in commands comprehensible by the particular database being queried (eg., SQL), instructs a program to search the database for any and all records that satisfy the one or more selection criterion of the query. In the previous example, therefore, a program reads the Salary field of each record to determine if the value in that field is greater than or equal to $20,000. If the test fails, the program proceeds to test the next record. If the test passes, the program will extract that record from the database for processing, such as viewing or displaying. The result is a cost effective method of extracting information from a database tailored to a user's specific needs.

While creating queries is cost effective, it is not always efficient. Oftentimes, a user needs access to a specific set of records that requires a more complex query, such as when a user wants to see all of the available professional jobs that do not require computer programming skills. A query to obtain this information from a database might read "((isAvailable=TRUE) AND (Tech/Prof=TRUE) AND (skills<>computer) AND (job<>programmer))". In a complex query, such as this one, the results can sometimes be uncertain, requiring the user to make several attempts at creating the query to produce the correct results. Another disadvantage of queries, simple or complex, is that they can result in wasted time and space in obtaining commonly used data, and in creating a litany of queries which produce the same results and/or erroneous results.

A need exists, therefore, for meaningful and easy access to information in an information repository that provides the detail of information available from a custom program without the time and expense of creating one, as well as the cost-effectiveness of querying an information repository without the uncertainties of results and the inefficiencies in obtaining them. In a more general sense, a need also exists for a means of meaningful and easy access to information an information repository that presents a user with a conceptual view of the information repository.

SUMMARY OF THE INVENTION

The invention described herein is an apparatus for accessing an information repository, comprising computer readable program code stored on computer readable media, where the computer readable program code comprises code for organizing information stored in the information repository into a hierarchy. The hierarchy comprises a hierarchy of a number of derived containers that are generated in conformance with an information model comprising a hierarchy of type-defined container definition nodes, each belonging to one of a number of container definition node types, where the types comprise organization-based container definition nodes. Each of the derived containers corresponds to one of the type-defined container definition nodes, represents a category of information in the information repository, and comprises contents. Furthermore, the invention described herein is a computer based method of accessing an information repository, comprising a computer creating a hierarchy of derived containers. The hierarchy comprises a hierarchy of a number of derived containers that correspond to type-defined container definition nodes of an information model comprising a hierarchy of type-defined container definition nodes, each belonging to one of a number of container definition node types, including attribute-based container definition nodes, value-based container definition nodes, and organization-based container definition nodes, and that correspond to categories of information stored in the information repository. The computer determines if a given one of the derived containers has been selected by a computer user, and upon selection of a given derived container, displays contents of the given derived container.

These and other important advantages and objectives of the present invention will be further explained in, or will become apparent from, the accompanying description, drawings and claims.

BRIEF DESCRIPTION OF THE DRAWINGS

Illustrative and presently preferred embodiments of the invention are illustrated in the drawings in which:

FIG. 7 illustrates a database with sample records and values.

FIGS. 8A, 8B, 8C, and 8D are sample hierarchy structures for the database of FIG. 7.

FIG. 22 is a database comprising sample records for illustrating a second preferred embodiment.

FIG. 28 illustrates two databases comprising sample records and values for use in illustrating a variation of a second preferred embodiment.

DESCRIPTION OF THE PREFERRED EMBODIMENTS

The invention described herein is an apparatus for accessing an information repository, comprising computer readable program code stored on computer readable media, where the computer readable program code comprises code for organizing information stored in the information repository into a hierarchy. The hierarchy comprises a hierarchy of a number of derived containers that are generated in conformance with an information model comprising a hierarchy of type-defined container definition nodes, each belonging to one of a number of container definition node types, where the types comprise organization-based container definition nodes. Each of the derived containers corresponds to one of the type-defined container definition nodes, represents a category of information in the information repository, and comprises contents. Furthermore, the invention described herein is a computer based method of accessing an information repository, comprising a computer creating a hierarchy of derived containers. The hierarchy comprises a hierarchy of a number of derived containers that correspond to type-defined container definition nodes of an information model comprising a hierarchy of type-defined container definition nodes, each belonging to one of a number of container definition node types, where the types comprise organization-based container definition nodes, and that correspond to categories of information stored in the information repository. The computer determines if a given one of the derived containers has been selected by a computer user, and upon selection of a given derived container, displays contents of the given derived container.

First Preferred Embodiment

Introduction and Definitions

An information model can be created to define a hierarchy of information (also referred to as a hierarchy) for one or more information repositories to provide meaningful and easy access to information in the information repositories. An information model corresponds to a hierarchy, wherein the hierarchy represents a hierarchical and logical grouping of information in the information repositories. The present invention contemplates defining a single information model for multiple information repositories, multiple information models for a single information repository, as well as a single information model for a single information repository.

Figure 1:
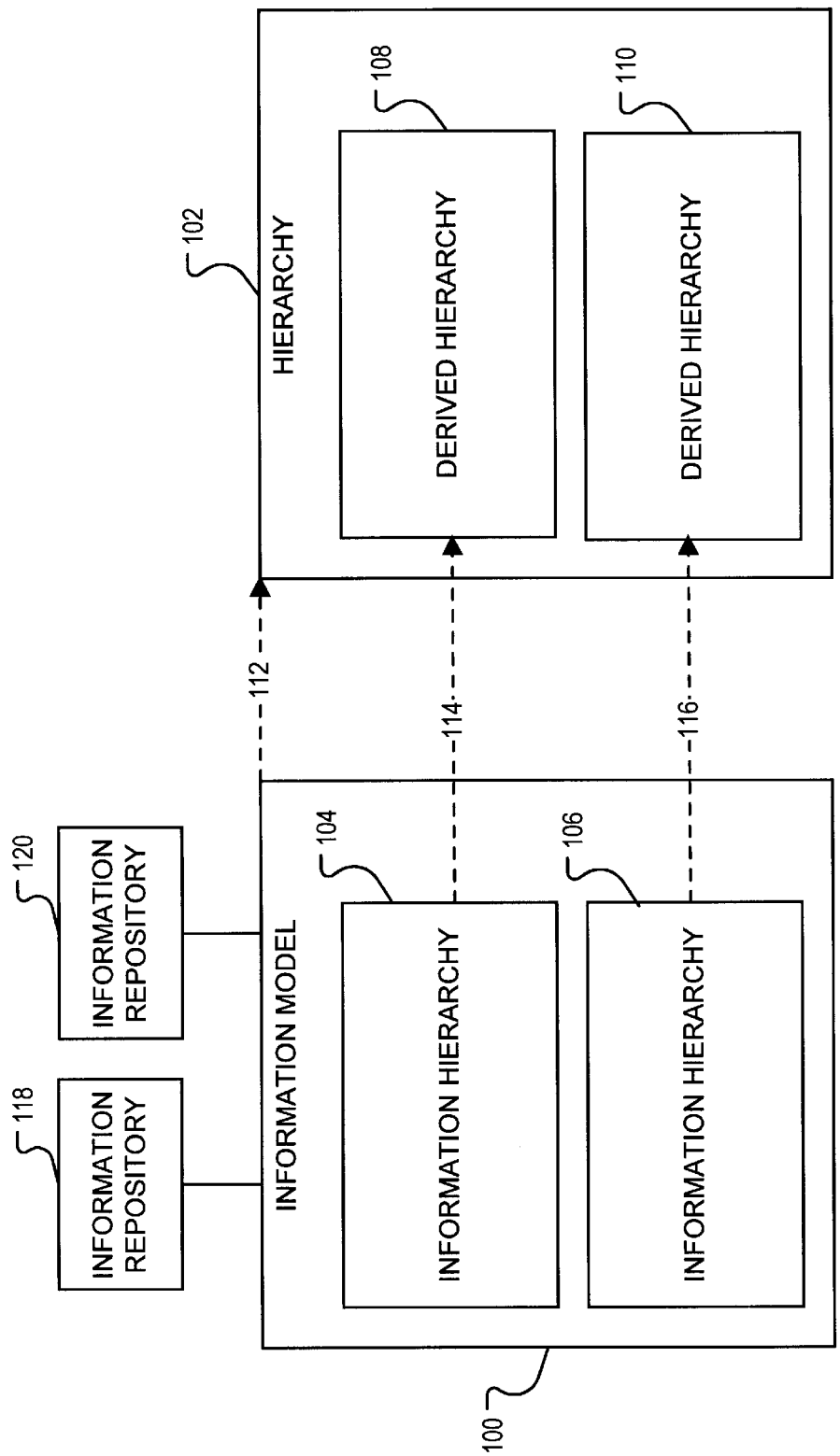
FIG. 1 illustrates the relationship between an information model and a hierarchy in a first-preferred embodiment.

As illustrated in FIG. 1, an information model 100 corresponds 112 to a hierarchy 102 for one or more information repositories 118, 120 in a preferred embodiment, wherein a hierarchy is a logical and hierarchical grouping of information in the information repository. An information model 100 comprises one or more information hierarchies 104, 106, and a hierarchy 102 comprises one or more derived hierarchies 108, 110, such that each information hierarchy 104, 106 corresponds 114, 116 to a derived hierarchy 108, 110 for an information repository 118.

Figure 2:
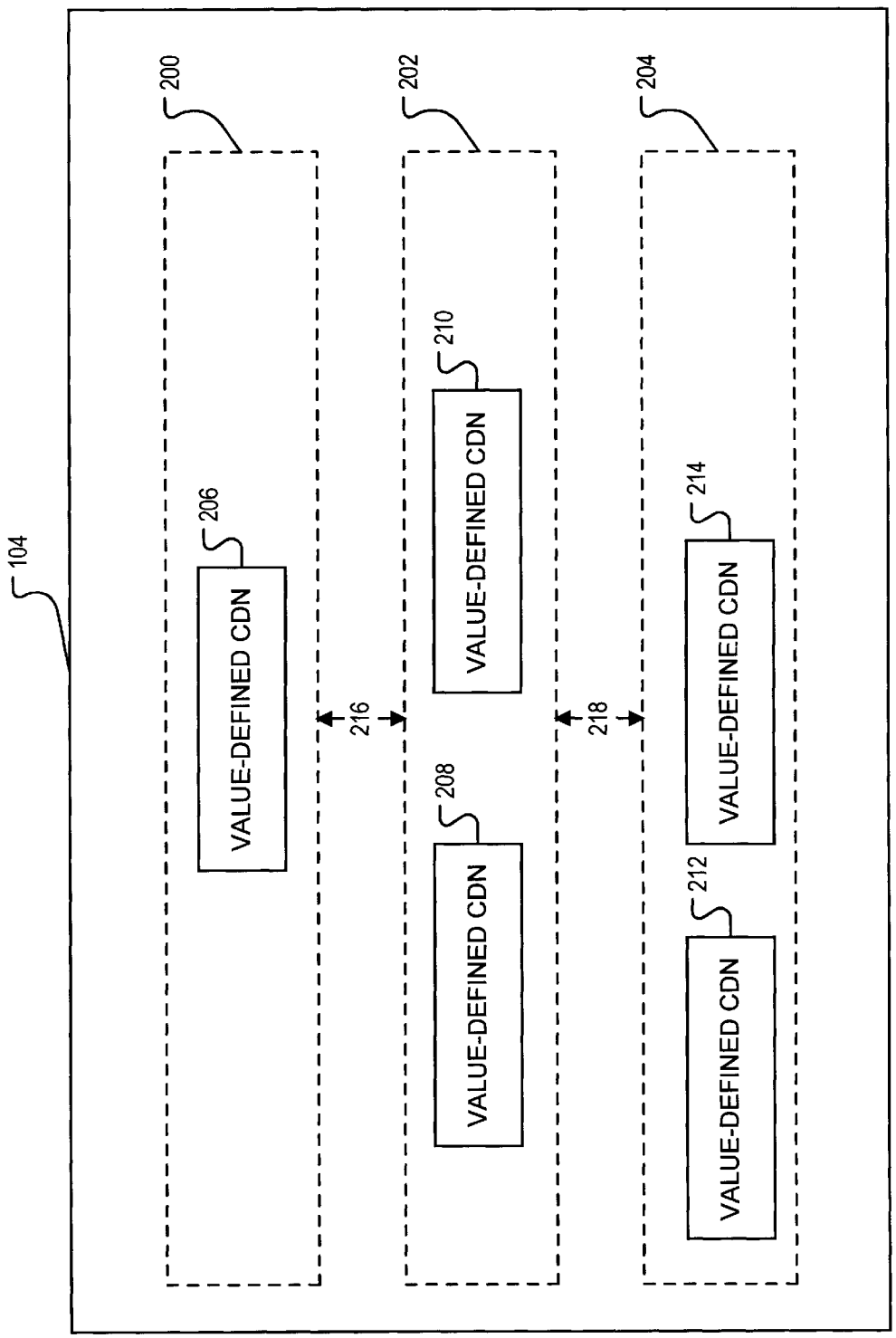
FIG. 2 illustrates value-defined container definition nodes and levels of information that comprise an information hierarchy in an information model, and the relationships between them in a first preferred embodiment.

As illustrated in FIG. 2, an information hierarchy 104 comprises one or more levels of information 200, 202, 204, and one or more value-defined container definition nodes 206, 208, 210, 212, 214 at each level of information, wherein a hierarchical relationship 216, 218 exists between a value-defined container definition node at one level of information and a value-defined container definition node at a second level of information, such that a value-defined container definition node at a higher level of information that points to a value-defined container definition node at a lower level of information is a parent value-defined container definition node (also referred to as parent node), and a value-defined container definition node at a lower level of information that is pointed to by a value-defined container definition node at a higher level of information is a child value-defined container definition node (also referred to as child node). Within a level of information, one or more value-defined container definition nodes referencing the same parent value-defined container definition node are referred to as a container group. In a preferred embodiment, a value-defined container definition node at a lower level of information provides more detail about a hierarchy than a value-defined container definition node at a higher level of information. All nodes in a lower level of information referenced by a given value-defined container definition node, directly or indirectly, are descendants of the given value-defined container definition node, and all nodes in a higher level of information than a given value-defined container definition node of which the given value-defined container definition node is a descendant, are ancestors of the given value-defined container definition node. A node in the first level of information of an information hierarchy is referred to simply as a first-level value-defined container definition node, and a node that does not reference any child nodes in an information hierarchy is referred to as a leaf node. Throughout the description, an information hierarchy will refer to one which starts at a first level of information, and includes a first-level value-defined container definition node, all child nodes of the first-level value-defined container definition node, and all descendants thereof, including leaf nodes.

Figure 3:
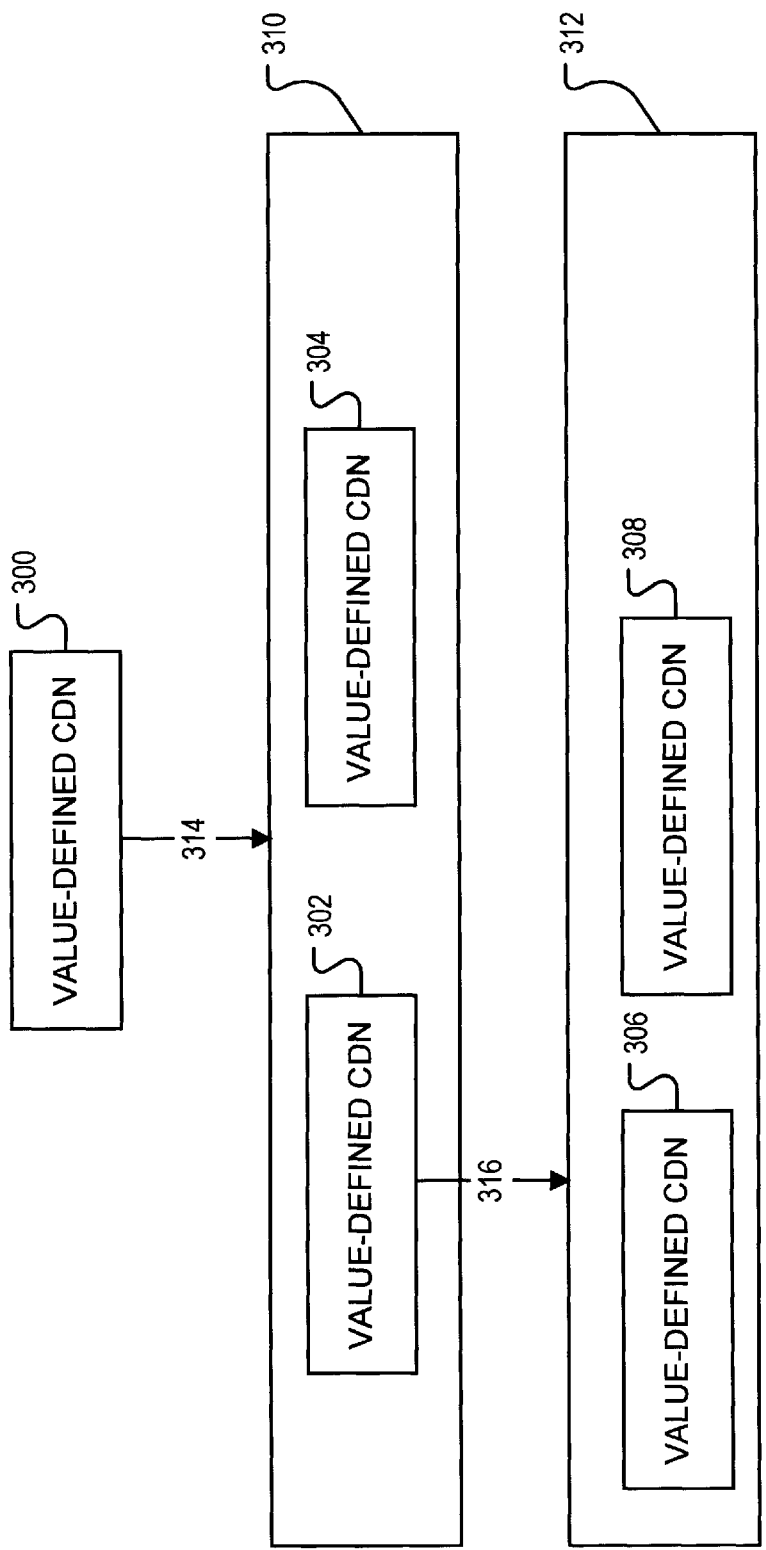
FIG. 3 illustrates a first example implementation of a parent/child relationship between value-defined container definition nodes in an information hierarchy, which is implemented in a first preferred embodiment.
Figure 4:
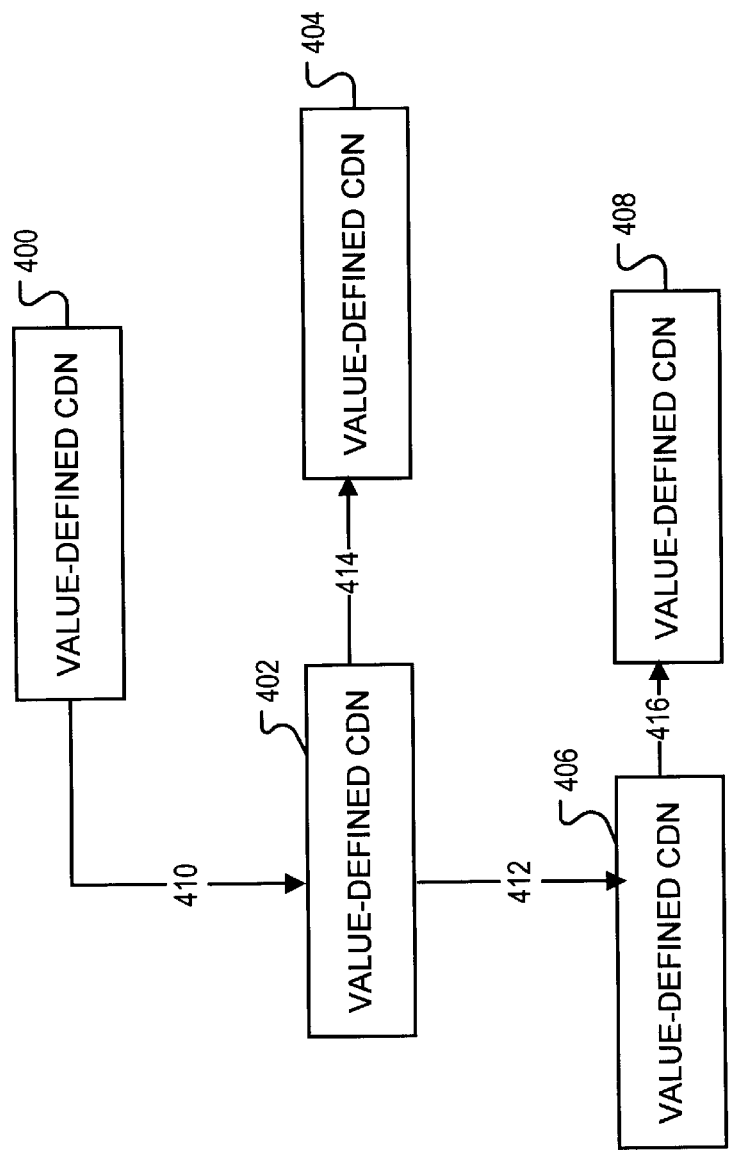
FIG. 4 illustrates a second example implementation of a parent/child relationship between value-defined container definition nodes in an information hierarchy in a first preferred embodiment.

There are various ways of implementing a hierarchical relationship between value-defined container definition nodes. In a preferred embodiment, as illustrated in FIG. 3, a hierarchical relationship is implemented by a value-defined container definition node that comprises a pointer to a list of all of its child nodes. Therefore, value-defined container definition node 300 is a parent node that comprises a pointer 314 to a list 310 of child nodes 302, 304, and value-defined container definition node 302 is a parent node that comprises a pointer 316 to a list 312 of child nodes 306, 308. In another implementation, as illustrated in FIG. 4, a value-defined container definition node comprises a pointer to a child node and/or a pointer to a peer node, rather than a pointer to a list of one or more child nodes. A peer node is a value-defined container definition node at the same level as that of the value-defined container definition node that comprises a pointer to the peer node. A peer node is also a child node of the parent node which comprises a pointer to a child node that is in the same level as the peer node, and in the same container group as the peer node. Therefore, value-defined container definition node 400 is a parent node that comprises a pointer 410 to a child node 402, which comprises a pointer 414 to peer node 404, and value-defined container definition node 402 is a parent node that comprises a pointer 412 to a child node 406, which comprises a pointer 416 to peer node 408. Also, value-defined container definition node 400 is a parent node of peer node 404, and value-defined container definition node 402 is a parent node of peer node 408. In both example implementations, nodes 300, 302, 400, 402 are parent nodes because they reference one or more child nodes; nodes 302, 304, 306, 308, 402, 404, 406, 408 are all child nodes and/or descendants because they are referenced by a parent node, directly or indirectly; nodes 300, 400 are first-level nodes; and nodes 304, 306, 308, 404, 406, 408 are leaf nodes since they do not reference any child nodes. Additionally, nodes 302, 402 are both parent nodes and child nodes, since they are both referenced by a parent node, and they both reference a child node.

Figure 5:
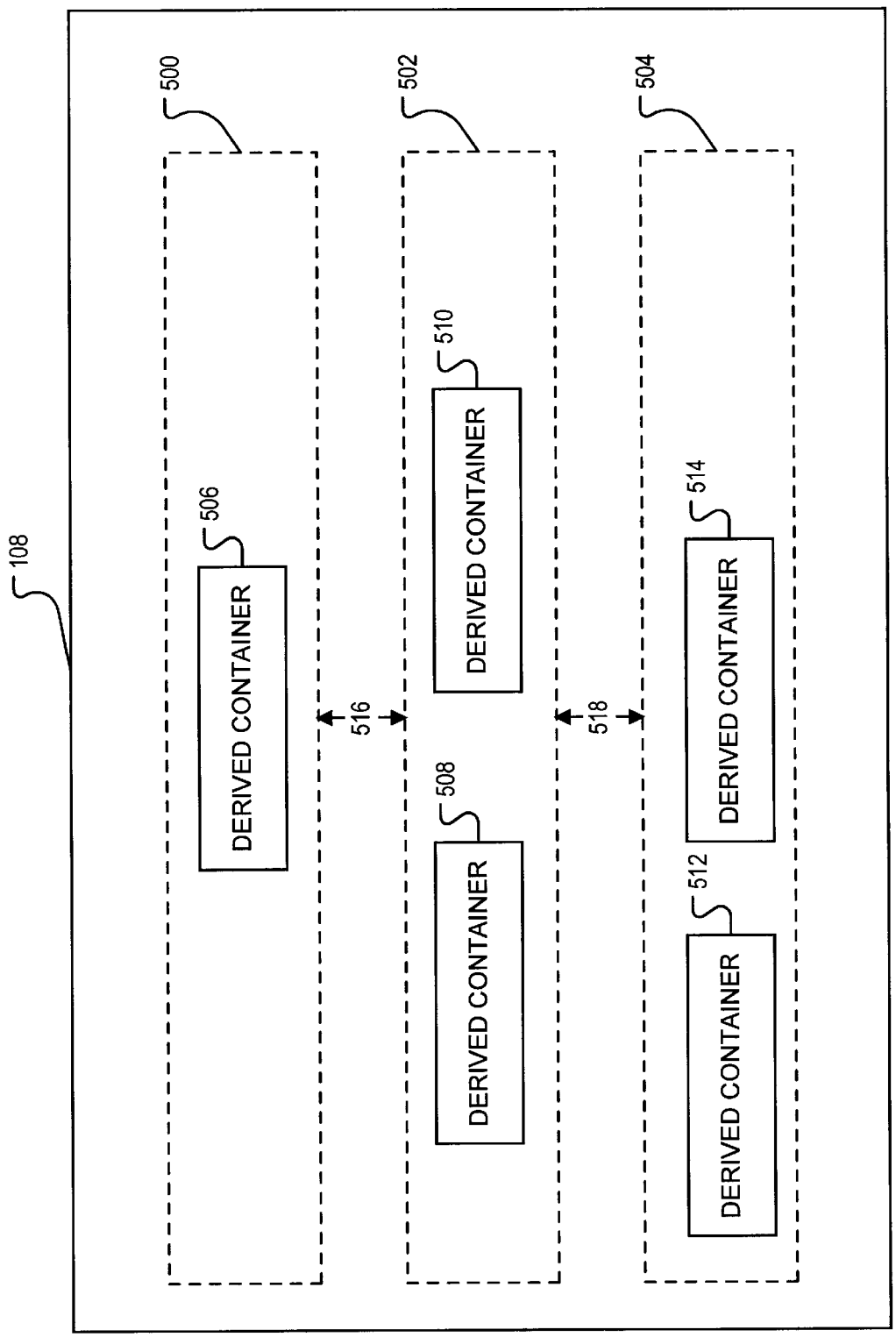
FIG. 5 illustrates derived containers and levels that comprise a derived hierarchy, and the relationships between them in a first preferred embodiment.

As illustrated in FIG. 5, a derived hierarchy 108 in a hierarchy comprises one or more levels 500, 502, 504 and one or more derived containers 506, 508, 510, 512, 514, wherein each level 500, 502, 504 corresponds to a level of information 200, 202, 204 in an information hierarchy 104, and each derived container 506, 508, 510, 512, 514 corresponds to a value-defined container definition node 206, 208, 210, 212, 214 in an information hierarchy 104. Furthermore, a hierarchical relationship 516, 518 exists between a derived container in one level and a derived container in a second level, such that a derived container at a higher level is a parent derived container (also referred to as a parent node) of a derived container at a lower level, and a derived container at a lower level is a child derived container (also referred to as a child node) of a derived container at a higher level. Within a level, one or more derived containers having the same parent derived container (as determined by hierarchical relationships of corresponding value-defined container definition nodes) are referred to as a container group. In a preferred embodiment, a derived container at a lower level provides more detail about a hierarchy than a derived container at a higher level. All nodes in a lower level of information referenced by a given derived container, directly or indirectly, are descendants of the given derived container, and all nodes in a higher level of information than a given derived container of which the given derived container is a descendant, are ancestors of the given derived container. A node in the first level of a derived hierarchy is referred to simply as a first-level derived container, and a node that does not reference any child nodes in a derived hierarchy is referred to as a leaf node. Throughout the description, a derived hierarchy will refer to one which starts at a first level, and includes a first-level derived container, all child nodes of the first-level derived container, and all descendants thereof, including leaf nodes.

Figure 6:
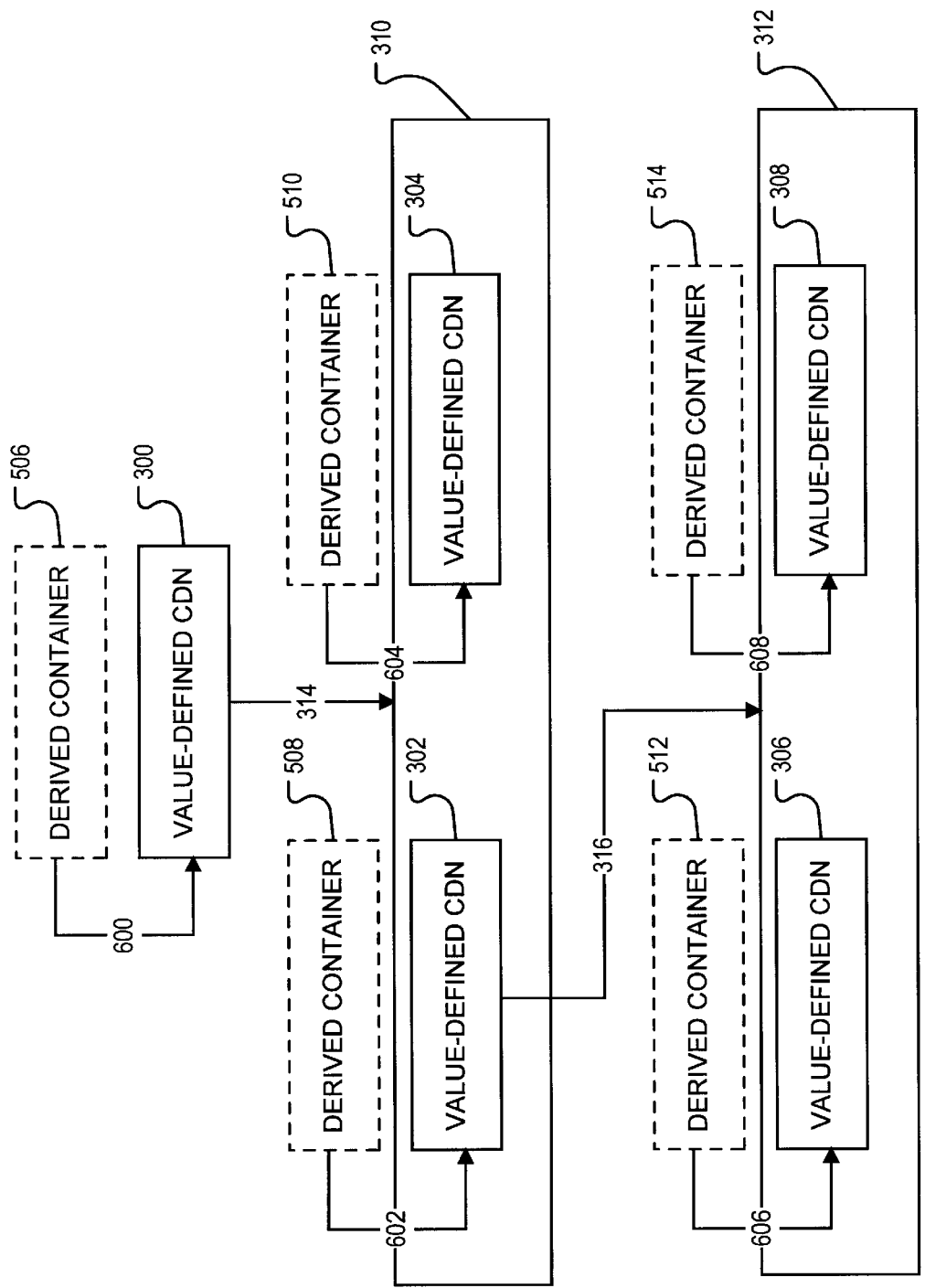
FIG. 6 illustrates the relationship between value-defined container definition nodes in an information hierarchy and corresponding derived containers in a hierarchy in a first preferred embodiment.

A hierarchical relationship between derived containers is implemented by each derived container referencing, or pointing to, a corresponding value-defined container definition node, thereby inheriting the hierarchical characteristics of its corresponding value-defined container definition node. FIG. 6, which shows a derived hierarchy generated in response to a preferred embodiment of a hierarchical relationship between value-defined container definition nodes (FIG. 3), illustrates this point. One of the events that transpires when a derived container is created from its corresponding value-defined container definition node is that a pointer for that derived container is created which points back to the value-defined container definition node it was derived from (hence the term "derived containers"). Therefore, when derived container 506 is created, pointer 600 is created to reference corresponding value-defined container definition node 300; derived container 508 references 602 corresponding value-defined container definition node 302; derived container 510 references 604 value-defined container definition node 304; derived container 512 references 606 corresponding value-defined container definition node 306; and derived container 514 references 608 corresponding value-defined container definition node 308. This creates a chain of pointers to determine one derived container's relationship to one or more other derived containers, such that a hierarchy comprising derived containers (FIG. 5) resembles a corresponding information hierarchy comprising value-defined container definition nodes (FIG. 2). Thus, derived container 506 is a parent node of derived containers 508 and 510 (by virtue of its reference to a corresponding value-defined container definition node and the child value-defined container definition nodes of the corresponding value-defined container definition node), and derived container 508 is a parent node of derived containers 512 and 514.

Using an information model to create a hierarchy allows the user to see two things. First, a hierarchy gives a user the ability to see how information in an information repository is organized and the relationship between information in the information repository via derived containers that represent user-defined categories of the information. Secondly, derived containers in a derived hierarchy allow a user to view logical subsets of information in the information repository. For example, an information model can be used to create a database hierarchy that hierarchically and logically presents information in a database to a user.

In presenting a hierarchical and logical view of information in a database, an information model allows a user to see two things. First, a hierarchy gives a user the ability to see how data in a database is organized and the relationship between data, i.e. fields, in the database. When a derived hierarchy is created in a preferred embodiment, derived containers are displayed such that hierarchical organization is conveyed to the user. In other words, a derived container can convey a category of information in the database as defined by its corresponding value-defined container definition node. A category of information corresponds to a field from the database from which its selection criteria is based, and the field can be used to create a label of the derived container. In a first embodiment, then, each derived container represents a category of information. Furthermore, if a derived container corresponds to a value-defined container definition node in the second level of information in the information model, a user interface can convey this sense of hierarchy by indenting the label of the derived container in a list user interface, or presenting a secondary window in a graphical window interface, for example.

Secondly, derived containers in a hierarchy allow a user to view logical subsets of database records, which are determined by a combined selection criteria attribute of a derived container. Records that are actually extracted from a database using a derived container's combined selection criteria attribute, as will be discussed, are referred to as extracted records. In a preferred embodiment, records are only extracted at a leaf derived container (or a derived container corresponding to a leaf value-defined container definition node), although it is also within the scope of this invention that records may be extracted at any derived container.

In summary, an information model defines how a hierarchy is presented to a user as determined by the contents of one or more derived containers, wherein the contents of a given derived container can comprise child derived containers (showing how information in an information repository is organized), extracted records (showing logical subsets of information), or both. In a preferred embodiment, the contents of a leaf derived container will comprise extracted records, and the contents of all other derived containers will comprise child derived containers, although it is also within the scope of this invention that the other derived containers may comprise both child derived containers and extracted records. Derived containers can take the form of text or graphics, and are displayed by a label attribute of each derived container (to be discussed). Furthermore, derived containers are objects that can be selected to traverse a hierarchy (or to traverse a derived hierarchy), which is the selection of one or more derived containers at one or more levels in order to view a hierarchy (or derived hierarchy). Selecting a derived container can occur when a user actively selects a derived container by its text or graphic, such as by placing a cursor over it and "right-clicking the mouse" or "hitting enter on the keyboard". Selecting a derived container can also occur when a dynamic update of a hierarchy occurs to automatically traverse the hierarchy at specified periods, so that as each level is traversed, one or more derived containers are selected. In presenting derived containers and their contents, a computer monitor is the preferred medium, and any form of a user interface for presenting the view is within the scope of this invention.

Examples include, but are not limited to, a split screen arrangement like that used in Microsoft's® Explorer file browser, where the hierarchy can be displayed on the left and the contents of a selected derived container on the right; and Hewlett-Packard's® OpenView user interface, where there is a separate window for the contents of each derived container selected for viewing.

Throughout the drawing, value-defined container definition nodes in an information model are depicted as objects so that hierarchical relationships between value-defined container definition nodes can be illustrated. The hierarchical relationship used is the relationship illustrated in a preferred embodiment (FIG. 3). Derived containers are also depicted as objects similar in structure to their corresponding value-defined container definition nodes. In figures illustrating user-viewable elements, derived containers are shown only by their label. In these figures, a label can represent an actual derived container in a hierarchy and is the equivalent of a derived container object bearing the same label. These labels can also represent a derived container in a hierarchy structure, which is a blueprint from which a hierarchy is designed, and has the same characteristics of a hierarchy (i.e., it comprises derived containers, levels, etc.). Additionally, it is to be understood that all structures described herein (i.e. information models, hierarchies, information hierarchies, derived hierarchies, value-defined container definition nodes, derived containers, etc.) can have any number of conceivable representations (i.e. tree structures, list representations), as long as they are in conformance with the teachings herein.

Creating an Information Model

In a preferred embodiment, an information model is created for a single information repository that is a database. To better illustrate how this is accomplished, reference will be made to the job placement database of FIG. 7 (hereinafter "the job database") which comprises sample records and values for each record. In the job database, JobNo uniquely identifies each job in the database. Each unique identification of a record is also known as a database object, so that a reference to a particular JobNo record only references one record, whereas a reference to a particular Skills record such as Skills=COMP, which is not a database object, references several records. As is apparent from FIG. 7, it would be a cumbersome job for a user to make use of information in a database just by looking at it. For example, if a user wished to provide a client with all available jobs which required office skills, the user would first have to determine which jobs required office skills, and then have to determine if that job was available (or vice versa). It is a cumbersome task for a sample set of thirteen records, but virtually an impossible task for a database in a practical application which can have hundreds to thousands of records. One way to meaningfully access information from this database is through a custom program and video that could, for instance, display any single job or combination of jobs from the job database. A disadvantage of this method is that a custom program requires an expenditure of time, money, and expertise, which is unnecessary for many uses. For simpler uses, queries could be written for this database. One disadvantage to this is that a query can oftentimes produce unpredictable and incorrect results, due to a user's failure to understand the general organization and make-up of a database. Another disadvantage is that time and space can be wasted as a result of creating multiple queries that produce the same results, queries that are incorrect, and queries that are commonly used.

An information model of the present invention is somewhat of a hybrid between a custom program and a set of queries that is used to create a hierarchy. In creating an information model, the organization of a database or other information repository is customized so that a hierarchy that is meaningful to a user can be created. Although it is "customized", an information model does not require a designer to know a particular programming language, and is therefore much less time consuming and easier to implement. Like queries, value-defined container definition nodes of an information model can comprise one or more selection criteria to determine records to select (via a combined selection criteria of its derived container). However, because of the hierarchical structure of an information model, and therefore the divisibility of information used in selection criteria, queries are easier to assemble and the results are more predictable.

To create an information model, it is useful to define the information model in reference to a desired, or a resulting hierarchy. Therefore, in describing the process of creating an information model, a hierarchy structure refers to the structure of a resulting hierarchy, and its elements (i.e. derived containers, levels) and characteristics thereof refer to that which the resulting hierarchy should possess. As a result, the terms "hierarchy", "hierarchy structure", and "resulting hierarchy" are sometimes used interchangeably.

Assume that an information model is to be created for the hierarchy structure of FIG. 8A, wherein each line is a derived container represented by its label, and each level of indentation represents a level in the hierarchy. This derived hierarchy (hereinafter "derived hierarchy Available" 800), which is a fully traversed hierarchy (i.e., one in which all derived containers of the derived hierarchy have been traversed by a user, or opened-up), could provide a user with useful information about all of the available jobs from the job database. The structure is organized such that as a lower level in the hierarchy is reached, a derived container at that lower level provides more detail about the hierarchy than does a derived container at a higher level. This equates to comprising the same as or a fewer number of records to select than at a higher level. For example, derived container Available 802 in the first level can be defined to comprise all records representing available jobs, so that all records can be extracted except for Job's 702, 704, 705 and 708. (The Available derived hierarchy 800, which comprises derived containers at one or more levels, should not be confused with the Available derived container 802.)

Derived container Tech/Prof 804 in the second level can be defined to refine the hierarchy to only describe available jobs that are also technical/professional (i.e., by adding to its combined selection criteria), such that only three records can be extracted, JobNo's 1000,1006, and 1011. (Although the selection criteria for the Tech/Prof value-defined container definition node 1216 (FIG. 12A) corresponding to the Tech/Prof derived container 804, for example, is (field: Tech/Prof=TRUE) which would generate five records, JobNo's 700, 704, 705, 706, and 711, records that can be extracted at a derived container are determined by the derived container's combined selection criteria, which in this case is ((field:IsAvailable=TRUE) AND (field: Tech/Prof=TRUE)). This combined selection criteria would eliminate JobNo's 1004 and 1005 even though these records satisfy the selection criteria for the value-defined container definition node, leaving JobNo's 1000, 1006, and 1011 as the records that can be extracted at second-level derived container Tech/Prof.) Note that where the repository is a database, each record that can be extracted is a database object. Other derived hierarchy structures that can be defined for the job database are illustrated in FIGS. 8B, 8C, and 8D.

The derived hierarchy structures of FIGS. 8A, 8B, 8C, and 8D can comprise a hierarchy structure individually, or can together comprise a hierarchy structure for the job database. Additionally, these derived hierarchies can in various combinations comprise a hierarchy, as illustrated in FIGS. 8A and 8B, which together comprise a hierarchy. (Practically speaking, in a preferred embodiment, a hierarchy structure would comprise all derived hierarchy structures, as well as other possible derived hierarchy structures not displayed. For simplicity of illustration, however, only two derived hierarchy structures are defined for the sample hierarchy.) A first derived hierarchy, as illustrated in FIG. 8A, describes jobs that are available (hereinafter the "Available derived hierarchy" 800 of FIG. 8A), where the Available derived hierarchy 800 comprises first-level derived container Available 802; second-level derived containers Tech/Prof 804, Office 814, and Trade 818; third-level derived containers Computers 806, Electronics 812, Secretary 816, and Plumber 820; and fourth-level derived containers Repairer 808, Programmer 810, Grade I 822, and Grade II 824. A second derived hierarchy, as illustrated in FIG. 8B, describes technical and professional jobs (hereinafter the "Tech/Prof derived hierarchy" 826 of FIG. 8B), where the Tech/Prof derived hierarchy 826 comprises first-level derived container Tech/Prof 828; second-level derived containers Computers 806 and Electronics 812; and third-level derived containers Repairer 808 and Programmer 810. The Available and Tech/Prof derived hierarchies 800, 826 which comprise derived containers at one or more levels, should not be confused with the Available and Tech/Prof derived containers 802, 828. Likewise, the Available and Tech/Prof information hierarchies, which comprise value-defined container definition nodes at each level of information, should not be confused with the Available and Tech/Prof value-defined container definition nodes.

Figure 9:
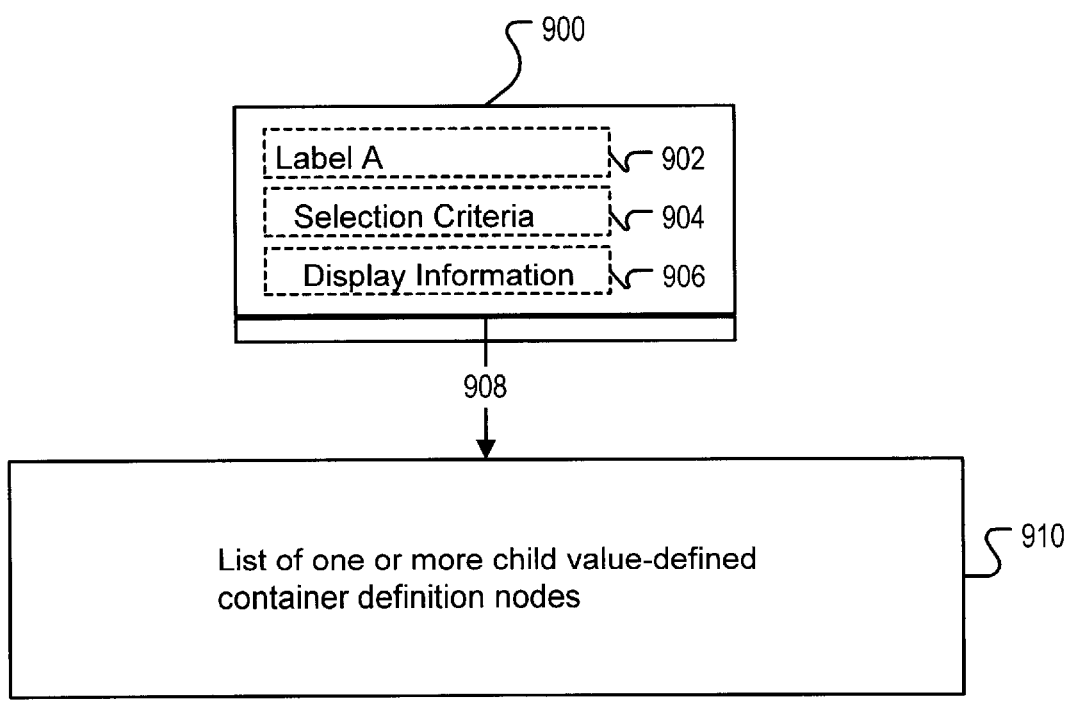
FIG. 9 illustrates a value-defined container definition node structure.

To generate the hierarchy structure of FIGS. 8A and 8B, an information model is created by defining a value-defined container definition node for each derived container of the structure since each derived container in a derived hierarchy corresponds to a value-defined container definition node in an information hierarchy. As illustrated in FIG. 9, a value-defined container definition node 900 is an object that comprises attributes related to creating a hierarchy of information. In a preferred embodiment, a value-defined container definition node 900 comprises a label attribute 902 which is displayed to a user. A value-defined container definition node can also comprise a selection criteria attribute 904 that is used to refine a hierarchy by filtering information, and a display information attribute 906 to determine how a derived container will be displayed to a user to convey hierarchy. The selection criteria attribute can comprise a single statement, or one or more statements joined by a Boolean word (i.e., AND, OR, XOR, etc.). A value-defined container definition node also comprises a pointer 908 to a list 910 of one or more child value-defined container definition nodes (not shown). Whatever the particular attributes of a value-defined container definition node are, they are not limited to those described herein, but are related to creating a hierarchy of information and may be dependent upon the particular information repository being organized.

Figure 10:
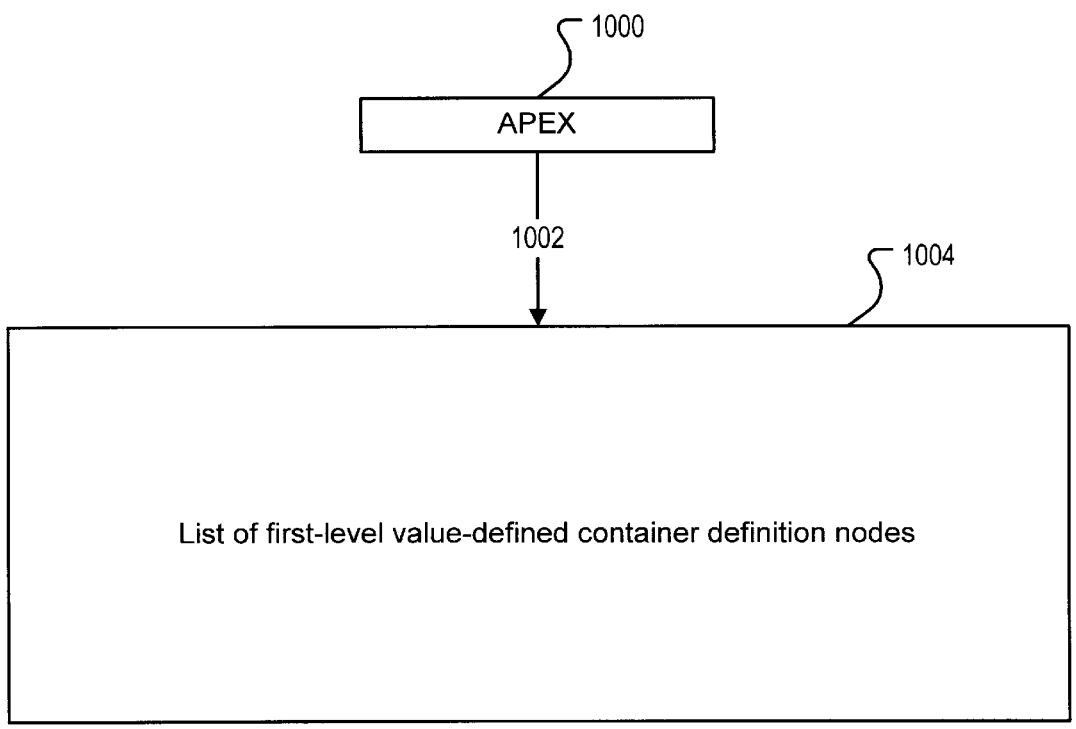
FIG. 10 illustrates an apex of an information model.

Also in a preferred embodiment, as illustrated in FIG. 10, an apex 1000, which is an object comprising a pointer 1002, is created to access a list 1004 of first-level value-defined container definition nodes. In a variation of this embodiment, an apex can also comprise one or more pointers, wherein each pointer references a first-level value-defined container definition node, rather than a list of first-level value-defined container definition nodes. This invention contemplates accessing first-level value-defined container definition nodes in other ways, as well. For instance, rather than obtaining first-level value-defined container definition nodes from an apex, a subroutine could determine what the first-level value-defined container definition nodes are based upon a value-defined container definition node's display information, or other attributes contemplated but not described herein, such as a level attribute.

Figure 11:
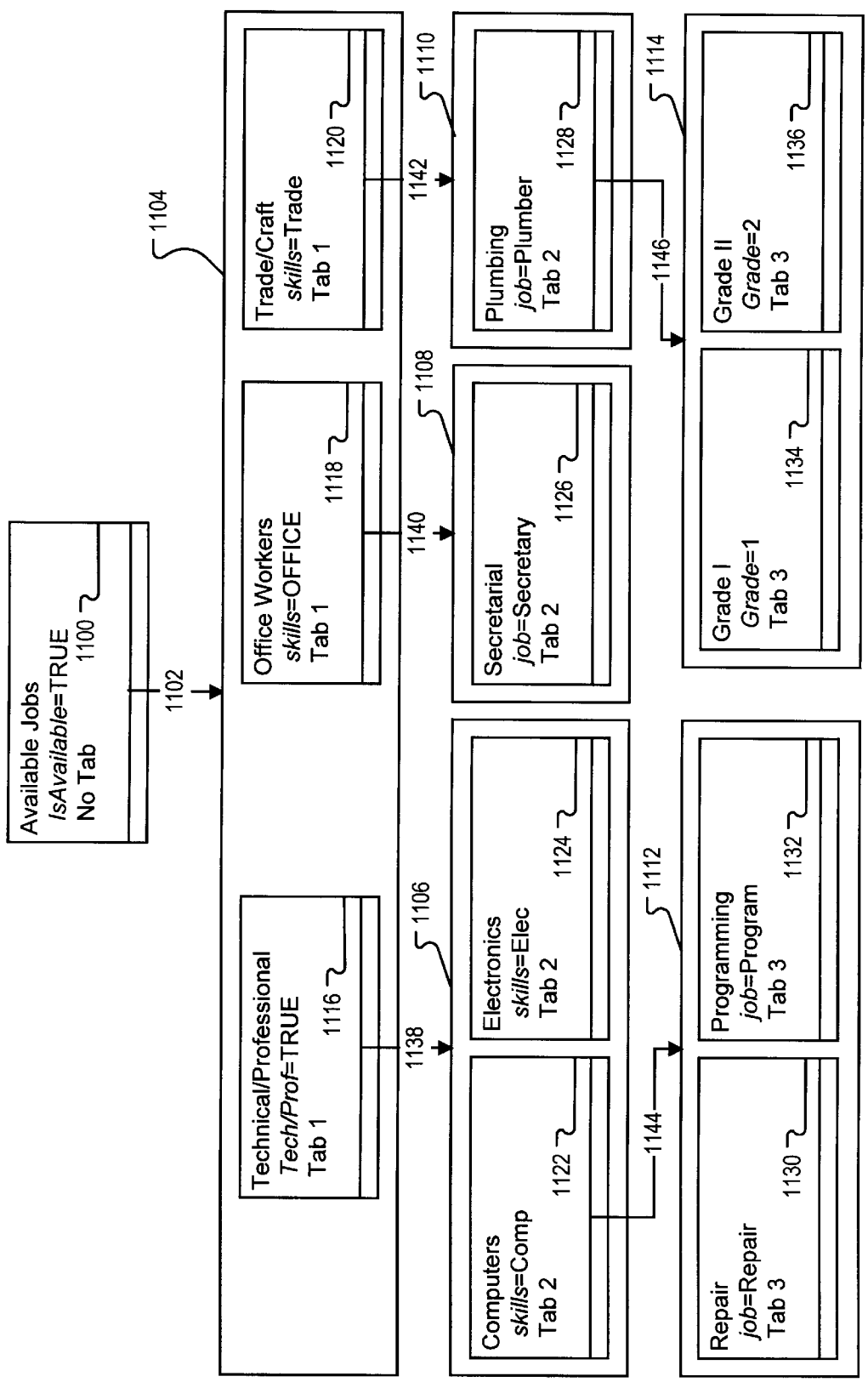
FIG. 11 is a sample information hierarchy for the derived hierarchy of FIG. 8A.
Figure 12:
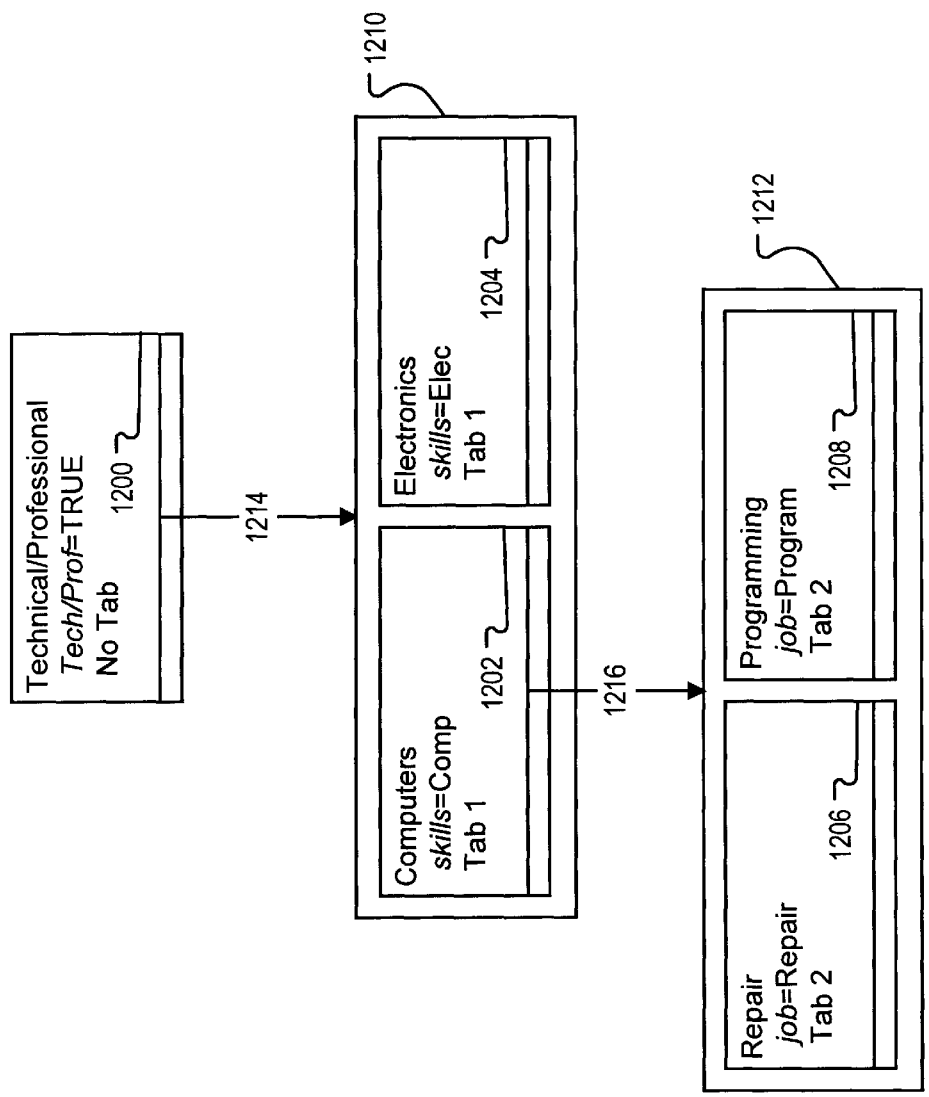
FIG. 12 is a sample information hierarchy for the derived hierarchy of FIG. 8B.

An information model for the hierarchy structure of FIGS. 8A and 8B is illustrated in FIG. 11 and FIG. 12, wherein the information hierarchy of FIG. 11 corresponds to the Available derived hierarchy 800 of FIG. 8A, and the information hierarchy of FIG. 12 corresponds to the Tech/Prof derived hierarchy 826 of FIG. 8B. In FIG. 11, the Available information hierarchy comprises twelve value-defined container definition nodes 1100, 1116, 1118, 1120, 1122, 1124, 1126, 1128, 1130, 1132, 1134, 1136, six of which are parent nodes 1100, 1116, 1118, 1120, 1122, 1128 comprising pointers 1102, 1138, 1140, 1142, 1144, 1146 to a list 1104, 1106, 1108, 1110, 1112, 1114 of child nodes. In FIG. 12, the Tech/Prof information hierarchy comprises five value-defined container definition nodes 1200, 1202, 1204, 1206, 1208, two of which are parent nodes 1200, 1202 comprising pointers 1214, 1216 to a list 1210, 1212 of child nodes. Each label of the value-defined container definition nodes in FIGS. 11 and 12 corresponds to a label of the derived containers in FIGS. 8A and 8B. Display information in a value-defined container definition node further defines how its corresponding derived container will be displayed. For instance, display information described as "Tab 1" will cause the label of that derived container to be tabbed once, like the Office derived container 814 in FIG. 8A. Selection criteria defined for the value-defined container definition nodes will determine, together with the combined selection criteria for a parent derived container, which database records can be extracted at the corresponding derived container when a derived container is selected.

In a preferred embodiment, a selection criteria attribute is used by a program to construct a query. Depending upon the database and database language being used, a value-defined container definition node might not comprise selection criteria if its corresponding derived container is merely descriptive. For instance, assume that a first-level derived container All Jobs has no selection criteria. Since combined selection criteria in a first-level derived container match the selection criteria for the derived container's corresponding value-defined container definition node, the combined selection criteria for All Jobs would render every record in the database a record that can be extracted at its derived container because there is no selection criteria to filter the database records. On the other hand, in a first-level derived container such as Available 802 (FIG. 8A) where selection criteria for its corresponding value-defined container definition node 1100 (FIG. 11) is set to {IsAvailable=TRUE}, combined selection criteria would render records eligible to be extracted only if they match the combined selection criteria (which in this case is also the selection criteria for the value-defined container definition node) for the derived container. In any case, a derived container which is descriptive is called a placeholder. Selection criteria in a value-defined container definition node corresponding to a placeholder can either be: 1) completely omitted, in which case certain databases will understand this to mean that "all records can be extracted at this point"; or 2) written in the appropriate database language so that it will be interpreted to mean "all records can be extracted at this point", such as a designation of <fieldname>=ALL or <fieldname>=*, for example. In the case where selection criteria is completed omitted, the selection criteria attribute of the value-defined container definition node is set to "null" or its equivalent. Selection criteria and combined selection criteria will be described in more detail in the following section.

Using an Information Model

Figure 13:
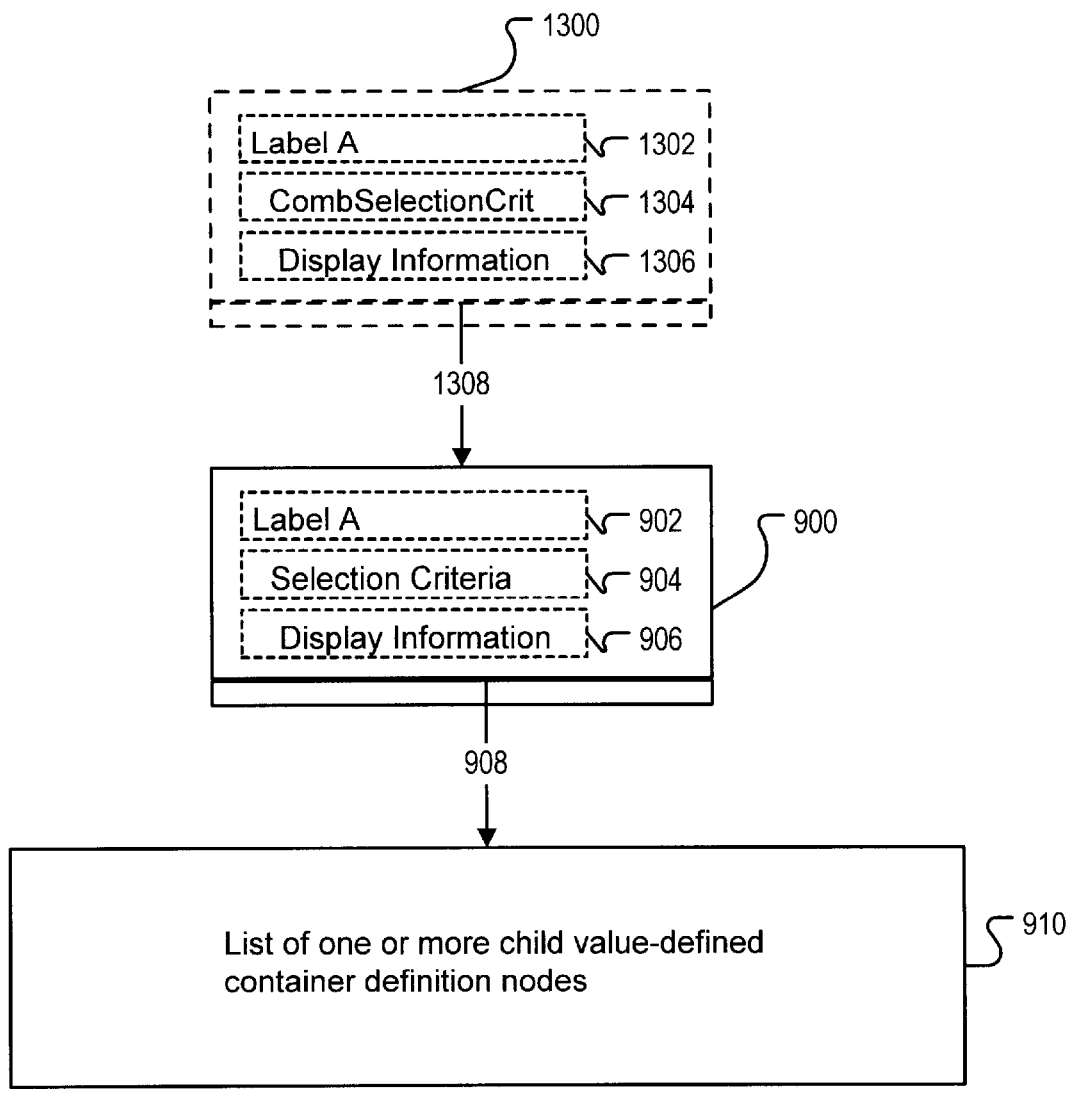
FIG. 13 illustrates a derived container structure and its relationship to a corresponding value-defined container definition node.

When an information repository embodied by an information model is initially accessed, such as when a computer is switched on, or an application utilizing the information repository is accessed, an associated hierarchy is initialized by creating and displaying first-level derived containers. FIG. 10 illustrates how this is accomplished in a preferred embodiment, wherein an apex 1000 points 1002 to a list 1004 of first-level value-defined container definition nodes. The first-level value-defined container definition nodes are then used to create corresponding derived containers. A derived container is similar in form to its corresponding value-defined container definition node, but different in content. As illustrated in FIG. 13, a derived container 1300 inherits attributes from its corresponding value-defined container definition node 900. In a preferred embodiment, these attributes comprise a label attribute 902 which is viewable by a user, and can also comprise a selection criteria attribute 904 to determine which records can be extracted at a derived container; and a display information attribute 906 to determine how a particular derived container is displayed in order to convey hierarchy to a user. A label attribute 902 of a corresponding value-defined container definition node 900 is inherited by a derived container 1300 to create its label attribute 1302, and a display information attribute 906 of a corresponding value-defined container definition node 900 is inherited by a derived container 1300 to create its display information attribute 1306. The selection criteria attribute 904 of a corresponding value-defined container definition node 1300 is inherited by a derived container 1300, along with the selection criteria of ancestral value-defined container definition nodes, to create its combined selection criteria attribute 1304, which determines information that can be extracted at a derived container. A derived container's combined selection criteria is created by combining its implied selection criteria attribute, as inherited from its corresponding value-defined container definition node, with the combined selection criteria attribute of the derived container's parent. A derived container 1300 can also comprise a pointer 1308 to its corresponding value-defined container definition node 900, for determining its contents when the derived container 1300 is selected. Therefore, in maintaining a hierarchical relationship between derived containers in a hierarchy, derived containers 1300 do not access child nodes, if any, directly via a pointer, as do value-defined container definition nodes 900. Instead, a hierarchical relationship between derived containers is maintained by the derived containers 1300 accessing child nodes via pointers 1308 which establish a "map" of where child nodes are located. This "map" is established by a particular derived container's 1300 corresponding value-defined container definition node 900, which points 908 to a list 910 of child nodes (not shown).

Figure 14:
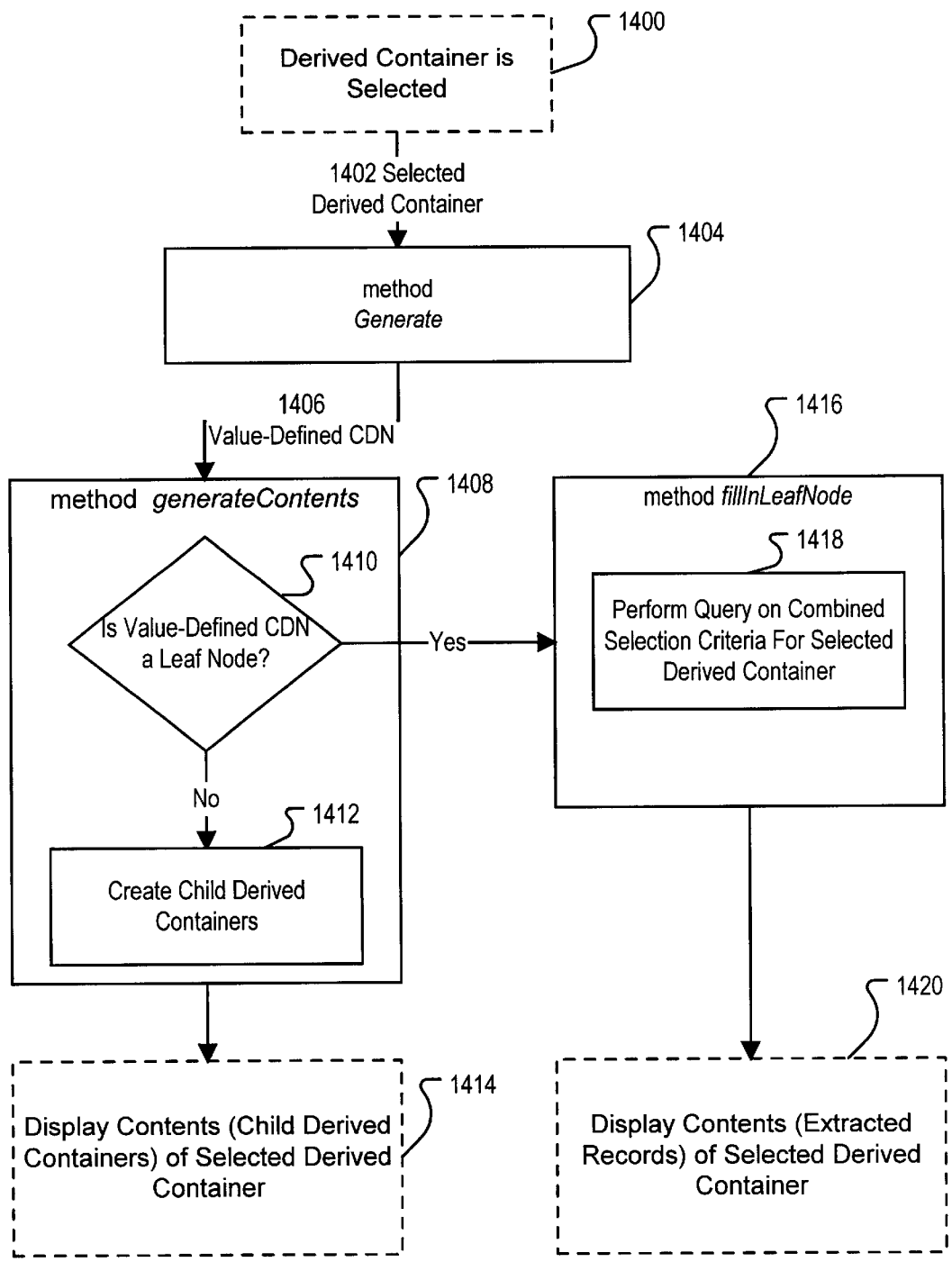
FIG. 14 illustrates a method of using an information model in a first preferred embodiment.

When a derived container is created, its label is displayed in an appropriate format indicated by the derived container's display information. Once the first-level of the hierarchy has been created (i.e. the first-level derived containers have been displayed), a derived container can be selected to traverse the hierarchy. This method is illustrated in FIG. 14. When a derived container is selected 1400, method Generate 1404 is invoked. Method Generate uses the selected derived container's 1402 pointer to retrieve its corresponding value-defined container definition node 1406 from the information model. Method generateContents 1408, which creates the contents of a selected derived container, then uses the corresponding value-defined container definition node 1406 and checks 1410 if the value-defined container definition node is a leaf node. (One way to determine if a value-defined container definition node is a leaf node is to check if it has pointers to child nodes. If it has pointers to child nodes, then it is not a leaf node. There can also be other ways of making this determination.) If the value-defined container definition node 1406 corresponding to the selected derived container 1402 is a leaf node, method fillInLeafNode 1416 is invoked to determine the selected derived container's contents by performing a query based on the selected derived container's combined selection criteria and extracting those records. The contents of the selected derived container are then displayed 1420 to a computer monitor. If the value-defined container definition node corresponding to the selected derived container is not a leaf node, the selected derived container's contents comprise child derived containers, and method generateContents 1408 creates 1412 a child derived container for each child value-defined container definition node that the corresponding value-defined container definition node points to. Each child value-defined container definition node becomes a child derived container, and the selected derived container becomes a parent derived container of child derived containers created therefrom. A child derived container is created by inheriting its corresponding value-defined container definition node's attributes, such as a label attribute, a display information attribute, and a selection criteria attribute; creating a combined selection criteria attribute by using the Boolean operator AND on the child value-defined container definition node's selection criteria and the parent derived container's combined selection criteria; and setting the child derived container's pointer to its corresponding value-defined container definition node. In alternative embodiments, other Boolean operators, such as NOT and OR, may be used on selection criteria to define the hierarchy. The method described above may also be employed, as is or modified, to create first-level derived containers.

Figure 15:
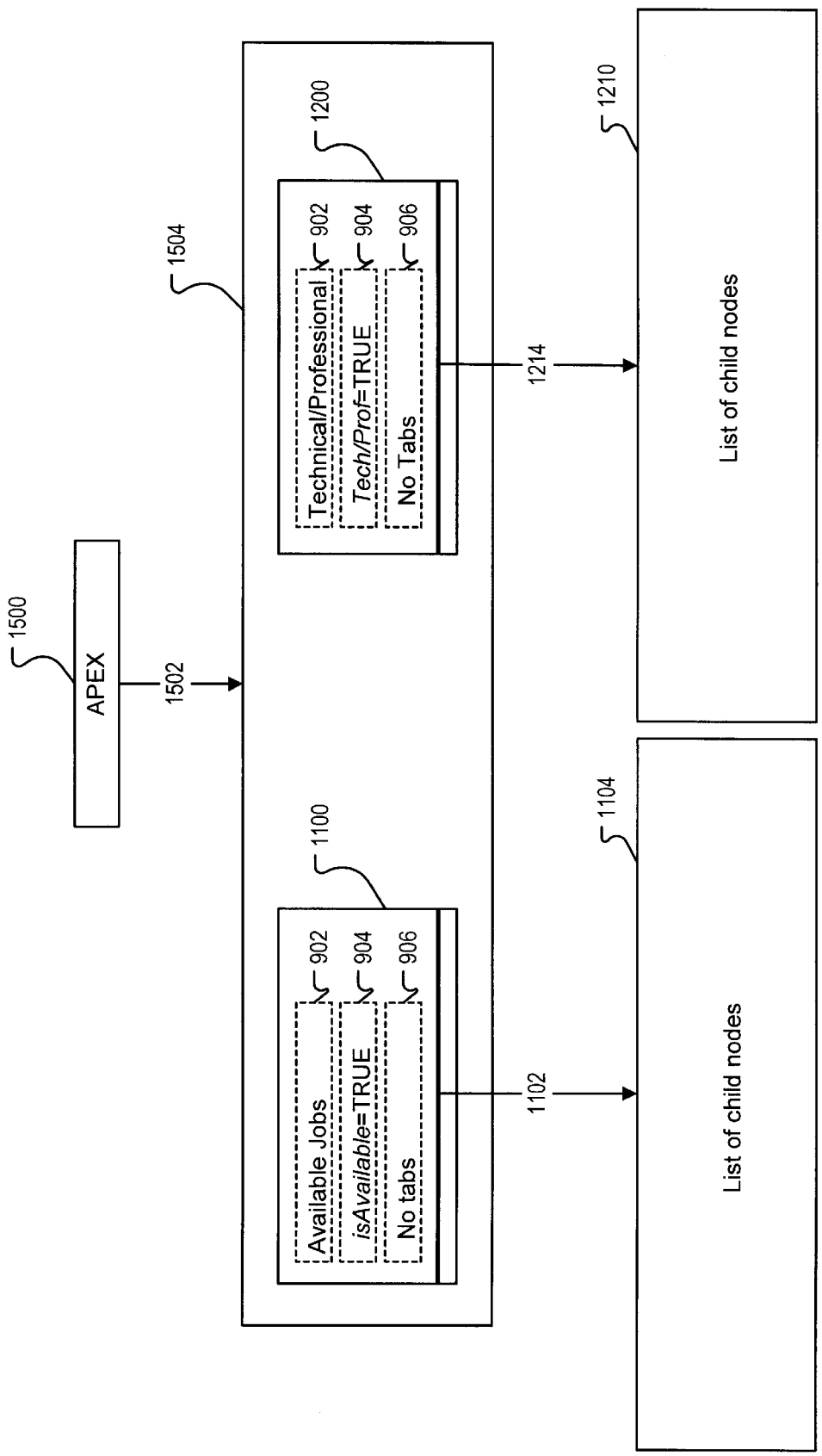
FIG. 15 illustrates an apex and first-level value-defined container definition nodes for the hierarchy represented by FIGS. 8A and 8B.
Figure 16:
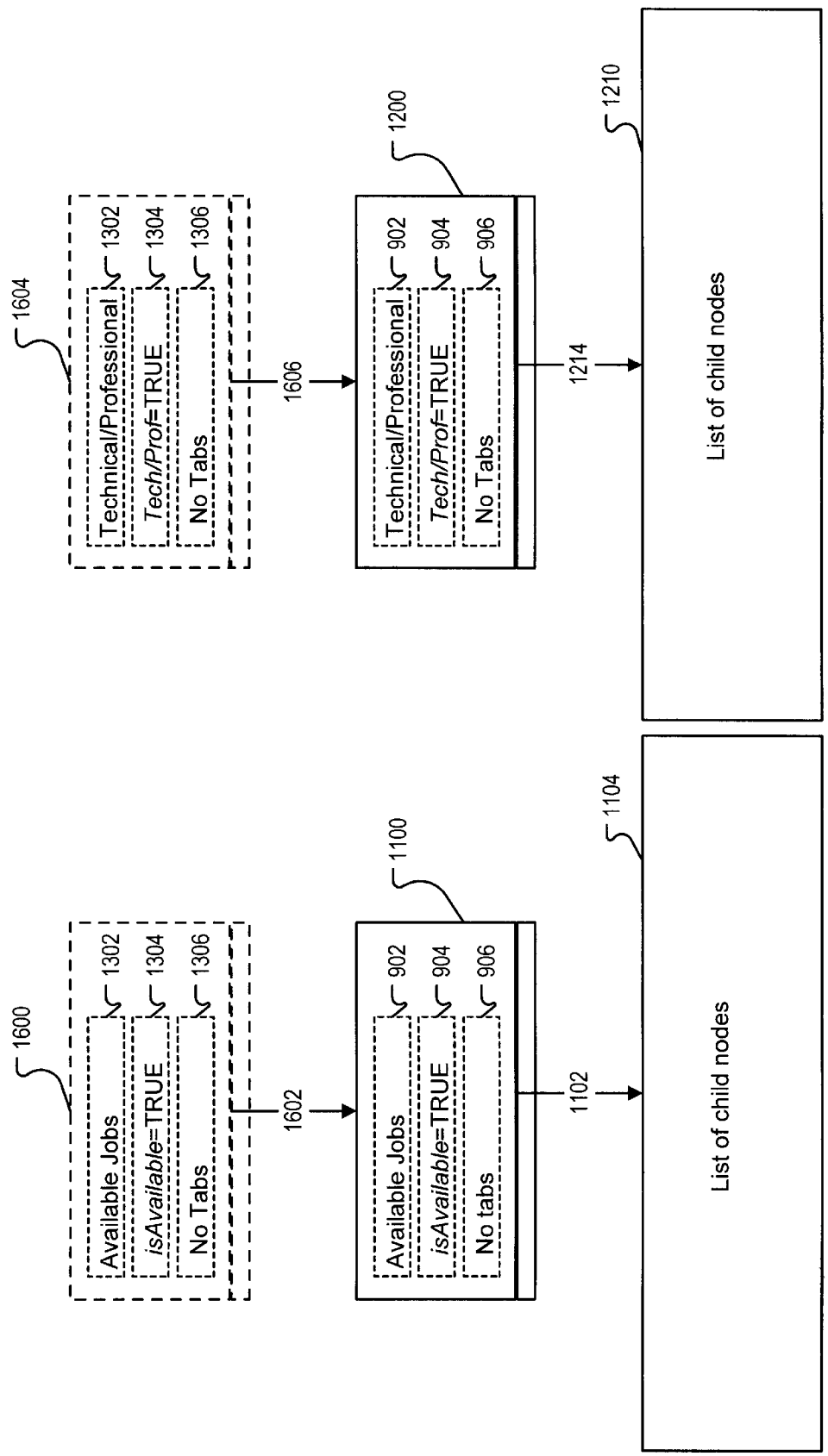
FIG. 16 illustrates first-level derived containers and their corresponding value-defined container definition nodes for the hierarchy represented by FIGS. 8A and 8B.

This method can be illustrated by way of example in a preferred embodiment wherein the information repository is a database. When a database is initially accessed, the apex of the database's information model is accessed to determine first-level derived containers that are displayed. FIG. 15 illustrates this for the hierarchy of FIGS. 8A and 8B, wherein an apex 1500 points 1502 to a list 1504 comprising the Available value-defined container definition node 1100 of FIG. 11 and the Tech/Prof value-defined container definition node 1200 of FIG. 12, each of which comprise pointers 1102, 1214 to a list 1104, 1210 of child nodes. From value-defined container definition node attributes such as the label attribute 902, selection criteria attribute 904, and display information attribute 906, first-level derived containers 1600, 1604 are created as shown in FIG. 16. The attributes 1302, 1304, 1306 of the derived containers 1600, 1604 of FIG. 16 are inherited from the attributes 902, 904, 906 of their corresponding value-defined container definition nodes 1100, 1200. The derived containers 1600, 1604, however, comprise pointers 1602, 1606 to their corresponding value-defined container definition nodes 1100, 1200 rather than pointers to a list of child derived containers.

The Available derived container 1600 shown in FIG. 16 corresponds to the Available derived container 802 (depicted by the derived container's label) in FIG. 8A. The display information 1306 for the Available derived container indicates that the label for the derived container is not to be tabbed, so that when it is displayed, it conveys a first-level of the hierarchy. The combined selection criteria {IsAvailable=TRUE} indicates that JobNo's 1000, 1001, 1003, 1006, 1007, 1009, 1010, 1011, and 1012 of the job database of FIG. 7 can be extracted at this point. Similarly, the Tech/Prof derived container 1604 shown in FIG. 16 corresponds to the Tech/Prof derived container 828 (depicted by the derived container's label) of FIG. 8B. The display information 1306 for the Tech/Prof derived container also indicates that the label for the derived container is not to be tabbed. The combined selection criteria {Tech/Prof=TRUE} indicates that JobNo's 1000, 1004, 1005, 1006, and 1011 of the job database of FIG. 7 can be extracted at this point. In a preferred embodiment, however, records are only extracted if the derived container is a leaf node. Since the Available derived container 802 and the Tech/Prof derived container 828 are not leaf nodes, records are not extracted. In other embodiments, however, records can be extracted at any derived container.

Using the method of FIG. 14, a user can select one of these first-level derived containers to traverse the hierarchy. If, for example, a user selects 1400 first-level derived container Tech/Prof 1604 (FIG. 16) (by its label 828 in FIG. 8B), method Generate 1404 uses the selected derived container's (i.e. derived container Tech/Prof 1604) pointer 1606 to obtain its corresponding value-defined container definition node 1200 which comprises a pointer 1214 to a list 1210 of child nodes. Using this value-defined container definition node, method generateContents 1408 then determines 1410 whether the value-defined container definition node is a leaf node. Since value-defined container definition node Tech/Prof 1200 is not a leaf node, (i.e. it has a pointer 1214 to a list 1210 of child nodes), method generateContents 1408 creates the children of the selected derived container 1402 (i.e. Tech/Prof derived container 1200).

Figure 17:
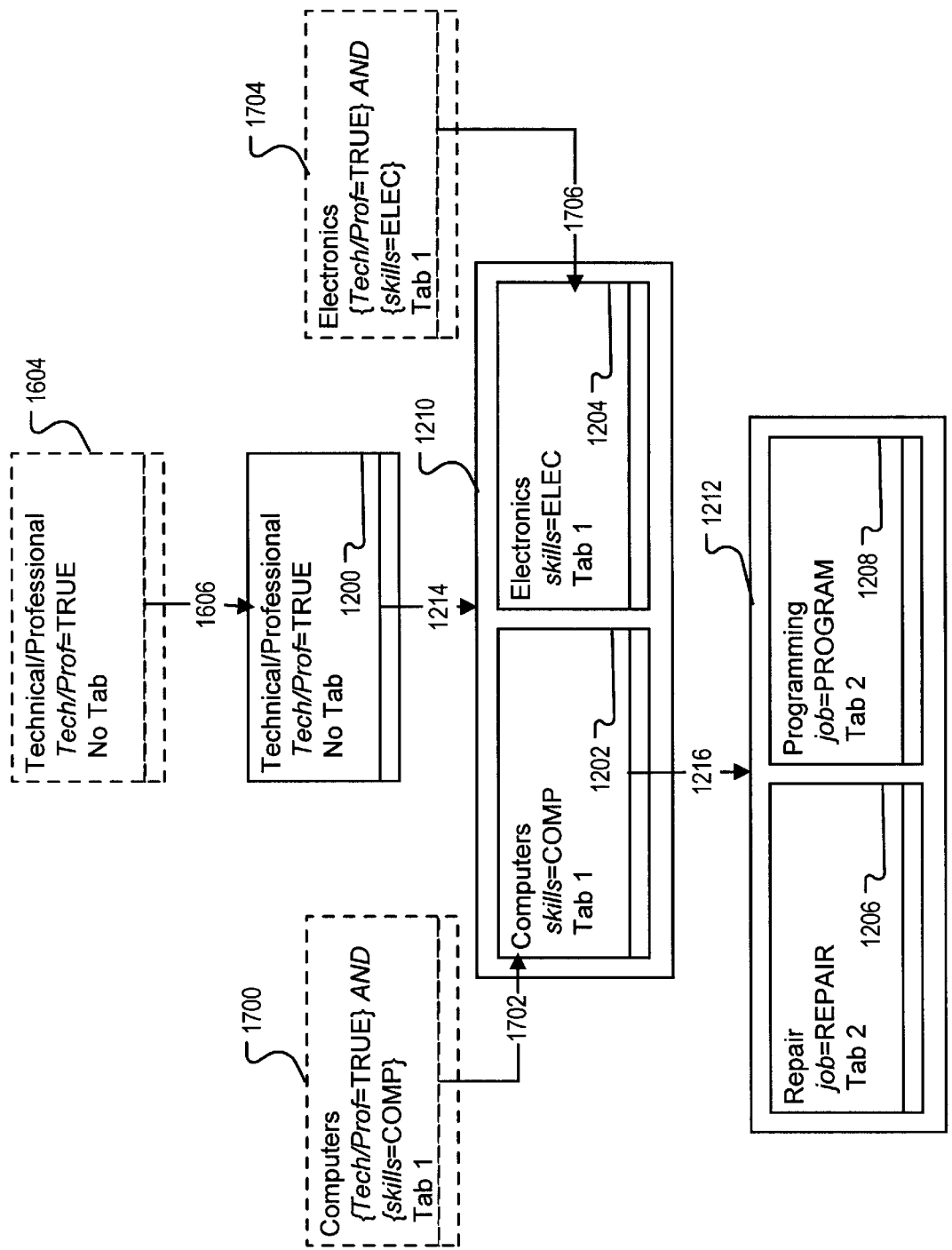
FIG. 17 illustrates derived containers and their corresponding value-defined container definition nodes for the information hierarchy of FIG. 12.

To create child derived containers, method generateContents 1408 looks to the list 1210 of child nodes pointed to 1214 by the selected derived container's 1604 corresponding value-defined container definition node 1248. As illustrated in FIG. 17, child value-defined container definition nodes here include value-defined container definition node Computers 1202 and value-defined container definition node Electronics 1204. Method generateContents then creates child derived containers for each child value-defined container definition node to generate the Computers child derived container 1700 and the Electronics child derived container 1704. The label of the Computers child derived container 1700 and the label of the Electronics child derived container 1704 are displayed in the appropriate format indicated by the display information attribute. In this example, the display information attribute indicates that the labels are to be tabbed once to convey a second level in the hierarchy of FIGS. 8A and 8B. The combined selection criteria of the Computers child derived container 1700 is set by using the Boolean operator AND on the child value-defined container definition node's 1202 selection criteria {skills=COMP} and the parent derived container's 1604 combined selection criteria {Tech/Prof=TRUE}. The combined selection criteria for the child derived container Computers 1700 then becomes {{Tech/Prof=TRUE} AND {skills=COMP}}. The pointer 1702 for the Computers child derived container is then set to point back to its corresponding child value-defined container definition node 1202. The combined selection criteria of the Electronics child derived container 1704 is set by using the Boolean operator AND on the child value-defined container definition node's 1204 selection criteria {skills=ELEC} and the parent derived container's 1604 combined selection criteria {Tech/Prof=TRUE}. The combined selection criteria for the child derived container Electronics 1704 then becomes {{Tech/Prof=TRUE} AND {skills=ELEC}}. Since the Electronics child derived container has no list of child nodes, its pointer is not set.

A user can further traverse the hierarchy by selecting 1400, for example, derived container Electronics 1704 (by its label 836 in FIG. 8B). Method Generate 1404 uses the selected derived container (i.e. the Electronics derived container 1704) pointer 1706 to obtain the selected derived container's corresponding value-defined container definition node 1204. Using this value-defined container definition node 1204, generateContents 1408 then determines 1410 whether the value-defined container definition node is a leaf node. Since the Electronics value-defined container definition node 1204 is a leaf node, (i.e. it does not comprise a pointer to a list of child nodes), method fillInLeafNode 1416 is invoked to perform a query 1418 based on the combined selection criteria for the selected derived container to extract records for display. As determined previously, the combined selection criteria for the selected derived container Electronics 1704 is {{Tech/Prof=TRUE} AND {skills=ELEC}}. Method fillInLeafNode 1416 then displays extracted records 1420 that result from the query. Here, only JobNo 1011 is an eligible record that will be displayed, because this is the only record where the combined selection criteria {{Tech/Prof=TRUE} AND {skills=ELEC}} are satisfied.

Second Preferred Embodiment

Introduction and Definitions

In a second preferred embodiment, an information model is used to create an extensible hierarchy. An extensible hierarchy is a hierarchy in which one or more container groups (i.e. a group of derived containers that reference the same parent derived container) in a hierarchy are extensible, that is, a hierarchy can be expanded such that at least one group of derived containers in a given container group represents all values of a particular category defined by a corresponding value-defined container definition node in a given repository. To achieve this relationship using an information model, a group of derived containers in a container group is generated from a type-defined container definition node (to be discussed) to form an extensible container group. An extensible container group, therefore, comprises related derived containers, or a group of derived containers in the same container group where each derived container shares at least one attribute definition which is defined by a variable attribute of a corresponding type-defined container definition node. As a result of this, each derived container in a group of related derived containers also shares the same parent/ancestors, and comprises the same children/descendants (the same in that they are derived from the same set of type-defined container definition nodes, but are different derived containers). Moreover, a container group may comprise more than one group of related derived containers.

This second embodiment is preferred where a particular category of information in a hierarchy is to represent all the values of a given field in a database, and/or the most current values in the database, without having to change or add value-defined container definition nodes. However, this may not be the preferred method where, for instance, a hierarchy is customized for a particular group of users who may not need to see all values represented in the database. The key differences of using an information model to create a hierarchy of information in a second preferred embodiment are:

Type-defined container definition nodes are used rather than value-defined container definition nodes;

There can be a one-to-many relationship between a type-defined container definition node and derived containers. Therefore, there can be a one-to-many relationship between an information hierarchy and derived hierarchies;

Steps in creating a hierarchy in a second preferred embodiment are different.

The description of a first preferred embodiment described above is hereby incorporated except as distinguished in the following paragraphs.

Figure 18:
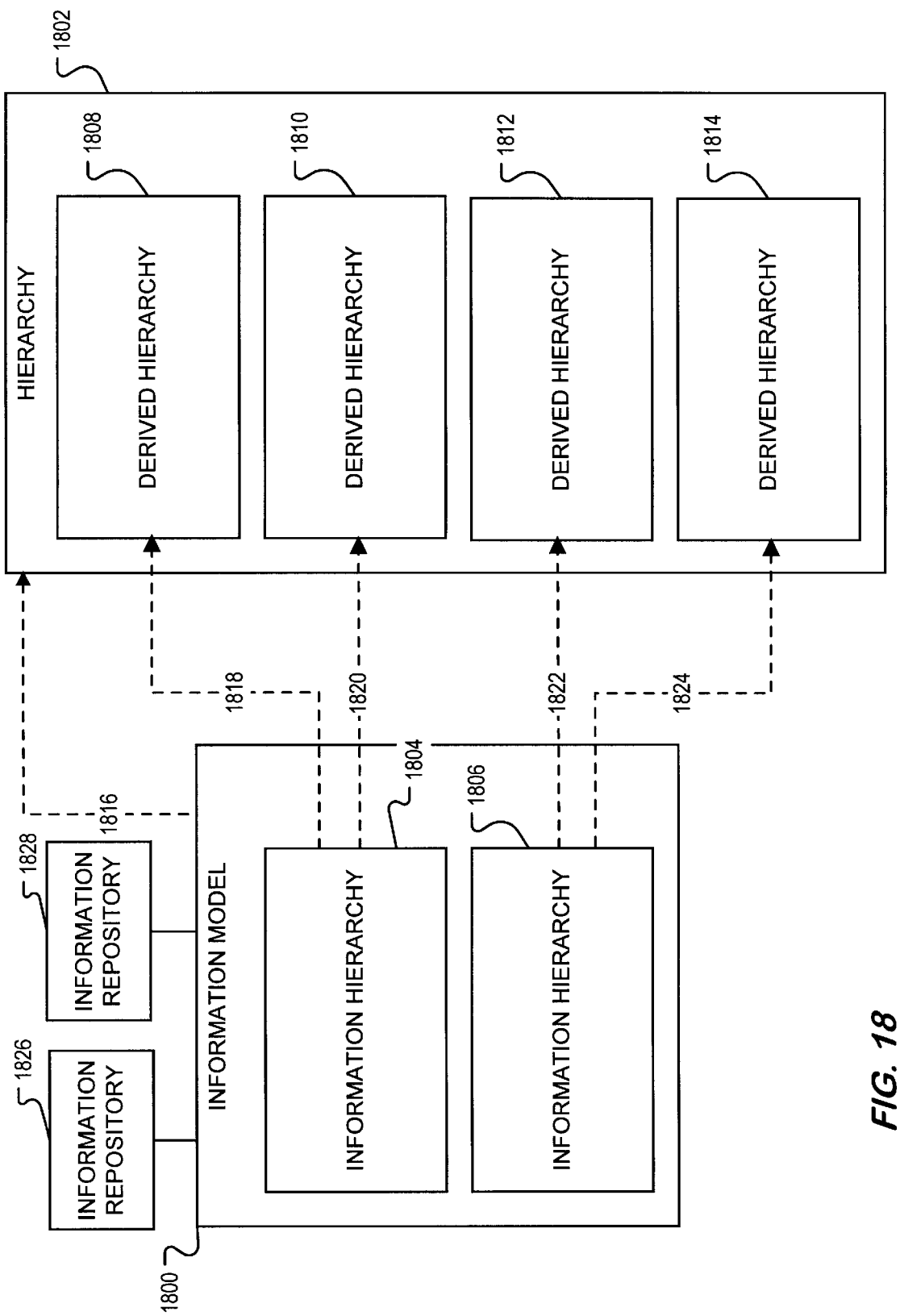
FIG. 18 illustrates the relationship between an information model and a hierarchy in a second preferred embodiment.

In a second preferred embodiment, as illustrated in FIG. 18, an information model 1800 is created for one or more information repositories 1826, 1828, and corresponds 1816 to a hierarchy 1802, but an information hierarchy 1804, 1806 can correspond 1818, 1820, 1822, 1824 to one or more derived hierarchies 1808, 1810, 1812, 1814 (in other words, an information hierarchy can generate more than one first-level derived container, or can have multiple hierarchies of derived containers corresponding to the same hierarchy of type-defined container definition nodes). In a second preferred embodiment, then, multiple derived containers can correspond to the same category of information since by definition, a derived container's category of information is defined by a corresponding value-defined or type-defined container definition node.

The characteristics, relationships, and functions of type-defined container definition nodes remain the same as value-defined container definition nodes in a first preferred embodiment, but type-defined container definition nodes in a second preferred embodiment are defined differently than value-defined container definition nodes of a first preferred embodiment. A type-defined container definition node comprises a type attribute and variable attribute that together determine inheritable attributes, or attributes that are inherited by a given derived container, and then used to determine a derived container's actual attributes. In a second preferred embodiment, type-defined container definition nodes can be a value-based container definition node or an attribute-based container definition node.

In a value-based container definition node, inheritable attributes are pre-defined in the same way a value-defined container definition node in the first preferred embodiment, supra, is. A value-based container definition node, therefore, comprises attributes that correspond to one derived container and are directly inherited by one derived container. In an attribute-based container definition node, inheritable attributes are dynamically determined such that the dynamically determined attributes can correspond to one or more derived containers and can be inherited by one or more derived containers. Thus, whereas a one-to-one relationship exists between a value-defined container definition node and a derived container, a one-to-many relationship can exist between an attribute-based container definition node and one or more derived containers.

Figure 19:
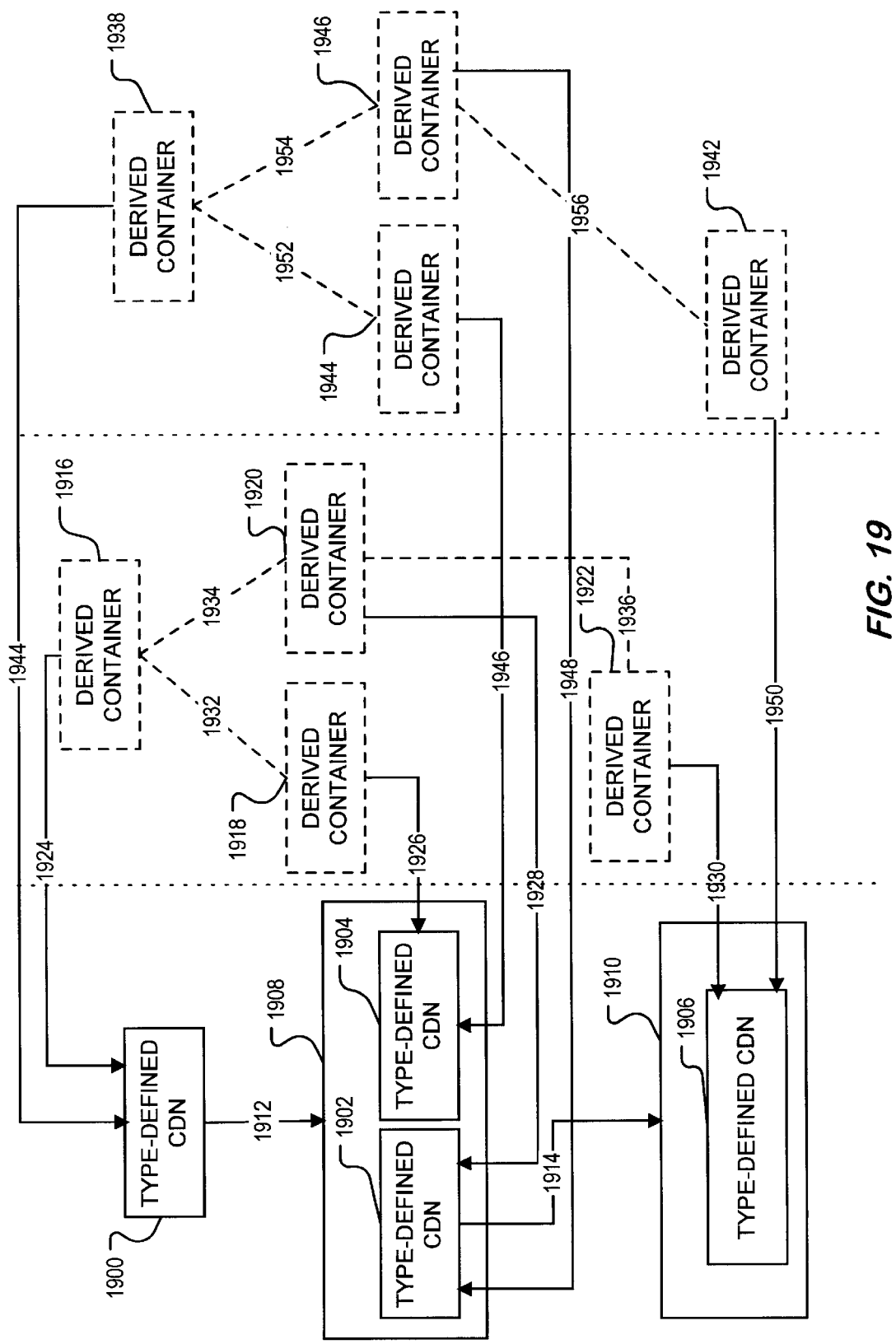
FIG. 19 illustrates the relationship between type-defined container definition nodes in an information hierarchy and corresponding derived containers in a hierarchy in a second preferred embodiment.

In this respect, a hierarchical relationship between derived containers is implemented by one or more derived containers referencing one corresponding type-defined container definition node. In FIG. 19, (which shows a derived hierarchy generated in response to a first preferred embodiment of a hierarchical relationship between value-defined container definition nodes, similarly applicable to type-defined container definition nodes) parent type-defined container definition node 1900 references 1912 a list 1908 of one or more child type-defined container definition nodes 1902, 1904; and type-defined container definition node 1902 references 1914 a list 1910 comprising child type-defined container definition node 1906. One of the events that transpires when one or more derived containers is created from a corresponding type-defined container definition node is that a pointer for each derived container is created which references the type-defined container definition node (referred to as a Type-defined CDN in FIG. 19) that each respective derived container was derived from.

Therefore, when derived containers 1916, 1938 are created, pointers 1924, 1946, respectively, are created to reference corresponding type-defined container definition node 1900, which is an attribute-based container definition node since it generates more than one derived container. Descendant type-defined container definition nodes, if any exist, of a type-defined container definition node generate one set of derived containers for each derived container of its parent type-defined container definition node, where a set of derived containers comprises one derived container if a corresponding type-defined container definition node is value-based, or one or more derived containers if a corresponding type-defined container definition node is attribute-based. Therefore, since type-defined container definition node 1902 is a descendant of type-defined container definition node 1900 that is attribute-based, it will generate a set of derived containers for each derived container of its parent. Since its parent 1900 is referenced by two derived containers 1916 and 1938, two derived containers are generated from type-defined container definition node 1902: derived container 1920 which comprises a pointer 1928 back to type-defined container definition node 1902, and derived container 1942 which comprises a pointer 1950 back to type-defined container definition node 1902. Type-defined container definition node 1904 is also a descendant of attribute-based container definition node 1900, and will generate derived container 1918 which comprises a pointer 1926 back to type-defined container definition node 1904, and derived container 1940 which comprises a pointer 1948 back to type-defined container definition node 1904. Finally, type-defined container definition node 1906 is also a descendant of attribute-based container definition node 1900, and will generate derived container 1922 which comprises a pointer 1930 back to type-defined container definition node 1906, and derived container 1944 which comprises a pointer 1952 back to type-defined container definition node 1906.

This creates a chain of pointers to determine one derived container's relationship to one or more other derived containers. As depicted in FIG. 19, derived container 1916 indirectly references 1932, 1934 derived containers 1918 and 1920, and is therefore a parent of those derived containers, by virtue of derived container 1916's corresponding type-defined container definition node 1900 referencing 1912 derived containers 1918 and 1920's corresponding type-defined container definition node 1904. Similarly, derived container 1938 indirectly references 1954, 1956 derived containers 1940 and 1942, and is therefore a parent of those derived containers, by virtue of derived container 1938's corresponding type-defined container definition node 1900 referencing 1912 derived containers 1940 and 1942's corresponding type-defined container definition node 1902. Also, derived container 1920 indirectly references 1936 derived container 1922, and is therefore a parent of that derived container, by virtue of derived container 1920's corresponding type-defined container definition node 1902 referencing 1914 derived container 1922's corresponding type-defined container definition node 1906. Similarly, derived container 1942 indirectly references 1958 derived container 1944, and is therefore a parent of that derived container, by virtue of derived container 1942's corresponding type-defined container definition node 1902 referencing 1914 derived container 1942's corresponding type-defined container definition node 1906.

As illustrated in FIG. 9, a value-defined container definition node 900 is an object that comprises attributes related to creating a hierarchy of information, and can comprise a pointer 908 to a list 910 of child nodes. In a first preferred embodiment, a value-defined container definition node 900 comprises a label attribute 902, and can comprise a selection criteria attribute 904, and a display information attribute 906, which are all inheritable attributes.

Figure 20:
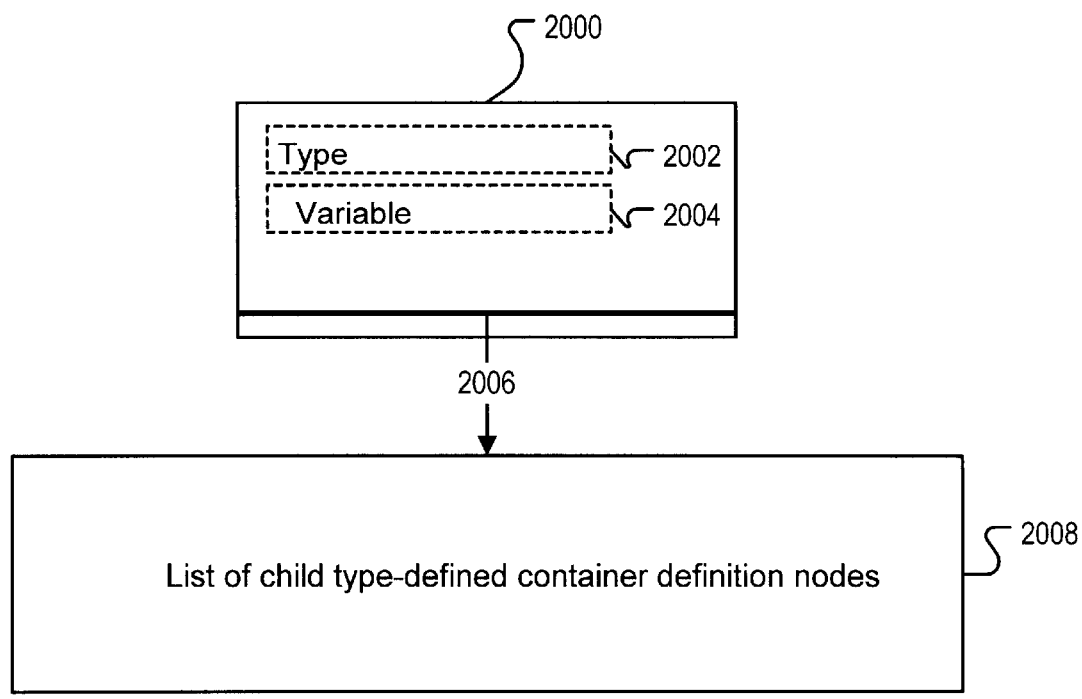
FIG. 20 illustrates a type-defined container definition node structure in a second preferred embodiment.
Figure 21:
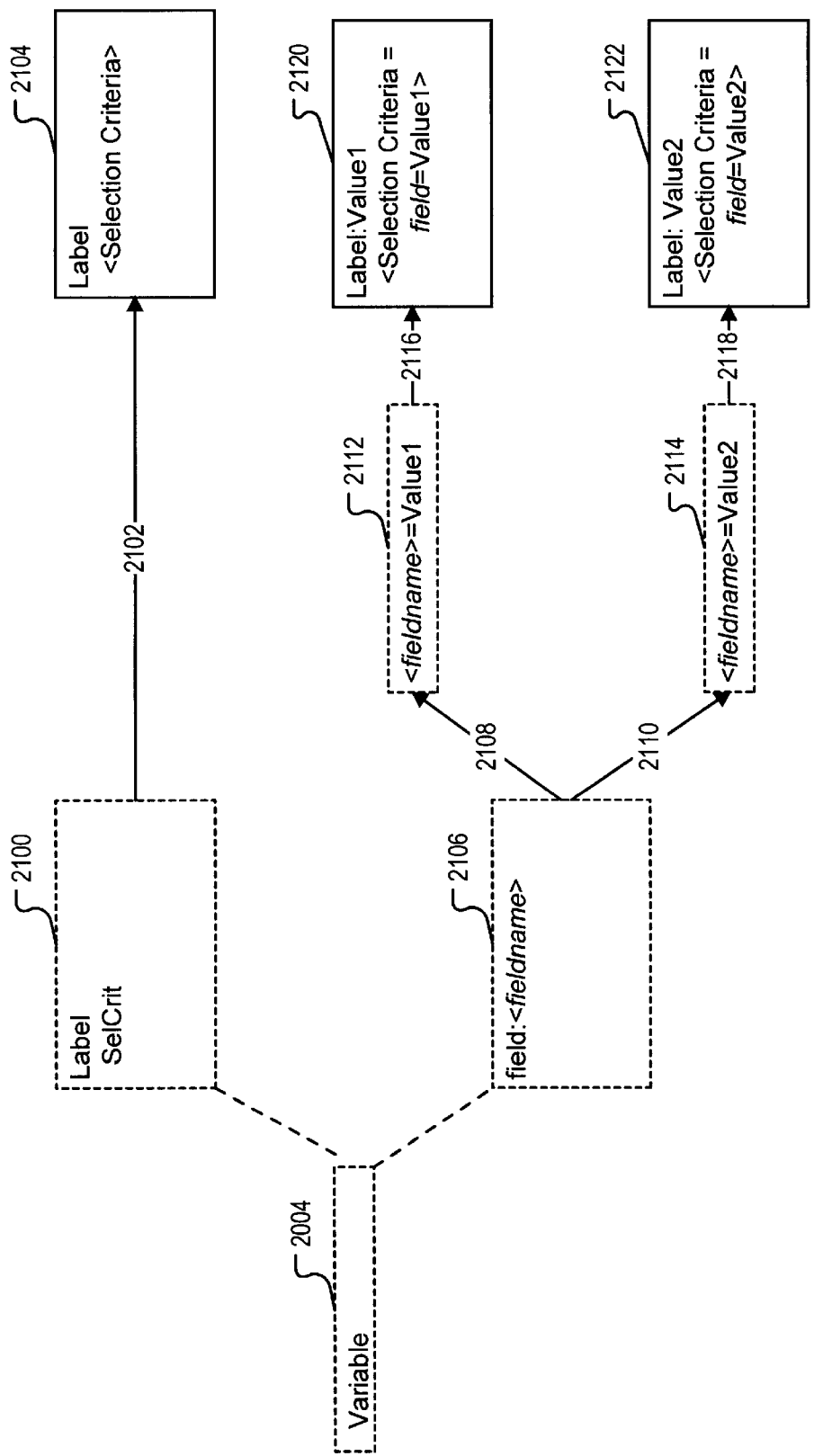
FIG. 21 illustrates a Variable field of a type-defined container definition node in a second preferred embodiment.

As illustrated in FIG. 20, a type-defined container definition node 2000 is also an object that comprises attributes 2002, 2004 related to creating a hierarchy of information, and can also comprise a pointer 2006 to a list 2008 of child type-defined container definition nodes. A type-defined container definition node 2000, however, comprises a type attribute 2002 and a variable attribute 2004. The inheritable attributes of a type-defined container definition node are determined by the type-defined container definition node type, which is defined by its type attribute 2002, and may comprise attributes such a label attribute, a selection criteria attribute, and a display information attribute, as discussed in a first preferred embodiment. In a value-based container definition node, as shown in FIG. 21, the variable attribute 2004 comprises inheritable attributes 2100, such as a label attribute and a selection criteria attribute, that are unique to and inherited 2102 by one derived container 2104. In an attribute-based container definition node, the variable attribute 2004 comprises a field 2106 that is used to determine 2108, 2110 one or more values 2112, 2114 used to create inheritable attributes inherited 2116, 2118 by one or more derived containers 2120, 2122. In derived containers 2104, 2120, and 2122, a label attribute is inherited to create a derived container's label attribute, and a selection criteria attribute is inherited to create a derived container's combined selection criteria attribute, where a selection criteria attribute is an implicit attribute of a derived container. (A display information attribute can also be part of the variable attribute and similarly created.) The method used to generate the inheritable attributes and to create the one or more derived containers will be described in more detail.

Creating an Information Model with Type-defined Container Definition Nodes

Creating an information model for an extensible hierarchy requires strategic planning and careful analysis of the database being organized. While value-based container definition nodes tend to produce straightforward results because of the one-to-one relationship with derived containers, attribute-based container definition nodes are less predictable. The important thing to remember about attribute-based container definition nodes is that they can generate an unpredictable number of derived containers and unknown values, both of which are dependent on the contents and organization of a particular database. To effectively create an extensible hierarchy, therefore, the following analysis should be made to determine whether a particular container group (and, therefore, the hierarchy) is extensible:

Can derived containers in a container group be defined by the same field attribute? Since a type-defined container definition node in this embodiment comprises a field of the variable attribute, derived containers generated from the same type-defined container definition node are defined by the same field attribute. Therefore, if derived containers cannot share the same field attribute, they cannot be defined by the same type-defined container definition node, and the container group is not extensible.

Since derived containers generated from the same attribute-based container definition node share the same parent/ancestors and children/descendants, each derived container generated from the same attribute-based container definition node should be hierarchically related to its parent/ancestors (top level) and its children/descendants (bottom level). Thus, the following should also be analyzed:

Can all values of the field attribute be represented so that top level hierarchical relationships are maintained? In other words, every derived container in the same container group should be logical children/descendants of their parents/ancestors.

If so, are bottom level hierarchical relationships maintained? In other words, every derived container in the same container group should logically comprise the same child derived containers and descendants.

Moreover, if other derived containers that are defined by the same field attribute are added to the container group, hierarchical relationships should be maintained such that the additional derived containers are logical children/descendant derived containers, and logically comprise the same children/descendant derived containers.

For example, when creating an information model for an extensible hierarchy of the hierarchy structure of FIGS. 8A and 8B, and the database of FIG. 7, one consideration might be whether the container group represented by derived container Computers 806, 830 and derived container Electronics 812, 836 is extensible. In making this determination, the following analysis could be made:

Can derived container Computers 806, 830 and derived container Electronics 812, 836 both be defined by a common field attribute? In reference to the job database of FIG. 7, both derived containers can be defined by field:skills.

If all the values for the field attribute skills are represented in this container group, values OFFICE and TRADE would be represented, and top level hierarchical relationships would be lost because values OFFICE and TRADE are not, at the very least, logical children of parent derived container Tech/Prof 804.

If all the values for the field attribute skills are represented in this container group, bottom level hierarchical relationships would be lost because not all derived containers can logically comprise the same children/descendants. For instance, Repairer 808, 832 and Programmer 810, 834, which are child derived containers of Computers 806, 830, would not be logical children of OFFICE nor of TRADE because repair and programming jobs would not logically be classified as an office or a trade skill. Similarly, they would not be logical children of ELECTRONICS.

Using the same analysis on other container groups in FIGS. 8A and 8B, it can be determined that an extensible hierarchy should not be created for lack of hierarchical relationship in the container groups. As a result, the hierarchy structure of FIGS. 8A and 8B is not a good candidate for creating an extensible hierarchy.

Figure 23:
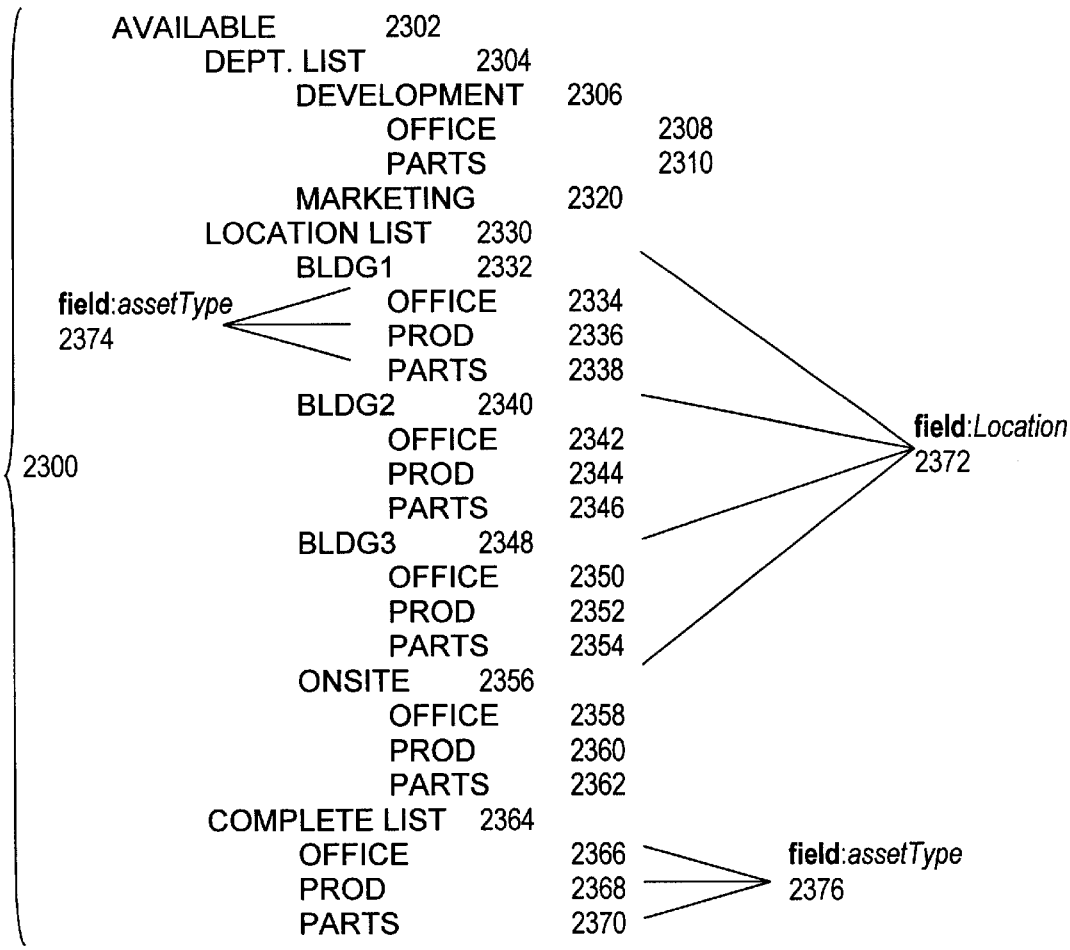
FIG. 23 illustrates a sample hierarchy structure for the database of FIG. 22.

A hierarchy structure that is more amenable to an extensible hierarchy is shown in FIG. 23, which illustrates a hierarchy for the database of FIG. 22. In FIG. 23, derived hierarchy Available 2300 comprises first-level derived container Available 2302. In analyzing whether this hierarchy can be created as an extensible hierarchy, each container group should be analyzed to determine if the container group is extensible. This analysis will only consider the extensibility of a container group at face value, and will not consider whether certain modifications would make a container group extensible (with the exception of adding values from a database based on the same field attribute).

Second-level derived containers Dept. List 2304, Location List 2330, and Complete List 2364 are not based on a same field attribute (their selection criteria is NULL, as will be illustrated). Therefore, this container group is not appropriately extensible.

Third-level derived containers Development 2306 and Marketing 2320 are based on the same field (their selection criteria is field:department as will be illustrated). Furthermore, if all values of the field department in the database of FIG. 22 were represented, top level hierarchical relationships would be maintained since other values, SHP/REC and ADMIN are logical descendants of derived container Dept. List 2304. However, since not all derived containers can logically comprise the same children, this container group is not appropriately extensible. For instance, derived containers Office 2308 and Parts 2310, which are child derived containers of Development 2306, would not be logical children of SHP/REC because a shipping and receiving department would probably not comprise office type assets.

Fourth-level derived containers Office 2308 and Parts 2310 are based on the same field (their selection criteria is field:assetType as will be illustrated). However, top level hierarchical relationship would be lost here if a derived container based on the same field (i.e. field:assetType) was added. In other words, for the database of FIG. 22, related derived container Production would be added, and since it would not make sense for production assets to be in a development department, the meaning of the hierarchy would be lost.

Third-level derived containers Bldg1 2332, Bldg2 2340, Bldg3 2348, and Onsite 2356 are based on the same field (their selection criteria is field:Location as will be illustrated). Since a new location, for instance, Bldg4, could be added as a logical child of derived container Location List 2330 and as a logical descendant of derived container Available 2302, top level hierarchical relationships are maintained. Also, since they all comprise the same children and descendants (i.e. derived containers Office, Prod, and Parts), and a new value, such as Bldg4, could validly have these children, bottom level hierarchical relationships are maintained. This container group is, therefore, appropriately extensible.

Fourth-level derived containers Office 2334, 2342, 2350, 2358, Prod 2336, 2344, 2352, 2360, and Parts 2338, 2346, 2354, 2362 are based on the same field (their selection criteria is field:assetType as will be illustrated). Since a new asset type, for instance, Development could be added as a logical child of derived containers Bldg1 2332, Bldg2 2340, Bldg3 2348, Onsite 2356, and as a logical descendant of derived containers Location List 2330 and Available 2302, top level hierarchical relationships are maintained. Furthermore, since they all comprise the same children and descendants, and because a new asset type, such as Development, could validly have the same children as other derived containers in the same container group, bottom level hierarchical relationships are maintained. This container group is, therefore, appropriately extensible.

Third-level derived containers Office 2366, Prod 2368, and Parts 2370 are based on the same field (their selection criteria is field:assetType as will be illustrated). Since their parent category is Complete List 2364, any values of the common field attribute would be logical descendants of the parent category and top level hierarchical relationships would be maintained. This container group is, therefore, appropriately extensible.

In a first preferred embodiment, to ensure that the second level of derived hierarchy Location List 2330, for example, represents the most current values for location in the database, or, put in other words, that derived container Location List 2330 captures all Location values in the next level, including derived containers Bldg1 2332, Bldg2 2340, Bldg3 2348, Onsite 2356, and any other Location values that might be added to the database of FIG. 22, a designer would need to search the database for all values associated with the field Location, and create or modify value-defined container definition nodes for the new values. This may happen, for example, where a value is changed across the board, (i.e. all Location values entitled Onsite are changed to Offsite), or where Location values are added (i.e., a record is added or changed so that a new Location value such as BLDG4 is added).

For example, there are currently four values associated with the field Location in the database of FIG. 22: BLDG1, BLDG2, BLDG3, ONSITE. To create an extensible hierarchy in a first preferred embodiment, it would be necessary to create an additional value-based container definition node defining a Location value where, for example, the following record is added to the database of FIG. 22:

| field: AssetNo. | field:Asset | field: assetType | field: Dept | field: Location | field: IsAvailable |
|---|---|---|---|---|---|
| 1013 | Toaster | Office | Admin | BLDG4 | TRUE |

To accommodate the addition of this new record (or addition of a new value), and any other new or modified records, in a first preferred embodiment, a designer would first need to know that an additional value was added to a field (or that a value has changed), and then create or modify a value-defined container definition node with the new value.

To create an extensible hierarchy in a second preferred embodiment, an information model is created by defining type-defined container definition nodes, so that designer intervention is not needed. Whereas in a first preferred embodiment one value-defined container definition node is defined for every derived container, in a second preferred embodiment, type-defined container definition nodes are strategically defined according to the desired hierarchy structure. Related derived containers that are also hierarchically related to their parent/ancestors and children/descendants in a hierarchy structure can be defined by a single attribute-based container definition node, and all other derived containers in the structure can be defined by a value-based container definition node.

An extensible hierarchy can be defined for the hierarchy structure of FIG. 23, which illustrates a fully traversed hierarchy (i.e., a hierarchy in which all derived containers are displayed) wherein related derived containers are generated by an attribute-based container definition node at the time the derived containers are created. Thus, an attribute-based container definition node where its variable attribute is {field:Location} 2372 will generate a derived container for each value of Location found in the database when the derived container is created to generate derived containers Bldg1 2332, Bldg2 2340, Bldg3 2348, and Onsite 2356 for the database of FIG. 22. Similarly, an attribute-based container definition node where its variable attribute is {field:assetType} 2374, 2376 will generate a derived container for each value of assetType found in the database when the derived container is created to generate derived containers Office 2334, 2342, 2350, 2358, 2366, Prod 2336, 2344, 2352, 2360, 2368, and Parts 2338, 2346, 2354, 2362, 2370 for the database of FIG. 22.

Furthermore, each derived container corresponding to an attribute-based container definition node comprises the child derived containers referenced by the attribute-based container definition node, because related derived containers comprise the same child derived containers and descendants thereof. In other words, if an attribute-based container definition node references child type-defined container definition nodes A, B, and C, for example, child derived containers generated from those child type-defined container definition nodes are recurring derived containers since they become child derived containers of each derived container generated from the attribute-based container definition node. Therefore, derived containers Office 2334, 2342, 2350, 2358, Prod 2336, 2344, 2352, 2360, and Parts 2338, 2346, 2354, 2362, are recurring derived containers since they are child derived containers of derived containers generated from attribute-based container definition node 2372. Derived containers that are not hierarchically related are defined by value-based container definition nodes. Therefore, derived containers 2302, 2304, 2306, 2308, 2310, 2320, 2330, and 2364 will each have a different corresponding value-based container definition node.

Figure 24:
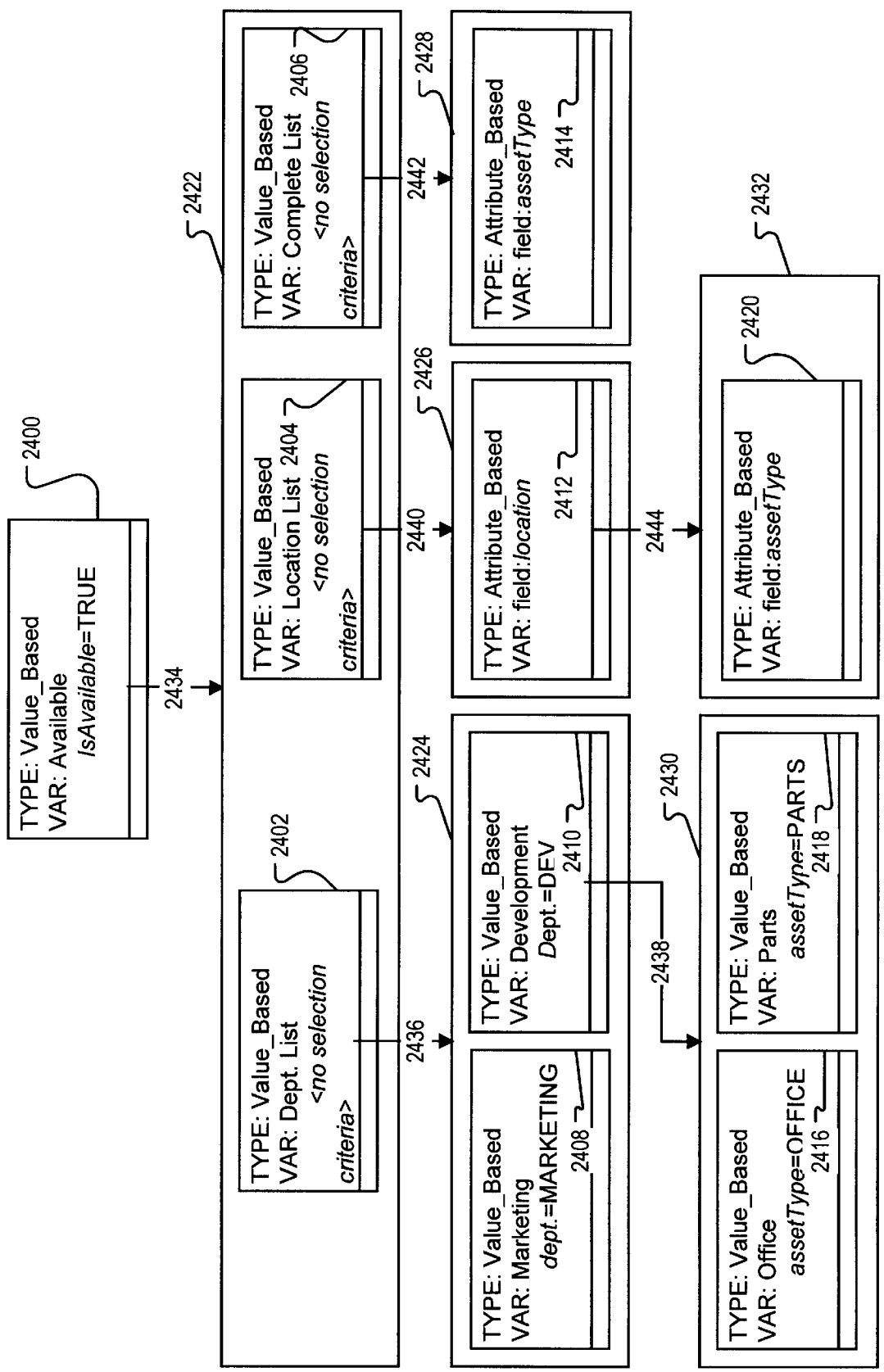
FIG. 24 illustrates derived containers and their corresponding type-defined container definition nodes for the derived hierarchy of FIG. 22.

An information model to define the extensible hierarchy illustrated in the structure of FIG. 23 using type-defined container definition nodes is illustrated in FIG. 24. In FIG. 24, value-based container definition node Available 2400 references 2434 a list 2422 of child type-defined container definition nodes 2402, 2404, 2406; value-based container definition node Dept. List 2402 references 2436 a list 2424 of child type-defined container definition nodes 2408, 2410; value-based container definition node Development 2410 references 2438 a list 2430 of child type-defined container definition nodes 2416, 2418; value-based container definition node Location List 2404 references 2440 a list 2426 comprising child type-defined container definition node 2412; value-based container definition node Complete List 2406 references 2442 a list 2428 comprising child type-defined container definition node 2414; and attribute-based container definition node 2412 references 2444 a list 2432 comprising child type-defined container definition node 2420.

Using an Information Model with Type-defined Containers

Figure 25:
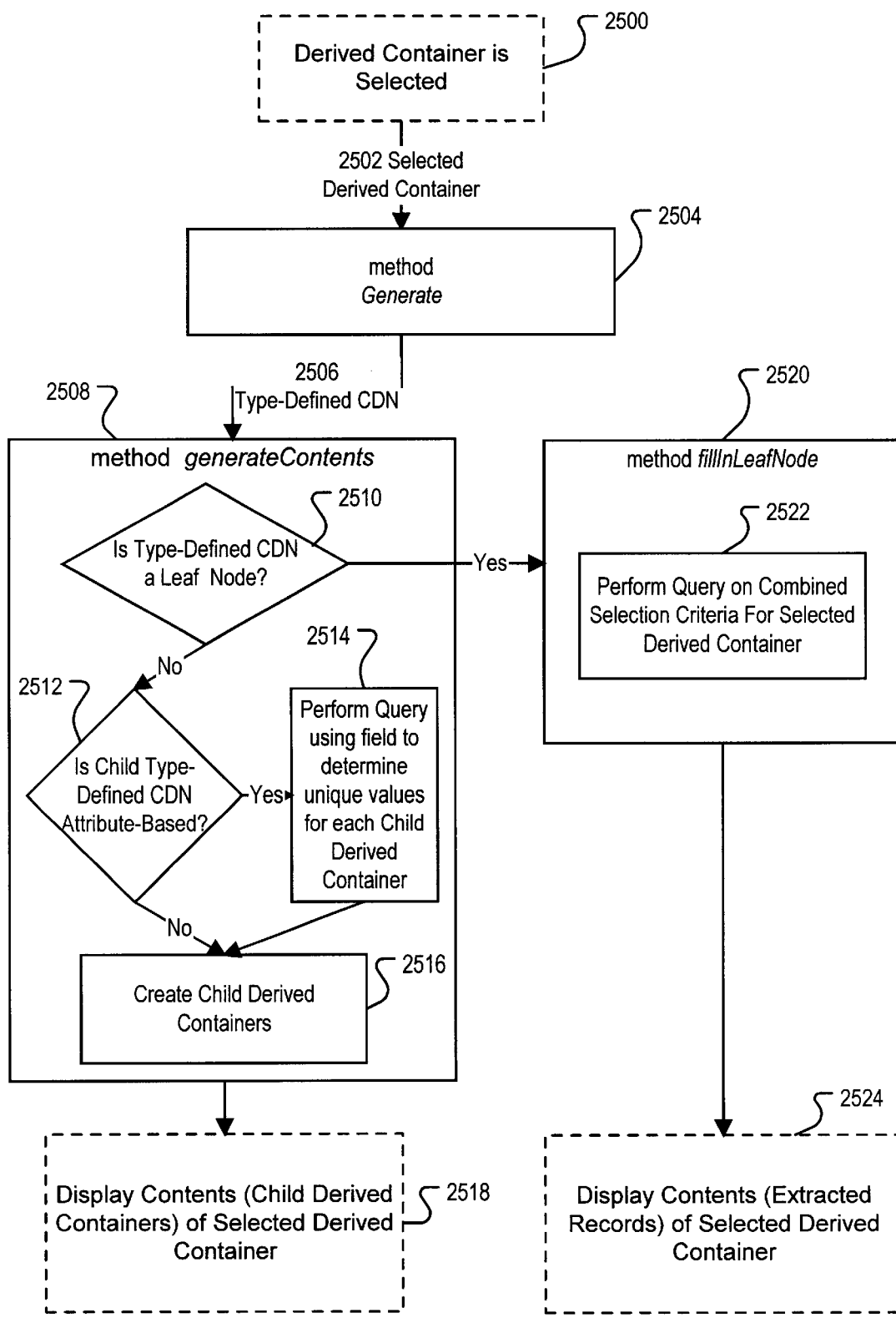
FIG. 25 illustrates a method of using an information model in a second preferred embodiment.

Like a first preferred embodiment, an extensible hierarchy is initialized by an apex that creates first-level derived containers, which can then be used to create additional levels of the extensible hierarchy as a derived container is selected. A method of creating a hierarchy in a second preferred embodiment differs from a method in a first preferred embodiment, as illustrated in FIG. 25. When a derived container is selected 2500, method Generate 2504 is invoked. Method Generate 2504 uses the selected derived container's 2502 pointer to retrieve its corresponding type-defined container definition node 2506 from the information model. Method generatecontents 2508 then uses the corresponding type-defined container definition node 2506 to determine 2510 if the type-defined container definition node is a leaf node. (One way to determine if a type-defined container definition node is a leaf node is to check if it references child nodes. If it has pointers to child nodes, then it is not a leaf node. There can also be other ways of making this determination.) If the type-defined container definition node 2506 corresponding to the selected derived container 2502 is a leaf node, method fillInLeafNode 2520 is invoked to determine the selected derived container's contents by performing a query 2522 based on the selected derived container's combined selection criteria, and then extracting the records. Method fillInLeafNode 2520 then displays the contents 2524 to a computer monitor.

If the type-defined container definition node corresponding to the selected derived container is not a leaf node, the selected derived container's contents comprise child derived containers, and method generateContents 2508 determines 2512, for each child type-defined container definition node referenced by the type-defined container definition node 2506, if the child type-defined container definition node is attribute-based. If it is attribute-based, a query is performed 2514 on the variable attribute of the attribute-based child container definition node to determine unique values for one or more child derived containers, where each unique value determines inheritable attributes, such as label and selection criteria, of a given child derived container. A child derived container is then created 2516 using the unique values determined by the query. If the child type-defined container definition node is not attribute-based, i.e., it is value-based, method GenerateContents 2508 creates a derived container 2516 for the value-based container definition node using the inheritable attributes defined by the variable attribute. The one or more child derived containers are then displayed 2518 to a computer monitor.

The method of FIG. 25 can be used to traverse derived hierarchy Available 2302 shown in the hierarchy structure of FIG. 23. Assuming that first-level derived containers have been generated by an apex, a user can select 2500 first-level derived container Available 2302 (FIG. 23), corresponding to derived container 2600 in FIG. 26A. Method Generate 2504 uses the selected derived container's 2502 (i.e. derived container Available 2600) pointer 2614 to obtain its corresponding type-defined container definition node 2400, which comprises a pointer 2434 to a list 2422 of child nodes. Using a corresponding type-defined container definition node 2506, method generateContents 2508 then determines 2510 whether the type-defined container definition node is a leaf node. Since type-defined container definition node Available 2400 is not a leaf node, (i.e. it has a pointer 2434 to a list 2422 of child nodes), method generateContents 2508 then determines 2512 if any of the child type-defined container definition nodes referenced by the type-defined container definition node corresponding to the selected derived container is attribute-based. Since child type-defined container definition nodes Dept. List 2402, Location List 2404, and Complete List 2406 are not attribute-based, method generateContents 2508 creates 2516 a child derived container for each of those child container nodes. Each child type-defined container definition node then generates, respectively, child derived container Dept. List 2602 which references 2616 corresponding type-defined container definition node Dept. List 2402, child derived container Location List 2604 which references 2618 corresponding type-defined container definition node Location List 2404, and child derived container Complete List 2606 which references 2620 corresponding type-defined container definition node Complete List 2406, and a combined selection criteria attribute for each derived container is created using a dynamically determined selection criteria attribute (discussed, supra).

Figure 26:
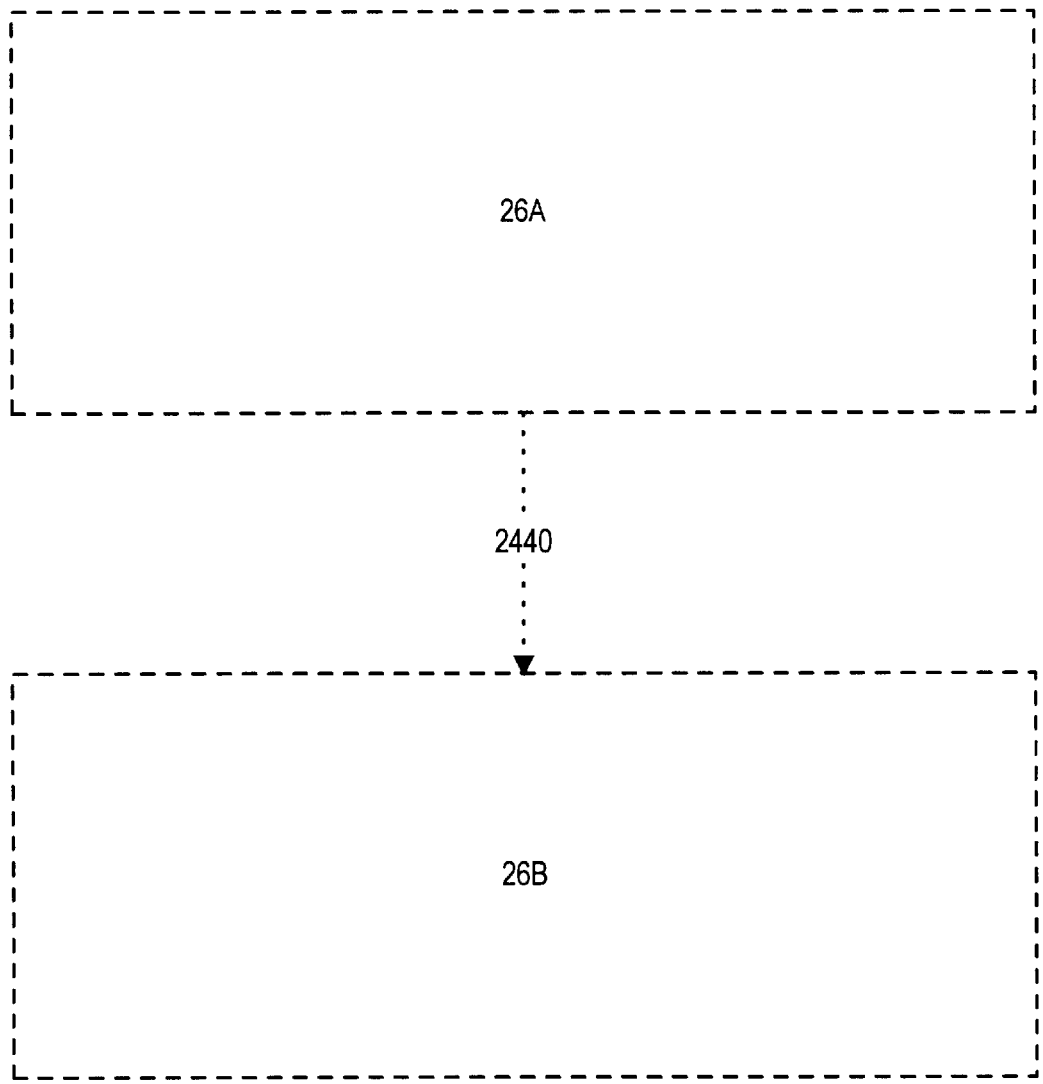
FIG. 26 represents derived containers and their corresponding type-defined container definition nodes for the information hierarchy of FIG. 24, wherein part 26A and part 26B are connected by pointer 2440, and part 26A is illustrated in FIG. 26A, and part 26B is illustrated in FIG. 26B.
Figure 26A:
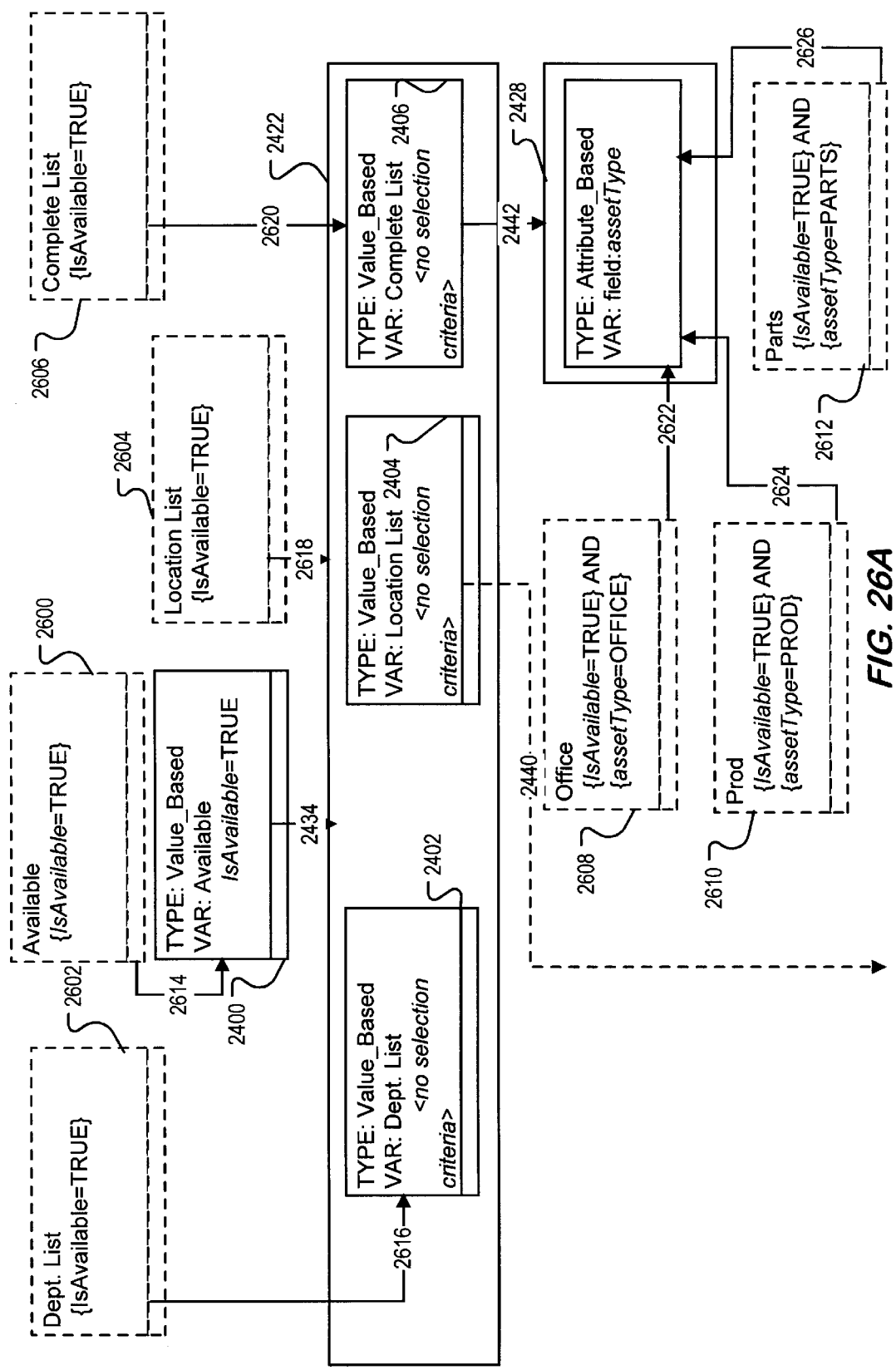
Figure 26B:
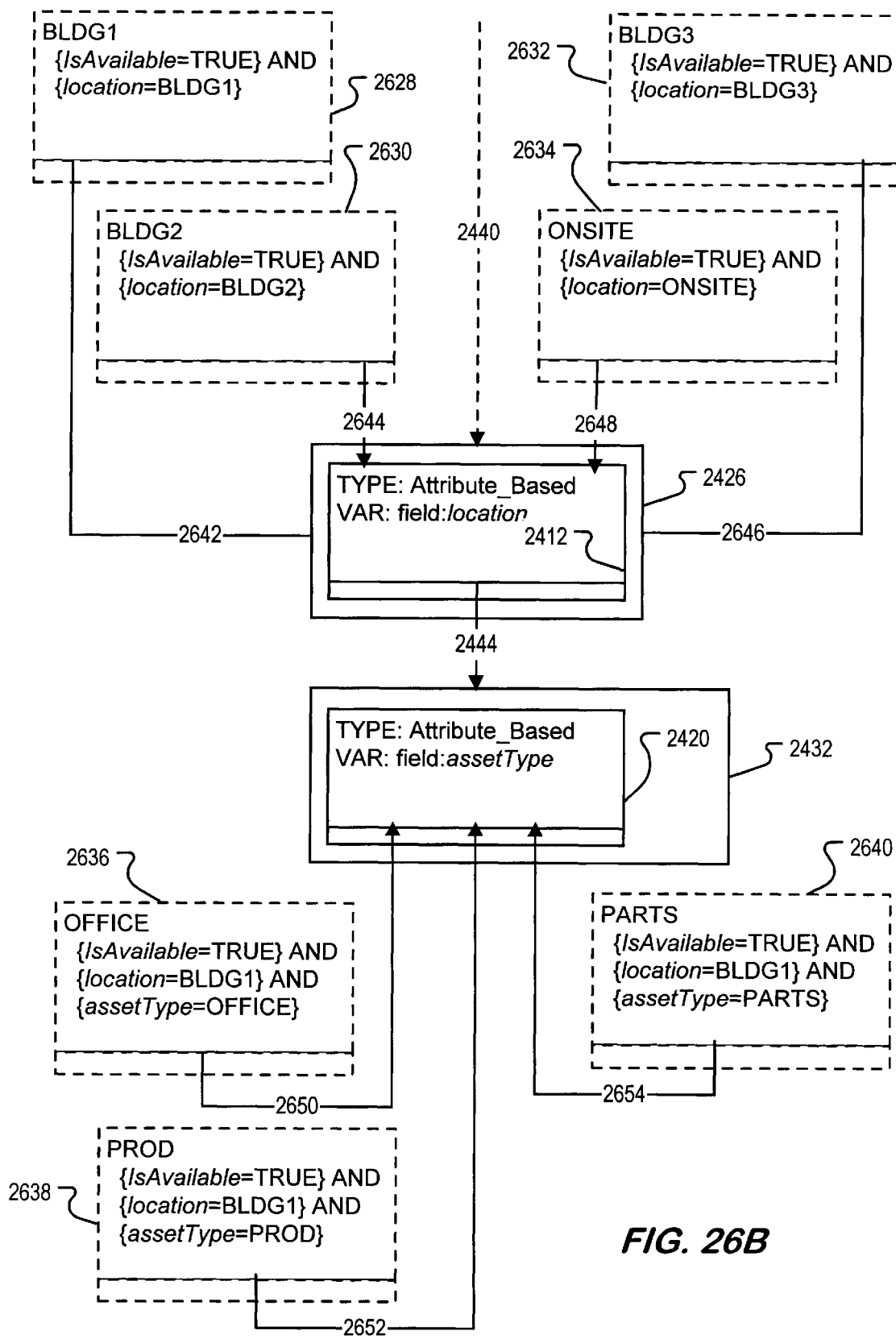

If the user next selects 2500 derived container Location List 2330 (FIG. 23) corresponding to derived container 2604 in FIG. 26A, method Generate 2504 uses the selected derived container's 2502 (i.e. the Location List derived container 2604) pointer 2618 to obtain the selected derived container's corresponding type-defined container definition node 2404. Using a corresponding type-defined container definition node 2506, generateContents 2508 then determines 2510 whether the type-defined container definition node is a leaf node. Since the type-defined container definition node Location List 2404 is not a leaf node (i.e. it comprises a pointer 2440 to a list 2426 comprising a child node 2412), method generateContents 2508 then determines 2512 if any of the child type-defined container definition nodes referenced by the type-defined container definition node corresponding to the selected derived container is attribute-based. Since type-defined container definition node 2412 is attribute-based, method generateContents 2508 performs a query 2514 on the field of the variable attribute to determine the unique values for that field in a particular database. For the job database of FIG. 22, a query on the field Location results in the unique values BLDG1, BLDG2, BLDG3, and ONSITE. Method generateContents 2508 then creates 2516 child derived containers using these unique values by creating inheritable attributes from these unique values and assigning them to the child derived containers. For instance, for the value BLDG1, method generatecontents2508 would create a label attribute "BLDG1", and a selection criteria attribute {Location=BLDG1}. A derived container BLDG1 2628 (FIG. 26B) is then created to inherit the attributes which are used to create the derived container's label attribute and combined selection criteria attribute, and the derived container's pointer 2642 is set to point to its corresponding type-defined container definition node 2412. Derived containers BLDG2 2630, BLDG3 2632, AND ONSITE 2634 are created in the same fashion, and their pointers 2644, 2646, 2648, respectively, are set to point to their corresponding type-defined container definition node 2412. If, when next time the derived container is created, the following record is detected:

| field: AssetNo. | field: field:Asset | field: assetType | field: Dept | field: Location | field: IsAvailable |
|---|---|---|---|---|---|
| 2213 | Toaster | Office | Admin | BLDG4 | TRUE | a query performed by method generateContents 2508 would result in the unique values BLDG1, BLDG2, BLDG3, BLDG4, and ONSITE. Method generateContents 2508 would then create 2516 child derived containers using these unique values by creating inheritable attributes from these unique values and assigning them to the child derived containers.

If the user next selects 2500 derived container BLDG1 2332 (FIG. 23) corresponding to derived container 2628 (FIG. 26B), under derived container Location List 2330 (FIG. 23), 2604 (FIG. 26A), method Generate 2504 uses the selected derived container's pointer 2642 to obtain the selected derived container's corresponding type-defined container definition node 2412. Using a corresponding type-defined container definition node 2506, generateContents 2508 then determines 2510 whether the type-defined container definition node is a leaf node. Since type-defined container definition node 2412 is not a leaf node, method generateContents 2508 then determines 2512 if any of the child type-defined container definition nodes referenced by the type-defined container definition node corresponding to the selected derived container is attribute-based. Since type-defined container definition node 2420 is attribute-based, method generateContents 2508 performs a query 2514 on the field of the variable attribute to determine the unique values for that field in a particular database. For the job database of FIG. 22, a query on the field assetType results in the unique values OFFICE, PARTS, and PROD. Method generateContents 2508 then creates 2516 child derived containers using these unique values: derived container Office 2636 is created with its pointer 2650 set to type-defined container definition node 2420; derived container Prod 2638 is created with its pointer 2652 set to type-defined container definition node 2420; and derived container Parts 2640 is created with its pointer 2654 set to type-defined container definition node 2420.

If the user next selects 2500 derived container OFFICE 2334 (FIG. 23) corresponding to derived container 2636 (FIG. 26B), method Generate 2504 uses the selected derived container's pointer 2650 to obtain the selected derived container's corresponding type-defined container definition node 2420. Using a corresponding type-defined container definition node 2506, generateContents 2508 then determines 2510 whether the type-defined container definition node is a leaf node. In a preferred embodiment, since type-defined container definition node 2420 is a leaf node, method fillInLeafNode 2520 is invoked to extract the records of the selected derived container. It does this by performing a query 2522 on the combined selection criteria for the selected derived container, which in this case is {{IsAvailable=TRUE} AND {Location=BLDG1} AND {assetType=OFFICE}}, and then displaying 2524 the extracted records. For the database of FIG. 22, AssetNo. 2200 and 2204 are records that satisfy the query and are displayed to the user.

Variation of Second Preferred Embodiment

Introduction and Definitions

In a variation of a second preferred embodiment, an information model is used to create an extensible hierarchy of organizational information for one or more information repositories. An extensible hierarchy, as defined in a second preferred embodiment, is a hierarchy in which any of one or more container groups is extensible, or can be expanded to represent all values of the particular container group's category. An extensible hierarchy of organizational information, therefore, is also a hierarchy in which any of one or more container groups is extensible, the difference being that the hierarchy can be expanded such that at least one group of derived containers in a given container group represents all organizations of a particular organization type, as opposed to a general field attribute specified by a corresponding type-defined container definition node. As in a second preferred embodiment, an extensible container group comprises related derived containers, which are derived containers that share at least one attribute definition as defined by a corresponding type-defined container definition node. In a variation of a second preferred embodiment, type-defined container definition nodes can also be organization-based, such that related derived containers share an organization type field, the organization type being defined by a corresponding organization-based container definition node. Therefore, in a variation of a second preferred embodiment, related derived containers can also represent all and/or the most current organization objects in a database that can be associated with other objects, wherein the organization objects are of an organization type defined by a corresponding organization-based container definition node.

A variation of a second embodiment can be used where information in one or more information repositories is characterized by organization objects capable of being associated with other objects and/or being managed. For example, in network management, organization objects are objects in the network management database which represent organizations, such as customers or internet service providers. Each organization object may be associated with some number of network management resources, such as nodes or interfaces, and each network management resource may be associated with some number of organization objects, implying a many-to-many relationship between organization objects and resources. These relationships allow network managers to manage both network resources and organizations together. This can be useful for isolating organizational issues, examples of which include billing customers based on network resource usage, and relating network problems to a particular customer. The key differences of using an information model to create an organizational hierarchy of information in a variation of a second preferred embodiment are:

- Type-defined container definition nodes are extended to include organization-based container definition nodes, attribute-based container definition nodes, and value-based container definition nodes;
- The method of creating a hierarchy in a variation of a second preferred embodiment is different.
- Child derived containers of organization-based container definition nodes will filter the information repository's contents based on an association with the organization, rather than an attribute value.

The description of a first preferred embodiment and a second preferred embodiment described above is hereby incorporated except as distinguished in the following paragraphs.

Figure 27:
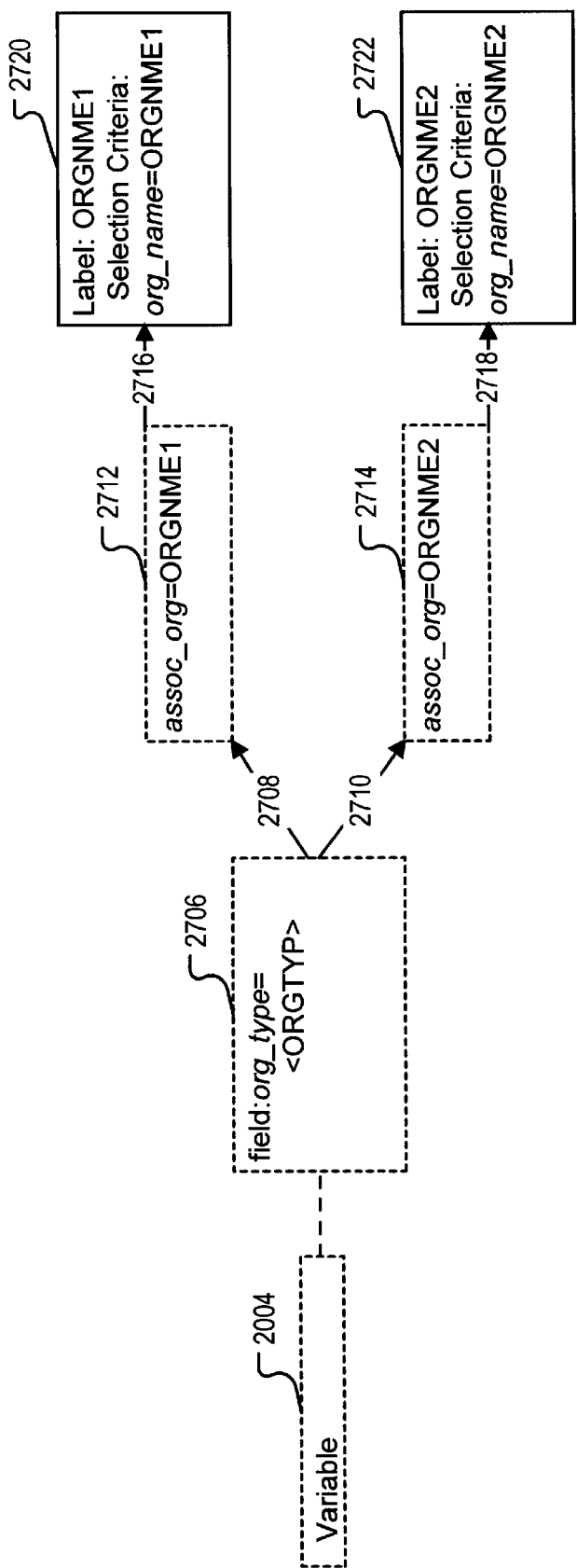
FIG. 27 illustrates a Variable field of an organization-based container definition node in a variation of a second preferred embodiment.

To get the benefits of the relationships that exist in a particular information repository or database, a visual representation is necessary. Using an information model in a variation of a second preferred embodiment provides this visual representation. In a variation of a second preferred embodiment, like a second preferred embodiment, a type-defined container definition node comprises a type attribute and variable attribute that together determine inheritable attributes, or attributes that are inherited by a given derived container to create its actual attributes. In a variation of a second preferred embodiment, however, an additional type is added: organization-based container definition nodes. An organization-based container definition node is similar to an attribute-based container definition node in that inheritable attributes are dynamically determined such that the dynamically determined attributes can correspond to one or more derived containers and can be inherited by one or more derived containers. Thus, a one-to-many relationship can exist between an organization-based container definition node and one or more derived containers. In an organization-based container definition node, as illustrated in FIG. 27, the variable attribute 2004 comprises field org_type 2706 that is used to determine 2708, 2710 one or more values 2712, 2714 of ORGTYPE that are used to create inheritable attributes inherited 2716, 2718 by one or more derived containers 2720, 2722. In derived containers 2720, 2722, a label attribute is inherited to create a derived container's label attribute, and a selection criteria attribute is inherited to create a derived container's combined selection criteria, where a selection criteria attribute is an implicit attribute of a derived container. (A display information attribute can also be an inheritable attribute. In this embodiment, the field of the inherited selection criteria attribute is a different field than the field used to determine the value for the field. In other words, the field used to create inheritable attributes for a given derived container, such as a selection criteria attribute, is org_type, whereas the field of the selection criteria attribute for the same derived container is assoc_org. In previous embodiments, the field of the selection criteria attribute is the same field as that from which its value was determined. For example, in value-based container definition nodes, a variable attribute that is org_type= CUSTOMERS is the attribute that is inherited by a derived container, and becomes the derived container's selection criteria attribute, and in attribute-based container definition nodes, a variable attribute that is field:org_type comprises the field that is inherited by a derived container to create the derived container's selection criteria attribute.) The method used to generate the inheritable attributes and to create the one or more derived containers will be described in more detail.

Creating an Information Model

In a preferred embodiment, an information repository is a database. In a variation of a second preferred embodiment, as in a first preferred embodiment, an information model can effectively organize one or more databases into a hierarchy of information that is easy for a designer to create and a user to understand. In a variation of a second preferred embodiment, like a second embodiment, an extensible hierarchy can be created. In a variation of a second preferred embodiment, however, an extensible hierarchy comprises organizational information that allows an organization to be associated with one or more resources, and a resource to be associated with one or more organizations.

Figure 29:
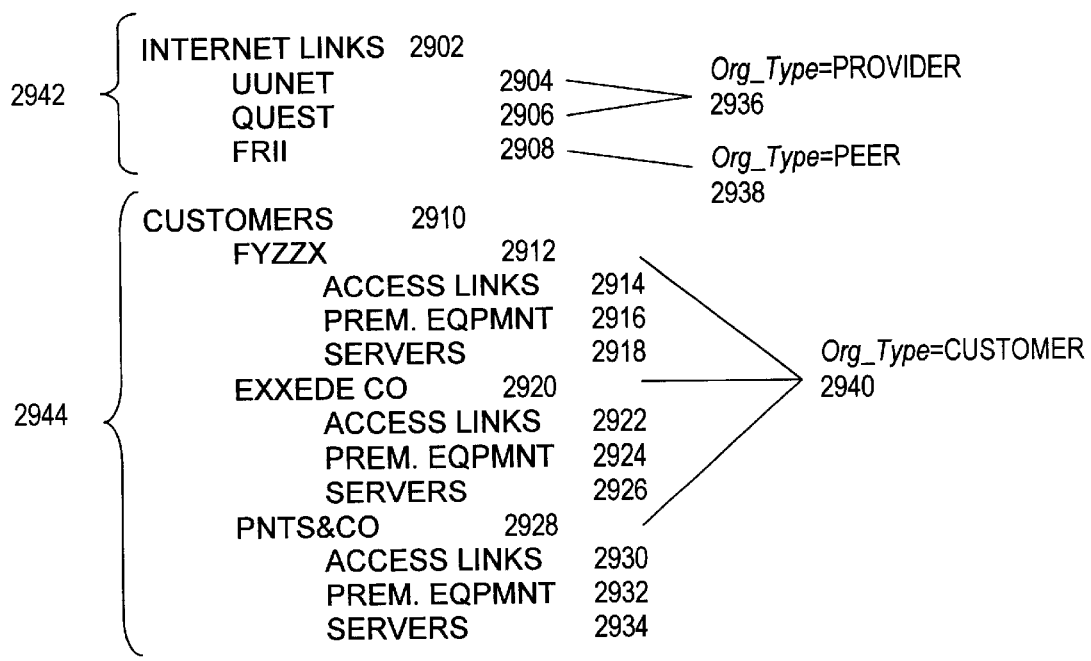
FIG. 29 illustrates a sample hierarchy structure for an expanded hierarchy of the database of FIG. 28.

This many-to-many relationship between an organization and resources can be illustrated by way of example. FIG. 29 illustrates one of many possible hierarchies for the database of FIG. 28. The hierarchy 2900 of FIG. 29 comprises derived hierarchy Internet Links 2942 and derived hierarchy Customers 2944. Derived hierarchy Internet Links 2942 comprises derived containers Internet Links 2902, UUNET 2904, QUEST 2906, and FRII 2908, and derived hierarchy Customers 2944 comprises derived containers Customers 2910, FYZZX 2912, EXXEDE CO. 2920, PNTS & CO. 2928, Access Links 2914, 2922, 2930, Prem. Eqpmnt 2916, 2924, 2932, and Servers 2918, 2926, 2934. To create an information model for an extensible hierarchy of organizational information, organizations are grouped according to their type, so the organizations can be associated with objects particular to an organization and/or its type. For example, in FIG. 29, derived containers UUNET 2904 and QUEST 2906 are Providers (an organization type), and FRII 2908 is a Peer. This allows a manager, for example, to observe what resources are associated with a particular organization. (In this hierarchy, a container group is represented by two groups of related derived containers, PRO- VIDERS and PEERS, having parent derived container INTERNET LINKS. A hierarchy could also be defined with two separate container groups, where each container group comprises a single group of related containers. For example, one container group could comprise derived containers related by PROVIDERS, having a parent derived container PROVIDERS, and a second container group could comprise derived containers related by PEERS, having a parent derived container PEERS. Both hierarchies would be equally acceptable.) Derived containers FYZZX 2912, EXXEDE CO. 2920, and PNTS & CO 2928 are all Customers, where each customer can potentially have an access link, equipment, and servers. This could give a manager the ability to determine, for example, the source of a network problem that a particular customer might be experiencing.

To create this type of hierarchy in a first preferred embodiment, a value-defined container definition node is defined for each derived container. This means that when a new customer, for example, is added to the organization database, a new value-defined container definition node is added to the information model so that the hierarchy will reflect that new customer. In a second preferred embodiment, an attribute-based container definition node could be defined for org_name, for example, so that each organization could be associated with resources. However, this does not give the advantage of sorting the organizations by organization type, which is one advantage of having organizational information. Another alternative would be to add a level to define an organization type, and then to define organizations at a lower level. This, however, does not give one the advantage of selecting a particular organization type for a hierarchy, since in a second preferred embodiment, an attribute-based container definition node would generate a derived container for all values of a field attribute found in a corresponding database, rather than a select number of values.

To create an extensible hierarchy of organizational information in a variation of a second preferred embodiment, an information model is created by defining type-defined container definition nodes for organizations, so that designer intervention is not needed, and greater flexibility is provided. Whereas in a first preferred embodiment, one value-defined container definition node is defined for every derived container, in a variation of a second preferred embodiment, type-defined container definition nodes are defined according to the desired hierarchy structure. Derived containers that share the same organization type field are related, and can be defined by an organization-based container definition node; derived containers that share the same field, other than organization type, are also related, and can be defined by an attribute-based container definition node; and all other derived containers are defined by an value-based container definition node.

Therefore, to create the extensible hierarchy of organizational information illustrated by the hierarchy of FIG. 29, which represents a fully traversed hierarchy (i.e. hierarchy in which all derived containers are displayed), an organization-based container definition node can be defined for each group of derived containers that are related by organization type. As a result, derived containers related by organization type are generated by an organization-based container definition node at the time the derived containers are created. Thus, an organization-based container definition node where its variable attribute is {field:org_type=PROVIDER} 2936 will generate a derived container for each organization name in the organizations database where org_type=PROVIDER when the derived container is created. For the database of FIG. 28, this results in derived containers UUNET 2904 and QUEST 2906, where each org_type field equals PROVIDER. Similarly, an organization-based container definition node where its variable attribute is {field:org_type=PEER} 2938 will generate a derived container for each organization name in the organizations database where org_type=PEER when the derived container is created. This results in derived container FRII 2908, where its org_type field equals PEER. An organization-based container definition node where its variable attribute is {field:org_type=CUSTOMER} 2940 will generate a derived container for each organization name in the organizations database where org_type=CUSTOMER when the derived container is created, resulting in derived containers FYZZX 2912, EXXEDE CO. 2920, and PNTS & CO 2928, where each org_type field equals CUSTOMERS.

Furthermore, each derived container corresponding to an organization-based container definition node comprises the child derived containers referenced by the organization-based container definition node, because related derived containers comprise the same child derived containers and descendants thereof. In other words, if an organization-based container definition node comprises child type-defined container definition nodes Access Links, Prem. Eqpmnt, and Servers, (which are categories of information whose labels do not match their fields in this case) child derived containers of the organization-based container definition node are recurring derived containers since they become child derived containers of each derived container generated from the organization-based container definition node. Therefore, derived containers 2914, 2916, 2918, 2922, 2924, 2926, 2930, 2932, and 2934 are recurring derived containers since they are child derived containers of derived containers generated from an organization-based container definition node. Derived containers that are not related are defined by value-based container definition nodes. Therefore, derived containers 2902 and 2910 will each have a different corresponding type-defined container definition node.

Figure 30:
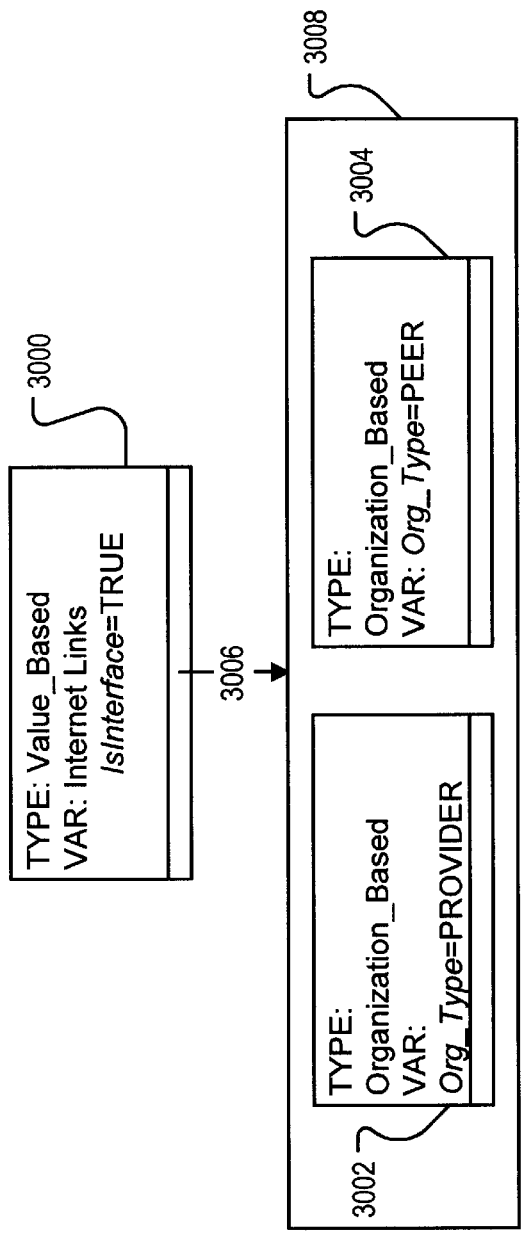
FIG. 30 illustrates derived containers and their corresponding type-defined container definition nodes for a first derived hierarchy of FIG. 29.
Figure 31:
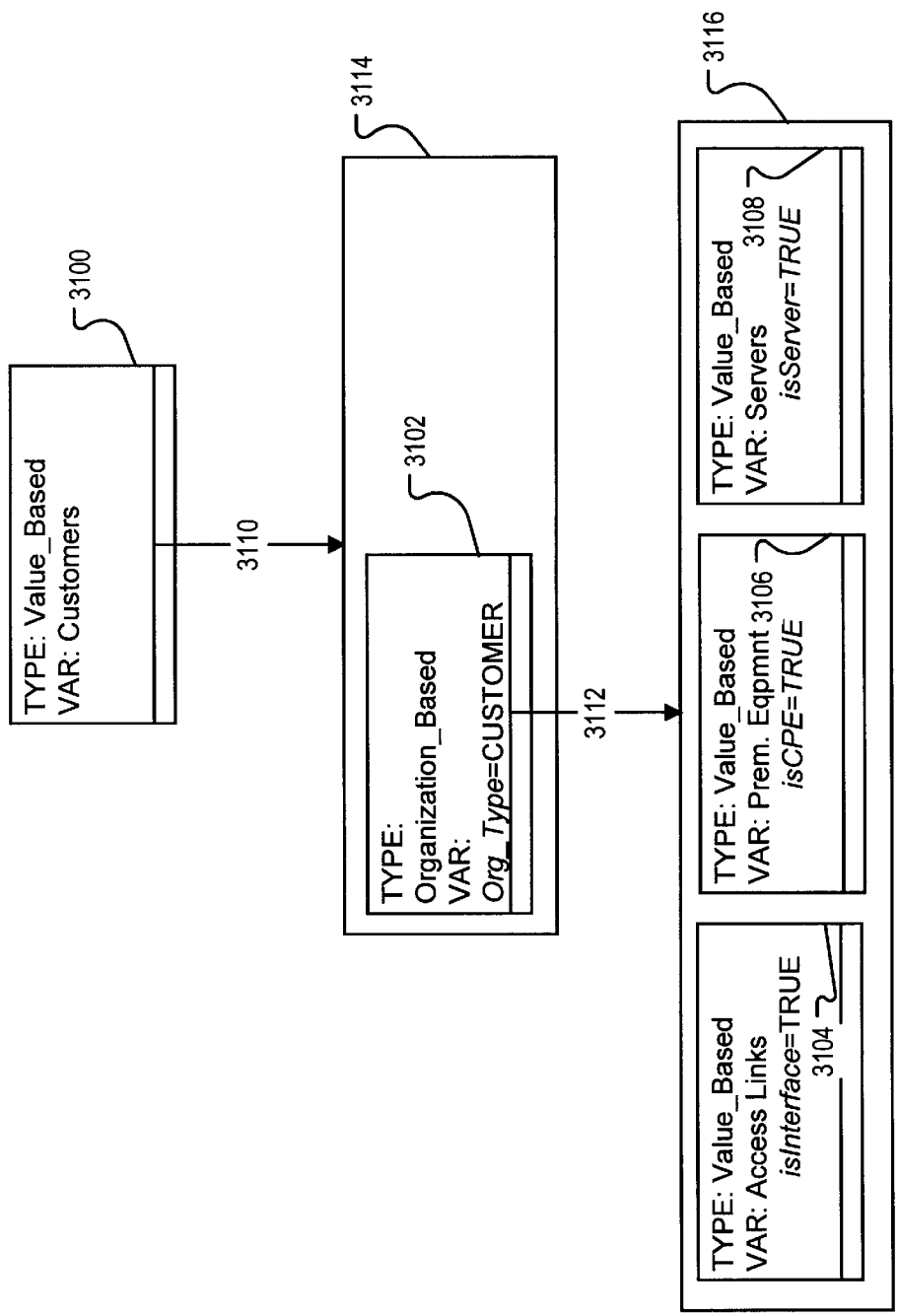
FIG. 31 illustrates derived containers and their corresponding type-defined container definition nodes for a second derived hierarchy of FIG. 29.

An information model to define the organization hierarchy illustrated in the structure of FIG. 29 using type-defined container definition nodes is illustrated in FIG. 30 and FIG. 31. In FIG. 30, which represents the Internet Links 2942 derived hierarchy of FIG. 29, value-based container definition node Internet Links 3000 references 3006 a list 3008 of child type-defined container definition nodes 3002, 3004 (which are organization-based container definition nodes that are also child nodes). In FIG. 31, which represents the Customers 2944 derived hierarchy of FIG. 29, value-based container definition node Customers 3100 references 31 10 a list 3114 comprising child type-defined container definition node 3102; organization-based container definition node 3102 references 3112 a list 3116 of child type-defined container definition nodes Access Links 3104, Prem. Eqpmnt 3106, and Servers 3108.

Using an Information Model

Figure 32:
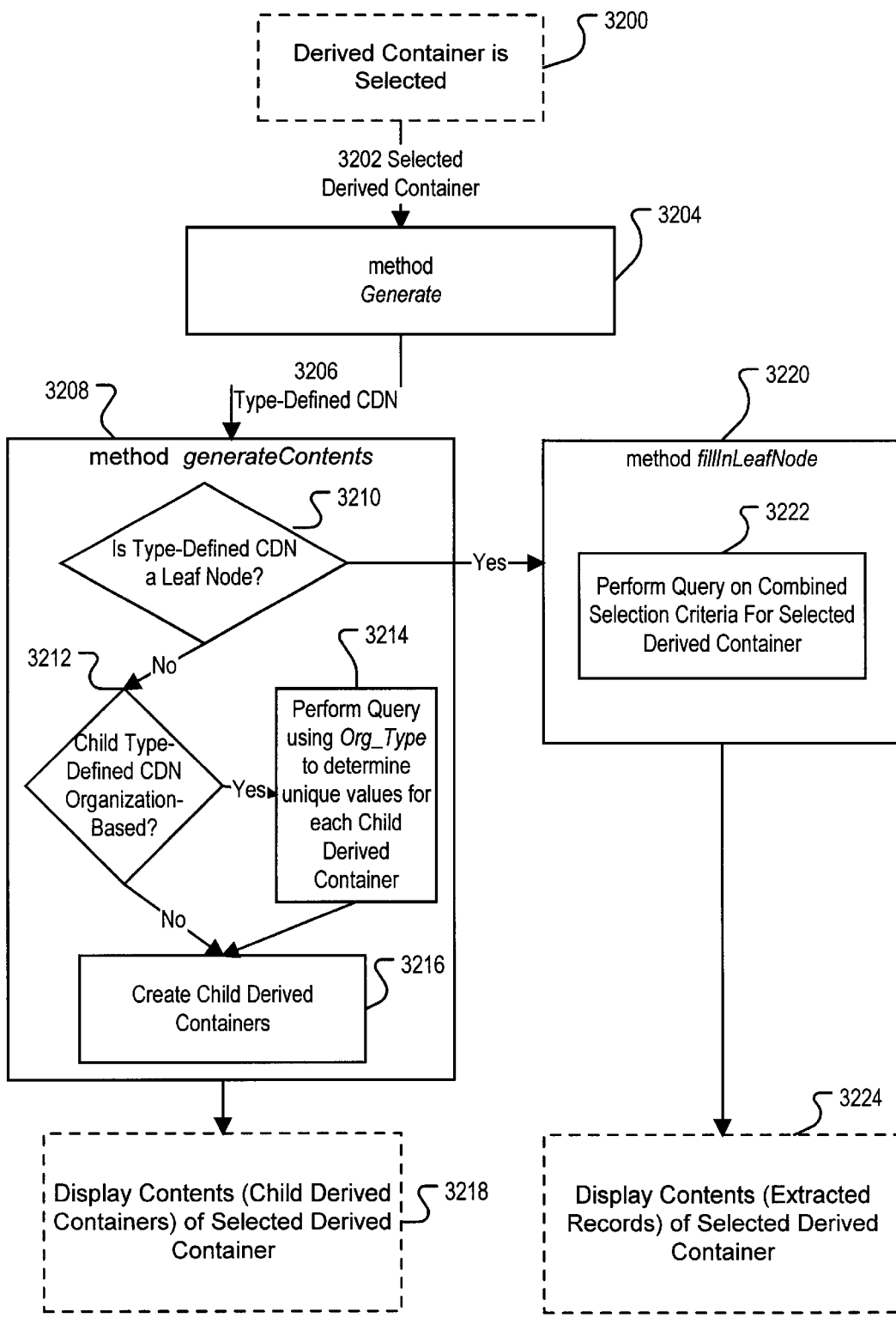
FIG. 32 illustrates a method of using an information model in a variation of a second preferred embodiment.

Like a first preferred embodiment, an extensible hierarchy of organizational information is initialized by an apex that creates first-level derived containers, which can then be used to create additional levels of the extensible hierarchy as a derived container is selected. A method of creating a hierarchy in a variation of a second preferred embodiment differs from a method in a first preferred embodiment, as illustrated in FIG. 32. When a derived container is selected 3200, method Generate 3204 is invoked. Method Generate 3204 uses the selected derived container's 3202 pointer to retrieve its corresponding type-defined container definition node 3206 from the information model. Method generateContents 3208 then uses the corresponding type-defined container definition node 3206 to determine 3210 if the type-defined container definition node is a leaf node. (One way to determine if a type-defined container definition node is a leaf node is to check if it references child nodes. If it has pointers to child nodes, then it is not a leaf node. There are also other ways of making this determination.) If the type-defined container definition node 3206 corresponding to the selected derived container 3202 is a leaf node, method fillInLeafNode 3220 is invoked to perform a query 3222 on the combined selection criteria for the selected derived container, and extracted records are displayed 3224 to a computer monitor.

If the type-defined container definition node corresponding to the selected derived container is not a leaf node, then method generateContents 3208 determines 3212, for each child type-defined container definition node referenced by the corresponding type-defined container definition node 3206, if the child type-defined container definition node is organization-based. If it is organization-based, a query is performed 3214 on the variable attribute of the child organization-based container definition node (i.e. org_type= VAL) to determine unique organization name values for one or more child derived containers, where each unique value determines inheritable attributes, such as label and selection criteria, of a child derived container. A child derived container is then created 3216 for each of the unique values determined by the query. If the child type-defined container definition node is not organization-based, i.e., it is value-based or attribute-based, method generateContents 3208 creates a derived container 3216 for the type-defined container definition node using the inheritable attributes defined and determined by the variable attribute. The one or more child derived containers are then displayed 3218 to a computer monitor.

The method of FIG. 32 can be used to traverse derived hierarchy Customers 2944 shown in the hierarchy structure of FIG. 29. Assuming that first-level derived containers have been generated by an apex, a user can select first-level derived container Customers 2910, corresponding to derived container 3300 in FIG. 33A. Method Generate 3204 uses the selected derived container's 3202 (i.e. derived container Customers 3300) pointer 3308 to obtain its corresponding type-defined container definition node 3100, which comprises a pointer 3110 to a list 3114 of child nodes. Using the corresponding type-defined container definition node 3206, method generateContents 3208 then determines 3210 whether the type-defined container definition node is a leaf node. Since type-defined container definition node Customers 3100 is not a leaf node, (i.e. it has a pointer 3110 to a list 3114 of child nodes), method generateContents 3208 then determines 3212 if any of the child type-defined container definition nodes referenced by the corresponding type-defined container definition node is organization-based. The only child type-defined container definition node referenced in this example is type-defined container definition node 3102. Since type-defined container definition node 3102 is organization-based, method generateContents 3208 performs a query 3214 based on the variable attribute, field:org_type=CUSTOMER, to determine the unique values of the field in a particular database, and the values are used to determine one or more derived container's inheritable attributes.

For the database of FIG. 28, a query on the variable attribute field:org_type=CUSTOMER results in the unique values FYZZX, INC., EXXEDE CO., and PNTS & CO. Method generateContents 3208 then creates 3216 a child derived container using each of these unique values by setting its label attribute to a unique value, and its pointer to its corresponding type-defined container definition node. In setting a derived container's selection criteria attribute, however, method generateContents 3208 creates an implicit field, rather than set the selection criteria attribute to the field that was used to create the derived container. For example, for derived container FYZZX, INC. 3302, rather than set that derived container's selection criteria attribute to {org_type=CUSTOMER}, method generateContents 3208 creates an implicit field, assoc_org, and sets it to the value generated by the query. Therefore, a selection criteria attribute for derived container FYZZX, INC. 3302 is {assoc_org= FYZZX, INC.}, and its pointer 3310 is set to its corresponding type-defined container definition node 3102. Likewise, derived container EXXEDE CO. 3304 is created as described above, and its pointer 3312 is set to its corresponding type-defined container definition node 3102, and derived container PNTS & CO. 3306 is created with its pointer 3314 set to its corresponding type-defined container definition node 3102.

Figure 33:
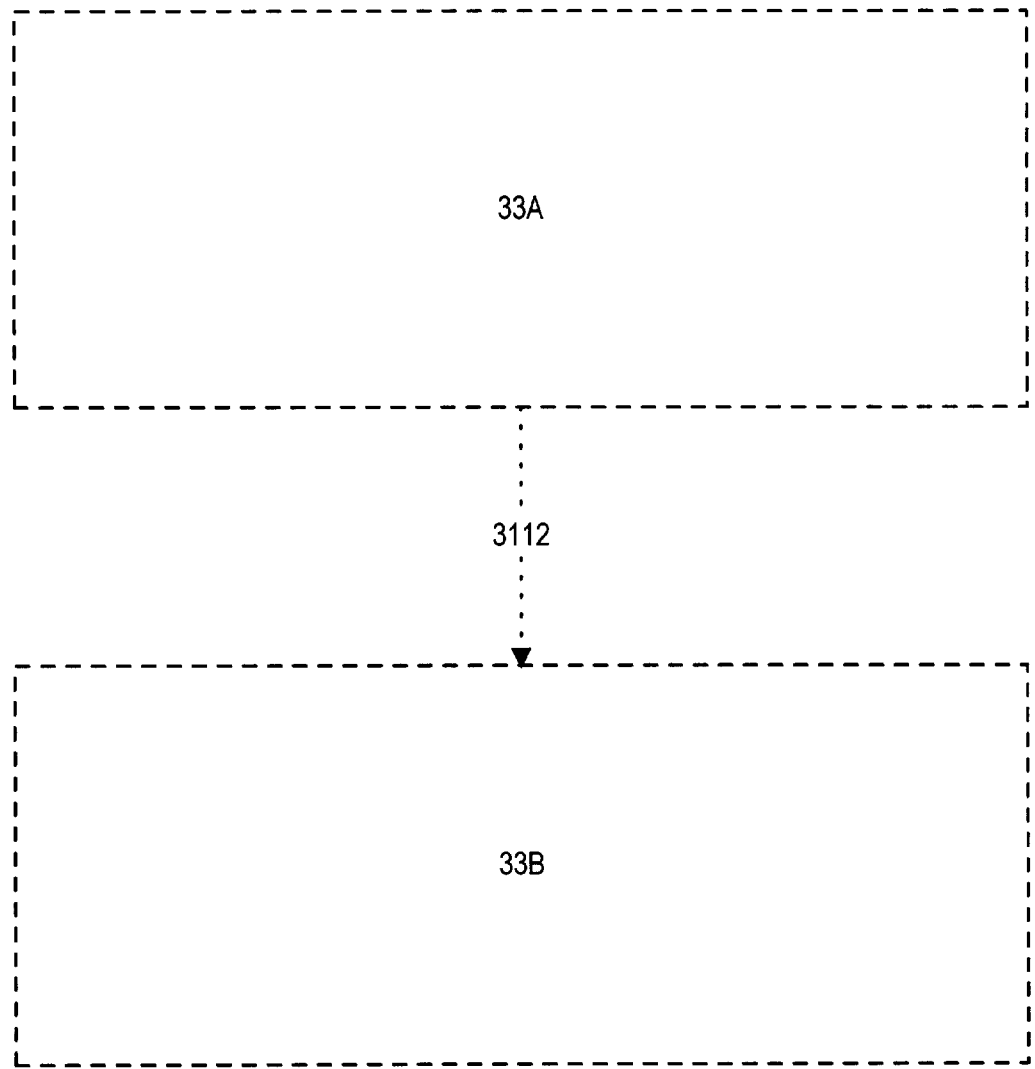
FIG. 33 represents derived containers and their corresponding type-defined container definition nodes for the information hierarchy of FIG. 31, wherein part 33A and part 33B are connected by pointer 3112, and part 33A is illustrated in FIG. 33A, and part 33B is illustrated in FIG. 33B.
Figure 33A:
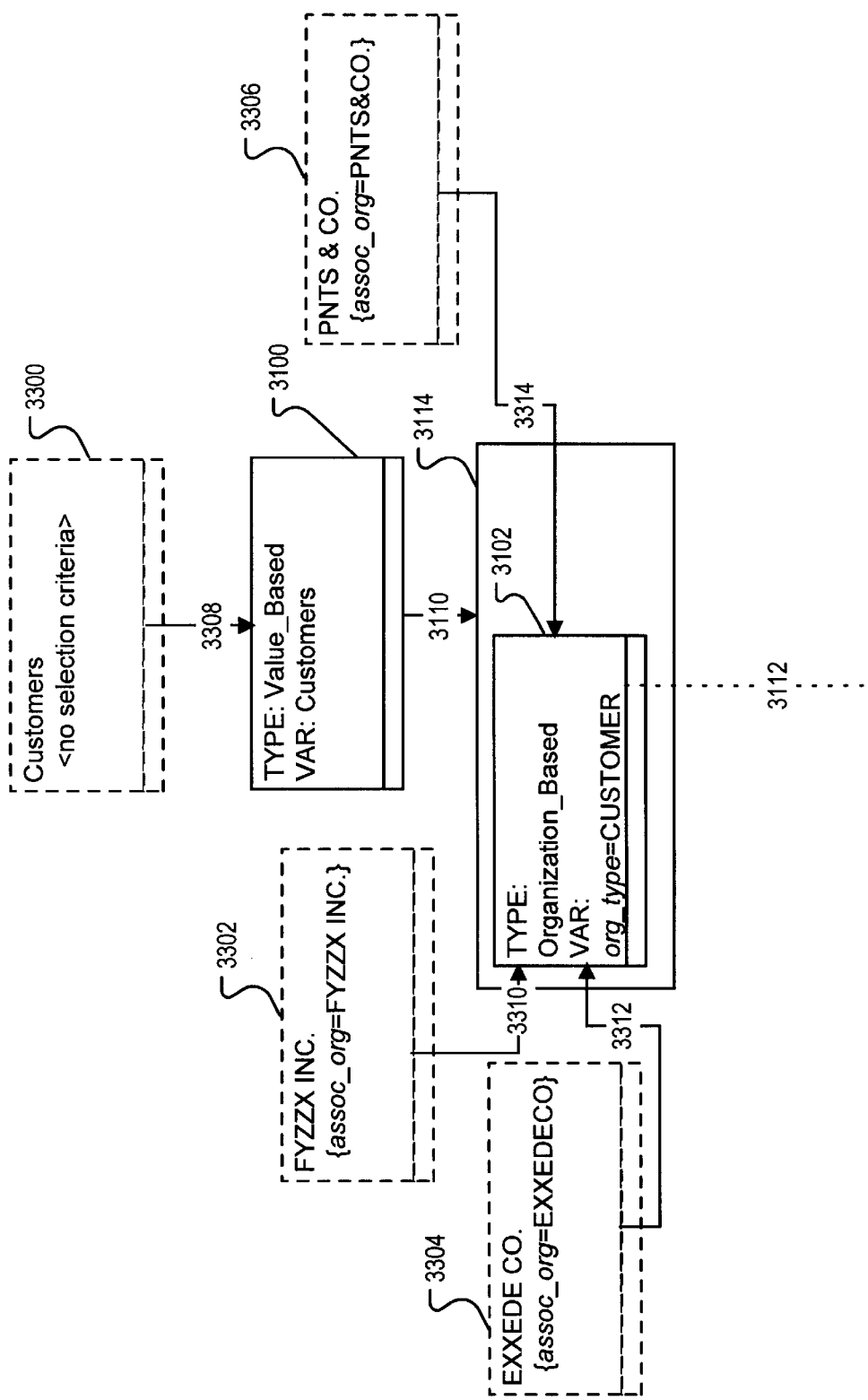
Figure 33B:
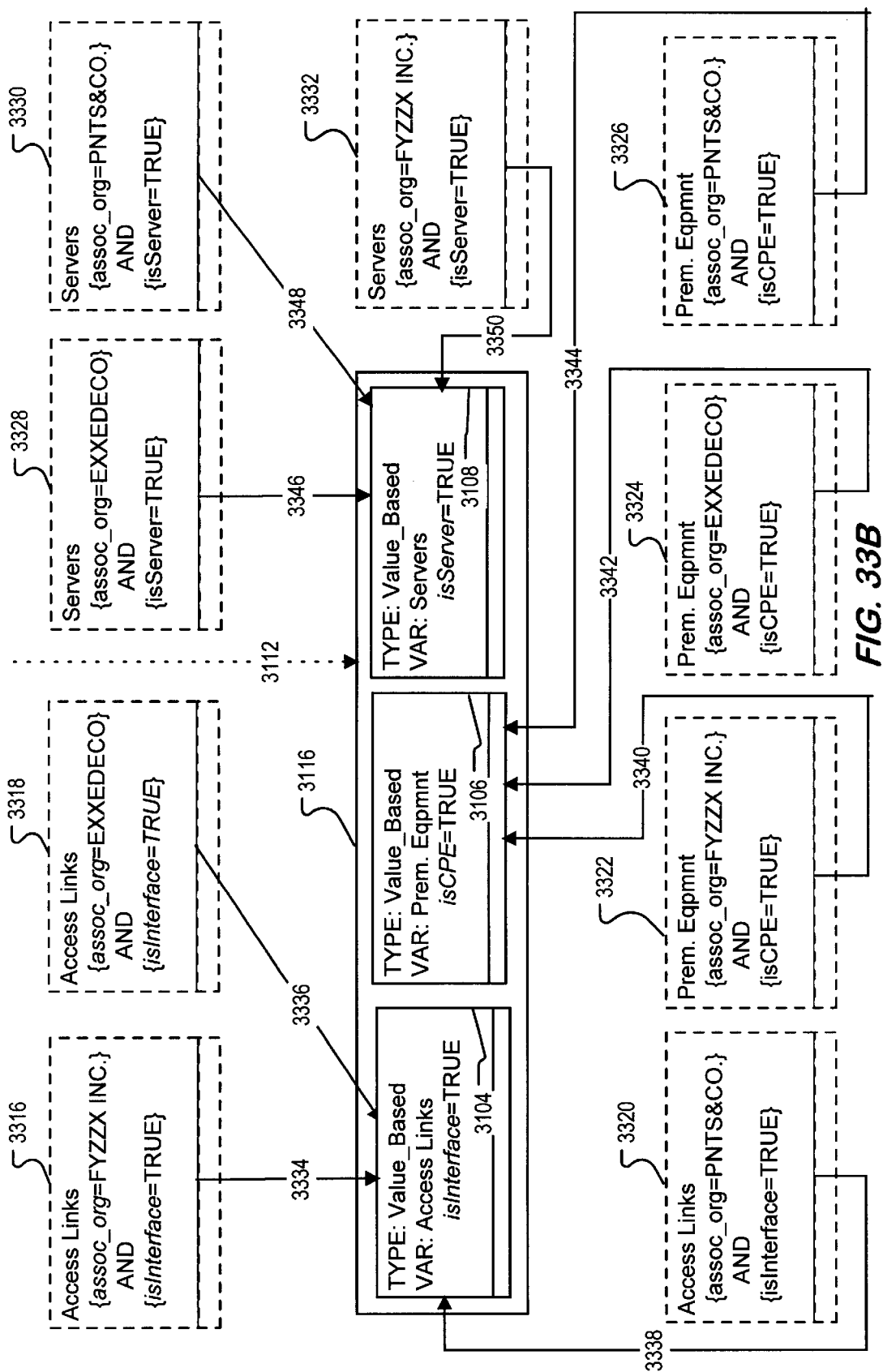

If the user next selects 3200 derived container FYZZX, INC. 2912 (FIG. 29) corresponding to derived container 3302 in FIG. 33A, method Generate 3204 uses the selected derived container's 3202 (i.e. the FYZZX, INC. derived container 3302) pointer 3310 to obtain the selected derived container's corresponding type-defined container definition node 3102. Using the corresponding type-defined container definition node 3206, generateContents 3208 then determines 3210 whether the type-defined container definition node is a leaf node. Since the corresponding type-defined container definition node is not a leaf node (i.e. it comprises a pointer 3112 to a list 3116 of child nodes 3104, 3106, 3108 of FIG. 33B), method generateContents 3208 then determines 3212 if any of the child type-defined container definition nodes referenced by the corresponding type-defined container definition node is organization-based. Since none of child type-defined container definition nodes 3104, 3106, or 3108 (FIG. 33B) is organization-based, method generateContents 3208 creates 3216 a child derived container for each type-defined container definition node referenced by the corresponding type-defined container definition node.

Here, since the type-defined container definition node corresponding to derived containers FYZZX, INC. EXXEDE CO., and PNTS & CO. (FIG. 33A, 3102) reference 3112 child type-defined container definition nodes Access Links 3104, Prem. Eqpmnt 3106, and Servers 3108, selecting derived container FYZZX, INC. 2912 (FIG. 29), 3302 (FIG. 33A), for example, causes: child type-defined container definition node Access Links 3104 to generate child derived container 3316 which references 3334 type-defined container definition node 3104; child type-defined container definition node Prem. Eqpmnt 3106 to generate child derived container 3322, which references 3340 type-defined container definition node 3106; and child type-defined container definition node Servers 3108 to generate child derived container 3332, which references 3350 type-defined container definition node 3108. If derived container EXXEDE CO. 2920 (FIG. 29), 3304 (FIG. 33A) is selected, child type-defined container definition node Access Links 3104 will generate child derived container 3318 which references 3336 type-defined container definition node 3104; child type-defined container definition node Prem. Eqpmnt 3106 will generate child derived container 3324, which references 3342 type-defined container definition node 3106; and child type-defined container definition node Servers 3108 will generate child derived container 3328, which references 3346 type-defined container definition node 3108. Similarly, if derived container PNTS & CO. 2928 (FIG. 29), 3306 (FIG. 33A) is selected, child type-defined container definition node Access Links 3104 will generate child derived container 3320 which references 3338 type-defined container definition node 3104; child type-defined container definition node Prem. Eqpmnt 3106 will generate child derived container 3326, which references 3344 type-defined container definition node 3106; and child type-defined container definition node Servers 3108 will generate child derived container 3330, which references 3348 type-defined container definition node 3108.

If the user next selects 3200 derived container Access Links 2914 (FIG. 29), 3316 (FIG. 33B), under derived container FYZZX, INC. 2912 (FIG. 29), 3302 (FIG. 33A), method Generate 3204 uses the selected derived container's pointer 3334 to obtain the selected derived container's corresponding type-defined container definition node 3104. Using the corresponding type-defined container definition node 3206 generateContents 3208 then determines 3210 whether the type-defined container definition node is a leaf node. Since type-defined container definition node Access Links 3104 is a leaf node, method fillInLeafNode 3220 is invoked to perform a query 3222 based on the combined selection criteria for the selected derived container, which in this case is {{assoc_org=FYZZX, INC.} AND {isInterface=TRUE}}. In a preferred embodiment, records are only extracted at leaf nodes. Method fillInLeafNode 3220 then extracts records 3224 that result from the query and displays them. For the database of FIG. 28, these records include RecNo's B3, showing database object Router1/lan0, and B4, showing database object Router1/lan1.

Conclusion

The result of an information model is both an easy way to organize and access an information repository. This invention was developed for use in Hewlett-Packard's® Network Node Manager to present alternate organizations of a database comprising devices. In both embodiments described herein, both value-defined and type-defined container definition nodes provide the basis by which to define a resulting hierarchy that is viewable by a user. Where a hierarchy is characterized by unique, customized, or more complex detail, a first preferred embodiment may be preferable to define individual value-defined container definition nodes that map to a corresponding derived container. Where a hierarchy comprises categories that can be consolidated (i.e. derived containers share a common field attribute), and/or where one wishes to create an extensible hierarchy which can be expanded based on the contents of one or more information repositories, a second preferred embodiment may be preferable because type-defined container definition nodes reduce the number of value-defined container definition nodes that would otherwise need to be created. Specifically, if a particular hierarchy is characterized by organizations that can be managed and that can be associated with other objects, a variation of a second preferred embodiment provides an efficient solution with some flexibility, since it gives the extensibility of a second preferred embodiment, but limits the extensibility to organization types as desired in a particular hierarchy.

While the extensible hierarchy in a variation of a second preferred embodiment has been directed to organizational information, it is to be understood that the scope of the invention is to extend to other types of information capable of having multiple tiers of categories. For example, the variable attribute of an "organization-based" container definition node could define a rank of employment, which would return a set of employee names. A hierarchy defined by organization-based container definition nodes could be useful for obtaining a list of employees at multiple ranks, but not all ranks as an attribute-based container definition node would generate, so that only those employees would be considered for a promotion to the next rank, for example, eliminating employees at lower ranks which would be superfluous information for this purpose.

While the preferred embodiments of creating and using an information model discussed herein have been directed to databases, it should be emphasized that it is within the scope of this invention that an information model is created and used to organize any kind of information repository. For example, an information model could be created and used to create a hierarchical and logical organization of all the subroutines used in a computer program. This type of information could, for instance, be stored in multiple program files in a single library such that a hierarchy can be created and/or updated by reading the program files in the particular library. Moreover, each file could be created with certain attributes that correspond to container definition node attributes related to creating a hierarchy. Traversing the hierarchy could reveal subroutines used within the selected subroutine, and selecting a subroutine that is a leaf node could reveal all variables used in the subroutine, for instance. Although the creation and use of an information model described herein has been directed to information repositories capable of interaction with computer-based information repositories, an information model is also intended to be used with manually maintained information repositories such as index card files.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. Apparatus for accessing an information repository, comprising:
   a. a number of computer readable media;
   b. computer readable program code stored on said number of computer readable media, said computer readable program code comprising code for organizing information stored in said information repository into a hierarchy, said hierarchy comprising a hierarchy of a number of derived containers, wherein:
      i. said number of derived containers is generated in conformance with an information model comprising a hierarchy of type-defined container definition nodes, wherein each of said number of derived containers corresponds to one of said type-defined container definition nodes, and each of said type-defined container definition nodes is one of a number of container definition node types, said number of container definition node types comprising organization-based container definition nodes; and
      ii. each of said number of derived containers represents a category of information in said information repository; and
      iii. each of said number of derived containers comprises contents.

2. Apparatus as in claim 1, wherein at least one of said number of derived containers corresponds to one of said organization-based container definition nodes, and said category of information corresponds to a number of organizations, each of said number of organizations corresponding to a given one of said at least one of said number of derived containers that corresponds to one of said organization-based container definition nodes.

3. Apparatus as in claim 2, wherein said number of organizations is determined by a variable attribute of a given one of said organization-based container definition nodes, said variable attribute comprising an organization type field to generate said number of organizations associated with said organization type.

4. Apparatus as in claim 1, wherein said number of container definition node types further comprise attribute-based container definition nodes.

5. Apparatus as in claim 1, wherein said number of container definition node types further comprise value-based container definition nodes.

6. Apparatus for accessing an information repository, comprising:
   a. a number of computer readable media; and
   b. computer readable program code stored on said number of computer readable media, said computer readable program code comprising:
      i. code for creating a hierarchy of derived containers, wherein a given derived container corresponds to:
         (1) a type-defined container definition node of an information model, said information model comprising a hierarchy of type-defined container definition nodes, wherein each of said type-defined container definition nodes is one of a number of container definition node types, said number of container definition node types comprising organization-based container definition nodes; and
         (2) a category of information stored in said information repository;
      ii. code for displaying given ones of said derived containers to a computer user; and
      iii. code for determining if a given one of said displayed derived containers has been selected by a computer user, and upon selection of said given one of said displayed derived containers, displaying contents of said given one of said displayed derived containers.

7. Apparatus as in claim 6, wherein at least one of said derived containers corresponds to one of said organization-based container definition nodes, and said category of information corresponds to a number of organizations, each of said number of organizations corresponding to a given one of said at least one of said number of derived containers that corresponds to one of said organization-based container definition nodes.

8. Apparatus as in claim 7, wherein said number of organizations is determined by a variable attribute of a given one of said organization-based container definition nodes, said variable attribute comprising an organization type field to generate said number of organizations associated with said organization type.

9. Apparatus for accessing an information repository, comprising:
   a. a number of computer readable media; and
   b. computer readable program code stored on said number of computer readable media, said computer readable program code comprising code for creating a hierarchy of derived containers, wherein a given derived container corresponds to:
      i. a type-defined container definition node of an information model, said information model comprising a hierarchy of type-defined container definition nodes, and each of said type-defined container definition nodes is one of a number of container definition node types, said number of container definition node types comprising organization-based container definition nodes; and
      ii. a category of information stored in said information repository;
      wherein:
         (1) said hierarchy of type-defined container definition nodes comprises at least a first-level type-defined container definition node, a plurality of lower level type-defined container definition nodes, and a plurality of leaf nodes;
         (2) various ones of said type-defined container definition nodes comprise pointers to other type-defined container definition nodes to thereby establish said hierarchy of type-defined container definition nodes; and
         (3) each of said type-defined container definition nodes comprises a variable attribute to determine a selection criteria attribute.

10. Apparatus as in claim 9, wherein at least one of said derived containers corresponds to one of said organization-based container definition nodes, and said category of information corresponds to a number of organizations, each of said number of organizations corresponding to a given one of said at least one of said number of derived containers that corresponds to one of said organization-based container definition nodes.

11. Apparatus as in claim 10, wherein said number of organizations is determined by a variable attribute of a given one of said organization-based container definition nodes, said variable attribute comprising an organization type field to generate said number of organizations associated with said organization type.

12. Apparatus as in claim 9, wherein said variable attribute comprises a field to determine a selection criteria attribute, as well as a field that is inherited by a given derived container as part of said selection criteria attribute.

13. Apparatus for accessing an information repository, comprising:
   a. a number of computer readable media;
   b. computer readable program code stored on said number of computer readable media, said computer readable program code comprising code for organizing information stored in said information repository into an extensible hierarchy, said extensible hierarchy comprising a hierarchy of a number of derived containers, wherein:
      i. said number of derived containers are generated in conformance with an information model comprising a hierarchy of type-defined container definition nodes, wherein at least one of said type-defined container definition nodes is an organization-based container definition node, and a subset of said number of derived containers correspond to a given one of at least one organization-based container definition node, and are related derived containers in a given group;
      ii. each of said related derived containers in said given group represents a same given category of information in said information repository; and
      iii. each of said number of derived containers comprises contents.

14. Apparatus as in claim 13, wherein said given category of information corresponds to a number of organizations, each of said number of organizations corresponding to a given one of said at least one of said number of derived containers that corresponds to one of said organization-based container definition nodes.

15. Apparatus as in claim 14, wherein said number of organizations is determined by a variable attribute of a given one of said organization-based container definition nodes, said variable attribute comprising an organization type field to generate said number of organizations associated with said organization type.

16. Apparatus as in claim 13, wherein children and descendant derived containers of said related derived containers in said given group are determined by children and descendant type-defined container definition nodes of a parent organization-based container definition node corresponding to said group of said related derived containers in said given group.

17. Apparatus as in claim 13, wherein each of said related derived containers in said given group generated in conformance with the information model shares an attribute definition, said attribute definition determining at least one inheritable attribute inherited by said related derived containers in said given group.

18. Apparatus as in claim 17, wherein said attribute definition is determined by a variable attribute, and said variable attribute comprises an organization type field that is used to generate a number of unique organization values, each of said unique organization values determining at least one inheritable attribute of a given one of said related derived containers in a same given group.

19. A computer based method of accessing an information repository, comprising:
  c. said computer creating a hierarchy of derived containers, wherein each of said derived containers corresponds to:
    i. a type-defined container definition node of an information model, said information model comprising a hierarchy of type-defined container definition nodes, wherein each of said type-defined container definition nodes is one of a number of container definition node types, said number of container definition node types comprising organization-based container definition nodes; and
    ii. a category of information stored in said information repository;
  d. said computer displaying given ones of said derived containers to a computer user; and
  e. said computer determining if a given one of said displayed derived containers has been selected by a computer user, and upon selection of said given one of said displayed derived containers, displaying contents of said given one of said displayed derived containers.

20. A method as in claim 19, wherein at least one of said derived containers corresponds to one of said organization-based container definition nodes, and said category of information corresponds to a number of organizations, each of said number of organizations corresponding to a given one of said at least one of said number of derived containers that corresponds to one of said organization-based container definition nodes.

21. A method as in claim 19, wherein said number of organizations is determined by a variable attribute of a given one of said organization-based container definition nodes, said variable attribute comprising an organization type field to generate said number of organizations associated with said organization type.

\* \* \* \* \*